(12) United States Patent
Armstrong et al.

(10) Patent No.: US 10,473,362 B2
(45) Date of Patent: Nov. 12, 2019

(54) LIQUID-AIR TRANSPIRED SOLAR COLLECTORS

(71) Applicant: Khalifa University of Science and Technology, Abu Dhabi (AE)

(72) Inventors: Peter Ross Armstrong, Abu Dhabi (AE); Abdul Qadir, Abu Dhabi (AE); Matteo Chiesa, Trondheim (NO)

(73) Assignee: Khalifa University of Science and Technology (AE)

( * ) Notice: Subject to any disclaimer, the term of this patent is extended or adjusted under 35 U.S.C. 154(b) by 188 days.

(21) Appl. No.: 15/177,152

(22) Filed: Jun. 8, 2016

(65) Prior Publication Data

US 2017/0003053 A1   Jan. 5, 2017

Related U.S. Application Data

(63) Continuation of application No. 13/294,669, filed on Nov. 11, 2011, now abandoned.

(51) Int. Cl.
*F24J 2/04* (2006.01)
*F24S 10/20* (2018.01)
(Continued)

(52) U.S. Cl.
CPC .............. *F24S 10/20* (2018.05); *F24S 10/30* (2018.05); *F24S 10/40* (2018.05); *F24S 10/501* (2018.05);
(Continued)

(58) Field of Classification Search
CPC .......... F24J 2/0477; F24J 2/201; F24J 2/0488; F24J 2/0494; F24J 2/23; F24J 2/24;
(Continued)

(56) References Cited

U.S. PATENT DOCUMENTS 1,002,768 A * 9/1911 Shuman F .............. F03G 6/065
126/643
3,145,707 A * 8/1964 Thomason ............. F24J 2/0488
126/675
(Continued)

FOREIGN PATENT DOCUMENTS

DE     4127236 A1 *  2/1993   .............. F24S 10/90
DE     4224763 A1 *  2/1994   .............. F24S 80/20
(Continued)

OTHER PUBLICATIONS

Kutscher et al., Heat exchange effectiveness and pressure drop for air flow through perforated plates with and without crosswind. J Heat Transfer. May 1, 1993;116(2):391-9. doi:10.1115/1.2911411.
(Continued)

*Primary Examiner* — Gregory L Huson
*Assistant Examiner* — Daniel E Namay
(74) *Attorney, Agent, or Firm* — Grossman Tucker Perreault & Pfleger PLLC

(57) ABSTRACT

The invention, in some embodiments, relates to solar energy collectors, and methods of use thereof. In some embodiments, the invention relates to liquid-air transpired solar energy collectors, and methods of use thereof. In some embodiments, the invention relates to thermal energy transfer systems that comprise solar energy collectors, and methods of use thereof. In some embodiments of the invention, methods of constructing solar energy collectors are provided.

25 Claims, 50 Drawing Sheets

(51) Int. Cl.
*F24S 10/50* (2018.01)
*F24S 10/80* (2018.01)
*F24S 60/30* (2018.01)
*F24S 70/65* (2018.01)
*F24S 10/30* (2018.01)
*F24S 10/40* (2018.01)
*F24S 40/90* (2018.01)
*F24J 2/20* (2006.01)
*F24J 2/24* (2006.01)
*F24S 80/457* (2018.01)

(52) U.S. Cl.
CPC ............... *F24S 10/80* (2018.05); *F24S 40/90* (2018.05); *F24S 60/30* (2018.05); *F24S 70/65* (2018.05); *F24S 80/457* (2018.05); *Y02B 10/20* (2013.01); *Y02E 10/44* (2013.01)

(58) Field of Classification Search
CPC .. F24S 10/20; F24S 10/25; F24S 10/30; F24S 10/40; F24S 10/80; F24S 70/65; F24S 60/30
USPC ....... 126/643, 634, 629, 628, 647; 165/48.2; 250/429
IPC .................. F24J 2/04,2/20, 2/24, 2/28
See application file for complete search history.

(56) References Cited

U.S. PATENT DOCUMENTS

| | | | | |
|---|---|---|---|---|
| 3,901,036 | A * | 8/1975 | Martin | F03G 6/00 60/641.15 |
| 4,054,124 | A | 10/1977 | Knoos | |
| 4,063,547 | A * | 12/1977 | Gruettner | F24J 2/201 126/623 |
| 4,085,730 | A | 4/1978 | Severson et al. | |
| 4,085,731 | A * | 4/1978 | Weir | F24J 2/0494 126/596 |
| 4,086,911 | A | 5/1978 | Futch | |
| 4,094,717 | A * | 6/1978 | Barr | F24J 2/0488 156/197 |
| 4,116,220 | A | 9/1978 | Burd | |
| 4,117,831 | A | 10/1978 | Bansal et al. | |
| 4,128,124 | A | 12/1978 | Worthington | |
| 4,141,338 | A * | 2/1979 | Lof | F24J 2/0488 126/674 |
| 4,246,888 | A * | 1/1981 | Jarzenbeck, Sr. | F24S 60/00 126/620 |
| 4,257,398 | A * | 3/1981 | Watson | F24J 2/0477 126/612 |
| 4,305,383 | A | 12/1981 | Bloxsom | |
| 4,307,708 | A * | 12/1981 | Tatusmi | F24D 3/005 126/611 |
| 4,321,912 | A * | 3/1982 | Larsen | F24S 80/525 126/625 |
| 4,345,586 | A * | 8/1982 | Monjes | F24J 2/10 126/623 |
| 4,353,355 | A * | 10/1982 | Stewart | F24J 2/045 126/664 |
| 4,363,703 | A * | 12/1982 | Eldifrawi | B01D 3/346 203/10 |
| 4,377,398 | A * | 3/1983 | Bennett | C02F 1/14 96/146 |
| 4,397,305 | A | 8/1983 | Keefe | |
| 4,453,535 | A * | 6/1984 | Tolonen | F24J 2/0477 126/668 |
| 4,487,659 | A * | 12/1984 | Stark | C02F 1/14 202/172 |
| 4,619,243 | A * | 10/1986 | Vironneau | F24S 10/90 126/635 |
| 4,712,338 | A * | 12/1987 | Trickel | F24D 11/003 52/90.2 |
| 4,766,885 | A * | 8/1988 | Muramatsu | F24D 17/0021 126/636 |
| 5,522,944 | A * | 6/1996 | Elazari | F24D 11/003 136/248 |
| 5,596,981 | A * | 1/1997 | Soucy | E06B 3/6612 126/704 |
| 6,880,553 | B2 * | 4/2005 | Liu | F24J 2/0488 126/628 |
| 8,981,272 | B2 | 3/2015 | Armstrong et al. | |
| 2004/0237960 | A1 * | 12/2004 | Liu | F24J 2/0488 126/628 |
| 2005/0252507 | A1 * | 11/2005 | Hollick | F24F 5/0046 126/621 |
| 2006/0048771 | A1 | 3/2006 | Sizelove | |
| 2008/0176504 | A1 * | 7/2008 | McClendon | F24F 5/0046 454/251 |
| 2011/0088753 | A1 * | 4/2011 | Ahlgren | H02S 20/00 136/246 |
| 2012/0060898 | A1 * | 3/2012 | Ahlgren | H01L 31/042 136/248 |
| 2012/0125401 | A1 * | 5/2012 | DeVillier | H02S 20/00 136/246 |
| 2012/0192920 | A1 * | 8/2012 | McCowan | H01L 35/30 136/248 |
| 2013/0032705 | A1 | 2/2013 | Armstrong et al. | |
| 2015/0355018 | A1 | 12/2015 | Armstrong et al. | |

FOREIGN PATENT DOCUMENTS

| | | | | |
|---|---|---|---|---|
| DE | 4332902 | A1 * | 3/1995 | .............. F24S 10/90 |
| DE | 19500807 | A1 * | 7/1996 | .............. F24S 10/80 |
| JP | 59095919 | A * | 6/1984 | ............ F24F 3/1417 |
| JP | 61015050 | A * | 1/1986 | ......... F24D 17/0021 |
| JP | 61017857 | A * | 1/1986 | ......... F24D 17/0021 |
| JP | 01111166 | A * | 4/1989 | ............ F24S 10/755 |
| JP | 02022041 | A * | 1/1990 | ......... B29C 49/0047 |

OTHER PUBLICATIONS

Qadir et al., Hybrid liquid-air transpired solar collector: model development and sensitivity analysis. ASME 2010 International Mechanical Engineering Congress and Exposition vol. 7: Fluid Flow, Heat Transfer and Thermal Systems, Parts A and B. Vancouver, British Columbia, Canada, Nov. 12-18, 2010. Paper available Nov. 12, 2010. Paper No. IMECE2010-40571, pp. 1035-1040; 6 pages. doi:10.1115/IMECE2010-40571.

Qadir et al., Hybrid liquid-air transpired solar collector: model development and sensitivity analysis. ASME Conference Abstract IMECE2010-40571. Session 10-3-1 Presented Nov. 17, 2010. Abstract available online Apr. 2010. 1 page.

Qadir et al., Hybrid liquid-air transpired solar collector: model development and sensitivity analysis. ASME 2010 International Mechanical Engineering Congress and Exposition. IMECE2010-40571. Vancouver, British Columbia, Canada, Nov. 12-18, 2010. Power point presentation and talk given Nov. 17, 2010. 29 pages.

Qadir et al., Liquid-Air transpired solar collector: model development and sensitivity analysis. Available on MIT website Jan. 25, 2011. http://web.mit.edu/parmstr/www/pubs/LATSC-model-sensitivity.pdf 9 pages.

Qadir, Liquid-air transpired solar collector : model development, validation and optimization. Abu Liquid-air transpired solar collector: model development, validation and optimization. Abu Dhabi: Masdar Institute of Science and Technology. Thesis. Available online via web.mit.edu/parmstr/Public/aaReprints/Theses/ Jun. 23, 2011. Dated Jun. 25, 2011. 125 pages.

\* cited by examiner

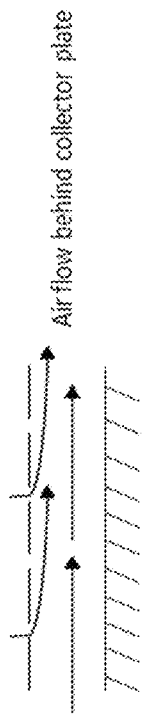
FIG. 5A
FIG. 5B
FIG. 5C

LIQUID-AIR TRANSPIRED SOLAR COLLECTORS

FIELD OF THE INVENTION

The invention generally relates to solar energy collectors and methods of use thereof.

BACKGROUND OF INVENTION

Solar water heating collectors have been used for domestic water heating for decades as they provide considerable savings in energy bills. Conventional flat-plate water heating collectors can provide high solar to thermal energy conversion efficiency and can fulfill many of the water heating demands of a building when storage of about one day's water use is provided. However the capital cost of installing water heating collectors remains an obstacle in its widespread use.

Transpired collectors actively pull air through small perforations in the absorber plate which leads to the heating of the air. The air movement suppresses convection losses as the heat conducted to the thermal boundary layer is continuously pulled back toward the plate. A transpired solar collector can perform efficiently at high suction velocities. However for lower suction velocities, required to achieve high air temperature desired for desiccant regeneration applications, the collector efficiency drops considerably.

SUMMARY OF INVENTION

According to some aspects of the invention, solar energy collectors are provided. In some embodiments, the solar energy collectors have a relatively low cost of construction compared with conventional solar collectors. In some embodiments, collectors are provided that operate at relatively high efficiencies under light wind conditions. In some embodiments, collectors are provided in an unglazed configuration that facilitates convection driven by wind which controls the temperature of the collector. Controlling the temperature of the collector in this manner may ensure that the collector does not overheat, which, depending on the materials used for the collector, could occur in a range of 90 to 100° C. or more. In some embodiments, use of an unglazed collector provides for relatively easy scaling because constraints associated with glass size are avoided. In some embodiments, collectors are provided that are made with low cost polymers or metal-polymer composites.

In some embodiments, the solar energy collectors comprise a housing forming a cavity for containing a first fluid, in which the cavity has at least one outlet configured and arranged for allowing the first fluid to exit from the cavity. In some embodiments, the solar energy collector comprises a solar absorber comprising a plurality of openings, in which the solar absorber is configured and arranged for absorbing incident solar radiation, thereby acquiring thermal energy, and for allowing passage of the first fluid through each of the plurality of openings into the cavity such that thermal energy is transferred to the first fluid. In some embodiments, the solar energy collector comprises at least one conduit extending through the cavity, in which the at least one conduit is configured and arranged for allowing passage of a second fluid through the cavity such that the second fluid is fluidically isolated from the first fluid and such that thermal energy is transferred to the second fluid.

In some embodiments, the solar energy collectors comprise a housing forming a cavity for containing a first fluid, the cavity having at least one outlet configured and arranged for allowing the first fluid to exit from the cavity; a solar absorber comprising a plurality of openings, the solar absorber being configured and arranged for absorbing incident solar radiation, thereby acquiring thermal energy, and for allowing passage of the first fluid through each of the plurality of openings into the cavity such that thermal energy is transferred to the first fluid; and at least one conduit extending through the cavity, the at least one conduit configured and arranged for allowing passage of a second fluid through the cavity such that the second fluid is fluidically isolated from the first fluid and such that thermal energy is transferred to the second fluid. In some embodiments, the solar energy collectors are designed and constructed to operate at a temperature in a range of 10° C. to 60° C. above ambient.

In some embodiments, the solar collectors further comprise a support structure configured and arranged to position the solar absorber at a desired zenith angle.

In some embodiments, the conduit is attached (e.g., directly attached) to the solar absorber. In some embodiments, the conduit is brazed or welded to the solar absorber. In some embodiments, the conduit is attached to the solar absorber in a manner that facilitates transfer of thermal energy from the solar absorber (e.g., which acquires thermal energy from impinging solar radiation) to the conduit through conduction, such that the thermal energy is then transferred to a fluid (e.g., water) passing within the conduit.

In some embodiments, the solar absorber is a plate. In some embodiments, the plate has a length in a range of 1 m to 5 m and a width in a range of 1 m to 5 m. In some embodiments, the absorber has an emissivity of at least 0.8. In some embodiments, the solar absorber comprises a plurality of openings configured and arranged for permitting passage of fluid (e.g. air) through each opening into the housing. In certain embodiments, the openings are holes (e.g., holes having a circular cross-section). In certain embodiments, the holes have a diameter in a range of 1 mm to 10 mm. In other embodiments, the openings comprise louvers. In some embodiments, the openings are arranged in a triangular, square or hexagonal pattern. In some embodiments, the pitch of the openings in the absorber is in a range of 10 mm to 50 mm. In some embodiments, the areal density of openings in the solar absorber is in a range of 400 to 40,000 openings/m². In certain embodiments, the plurality of openings are configured and arranged such that the following relationship is satisfied:

$$0.25 < \left(\frac{\text{pitch}}{D_h}\right)^{-1.21} \text{Re}_d^{0.43} < 1.039,$$

in which pitch is the average distance between the center of each opening, $D_h$ is the diameter of each opening, and $\text{Re}_d$ is a Reynolds number based on air flowing through the openings at an air flow velocity through each opening within a range of 0.001 m/s to 0.01 m/s.

In some embodiments, the solar collectors comprise a first fluid flow device configured and arranged for moving a first fluid out of the cavity through the at least one outlet. In some embodiments, the first fluid flow device is configured and arranged for moving the first fluid through the plurality of openings into the cavity, and toward the at least one outlet. In some embodiments, the cavity comprises at least one inlet, separate from the plurality of openings in the solar absorber, configured and arranged for allowing the first fluid to enter into cavity such that it combines with the first fluid entering into the cavity through the plurality of openings. In some embodiments, the solar collectors comprise a first fluid flow device configured and arranged for moving the first fluid through the plurality of openings and the at least one inlet into the cavity, and moving the first fluid toward the at least one outlet. In one embodiment, the first fluid is air (e.g., ambient air).

In some embodiments, the solar collectors comprise a second fluid flow device configured and arranged for moving a second fluid through the at least one conduit. In some embodiments, the second fluid flow device is a pump (e.g., a liquid pump, e.g., a centrifugal pump, a displacement pump, a diaphragm pump, etc.). In certain embodiments, the second fluid is a liquid. In one embodiment, the second fluid is water or an aqueous solution. In some embodiments, the second fluid flow device is configured and arranged for moving the second fluid through the at least one conduit at a mass flow rate per cross-sectional area of the conduit of less than 0.02 kg/s-m². In some embodiments, the second fluid flow device is configured and arranged for moving the second fluid through the at least one conduit at a mass flow rate per cross-sectional area of the conduit in a range of 0.001 to less than 0.02 kg/s-m². In some embodiments, the second fluid flow device is configured and arranged for moving the second fluid through the at least one conduit at a mass flow rate per cross-sectional area of the conduit in a range of 0.02 kg/s-m² to 0.1 kg/s-m².

In some embodiments, the housing of the solar collectors defines a fluid passage having a substantially rectangular cross-section. In certain embodiments, the substantially rectangular cross-section has at least one dimension (e.g., a depth) in a range of 0.025 m to 0.5 m. In some embodiments, the substantially rectangular cross-section has a perimeter in a range of 1 m to 4 m.

In some embodiments, the solar energy collector comprises a first fluid flow device configured and arranged for moving a first fluid from within the housing through the outlet at a first fluid capacitance rate, $\dot{m}c_{p_{first\,fluid}}$, and a second fluid flow device configured and arranged for moving a second fluid through the conduit, at a second fluid capacitance rate, $\dot{m}d_{p_{second\,fluid}}$, such that $R_{\dot{m}cp}$ is between 0.1 and 0.9, in which $R_{\dot{m}cp}$ is $$\frac{\dot{m}c_{p_{first\,fluid}}}{\dot{m}c_{p_{first\,fluid}} + \dot{m}c_{p_{second\,fluid}}}.$$

According to some aspects of the invention, methods of operating solar energy collectors are provided. In some embodiments, the methods involve positioning any one of the solar energy collectors disclosed herein in an appropriate environment such that solar radiation impinges on the solar absorber, thereby transferring thermal energy to the solar absorber. In some embodiments, the methods involve causing a first fluid to move through the housing from the at least one inlet to the at least one outlet, such that thermal energy from the solar absorber is transferred to the first fluid. In some embodiments, the methods involve causing a second fluid to move through the at least one fluid conduit, such that thermal energy from the solar absorber is transferred to the second fluid. In certain embodiments, the step of causing the first fluid to move through the housing from the at least one inlet to the at least one outlet, comprises operating a first fluid flow device to move the first fluid through the housing. In some embodiments, the step of causing the second fluid to move through the at least one fluid conduit, comprises operating the second fluid flow device to move the second fluid through the conduit. In some embodiments of the methods, a first fluid is drawn in through the plurality of openings in the solar absorber into the housing and toward the at least one outlet. In some embodiments, the first fluid is air. In some embodiments, the second fluid is water or an aqueous solution. In some embodiments, the first fluid exits the at least one outlet at a first fluid capacitance rate, $\dot{m}c_{p_{first\,fluid}}$, and the second fluid moves through the at least one conduit at a second fluid capacitance rate, $\dot{m}c_{p_{second\,fluid}}$, such that $R_{\dot{m}cp}$ is between 0.1 and 0.9, in which $R_{\dot{m}cp}$ is $$\frac{\dot{m}c_{p_{first\,fluid}}}{\dot{m}c_{p_{first\,fluid}} + \dot{m}c_{p_{second\,fluid}}}.$$

According to some aspects of the invention, thermal energy transfer systems are provided. In some embodiments, the systems comprise any one or more of the solar energy collectors disclosed herein and a device for which the solar energy collector(s) supply thermal energy (e.g., a liquid desiccant regeneration device, a desalination device, etc.). In certain embodiments, the systems comprise any one or more of the solar energy collectors disclosed herein and one or more liquid desiccant regeneration devices. In certain embodiments, the liquid desiccant regeneration (LDR) device is a spray cooled type LDR device, a packed bed type LDR device or a falling film type LDR device. In some embodiments, the solar energy collector comprises a first fluid flow device configured and arranged for moving a first fluid from within the housing through a fluid outlet, and a second fluid flow device configured and arranged for moving a second fluid through a conduit, in which the fluid outlet and the conduit are configured and arranged for supplying the first fluid and the second fluid to a liquid desiccant regeneration or desalination device. In this embodiment, thermal energy transfer from the solar absorber to the first and second fluids (e.g., from the solar absorber) in the solar collector is transferred to the liquid desiccant regeneration cycle. In some embodiments, the fluid outlet is configured and arranged for supplying the first fluid to provide thermal energy for heating of a desiccant, and the conduit is configured and arranged for supplying the second fluid to provide thermal energy for regenerating the desiccant.

According to some aspects of the invention, methods of constructing solar energy collectors are provided. In some embodiments, the methods comprise obtaining a housing forming a cavity having at least one outlet; obtaining a solar absorber comprising a plurality of openings; and obtaining at least one conduit and assembling the solar energy collector by disposing the conduit(s) within the housing and/or attaching the solar absorber to the housing. In some embodiments, the methods comprise configuring and arranging the housing to facilitate passage of a fluid from the cavity out through the at least one outlet. In some embodiments, the methods comprise configuring and arranging the at least one conduit such that it is disposed within the housing and such that a fluid passing through the conduit is fluidically isolated from a fluid passing through the housing. In some embodiments, the methods comprise disposing the at least one conduit within the housing, and configuring and arranging the at least one conduit for allowing passage of fluid, such that fluid passing through the conduit is fluidically isolated from fluid passing through the housing.

In some embodiments, the methods comprise configuring and arranging absorber to receive incident solar radiation and to permit passage of fluid through each opening into the housing. In some embodiments, the methods comprise attaching the at least one conduit to the solar absorber. In some embodiments of the methods, the at least one conduit is attached to the solar absorber by brazing or welding.

According to other aspects of the invention, solar absorbers are provided that comprise a plurality of openings that are configured and arranged such that the following relationship is satisfied:

$$0.25 < \left(\frac{\text{pitch}}{D_h}\right)^{-1.21} \text{Re}_d^{0.43} < 1.039,$$

in which pitch is the average distance between the center of each opening, $D_h$ is the diameter of each opening, and $\text{Re}_d$ is a Reynolds number based on air flowing through the openings at an air flow velocity through each opening within a range of 0.001 m/s to 0.01 m/s.

BRIEF DESCRIPTION OF THE DRAWINGS

FIG. 5A provides a depiction of heating of air in a back channel;

FIG. 5B provides a depiction of air flow behind an absorber plate for uncoupled flow;

FIG. 5C provides a depiction of air flow behind an absorber plate for coupled flow;

DETAILED DESCRIPTION OF CERTAIN EMBODIMENTS OF THE INVENTION

According to some embodiments, the invention provides solar energy collectors, referred to in the context of the present invention as Liquid-Air Transpired Solar Collectors (LATSC). In some embodiments, such collectors are unglazed flat plate solar collectors that achieve relatively high efficiencies for applications such as liquid desiccant dehumidification and desalination. The solar energy collectors may be useful in applications that utilize both hot air and hot water (or other liquid or phase-change fluid) at relatively moderate (e.g., 5-40 K above ambient) temperatures. In some embodiments, the solar energy collectors are safe from thermal damage because their stagnation temperature is relatively low (e.g., compared with the stagnation temperature of a conventional flat-plate collector). The solar energy collectors may therefore be made with polymers and other low cost and low weight materials.

The solar energy collectors may be employed to supply thermal energy for large- or small-scale desalination by humidification-dehumidification systems. The solar energy collectors may be employed to supply thermal energy for desiccant regeneration devices for cooling, dehumidification, and drying processes. The solar energy collectors may be employed to supply thermal energy for direct drying processes where relatively high product temperatures are acceptable. The solar energy collectors may be employed to supply thermal energy for space and domestic water heating. In a domestic water heating application, an air-liquid heat exchanger may be used to preheat a liquid coolant before it enters the solar energy collector (e.g., through a fluid inlet port) where it acquires thermal energy from a solar absorber. The solar energy collectors may be employed to supply thermal energy for drain-down and drain-back systems and to double-loop systems that utilize pumped or thermo-siphon circulation, or to traced tank arrangements on the storage side. Pumping in this application may be achieved using single-, multi- or variable-speed pumps.

Figure 1:
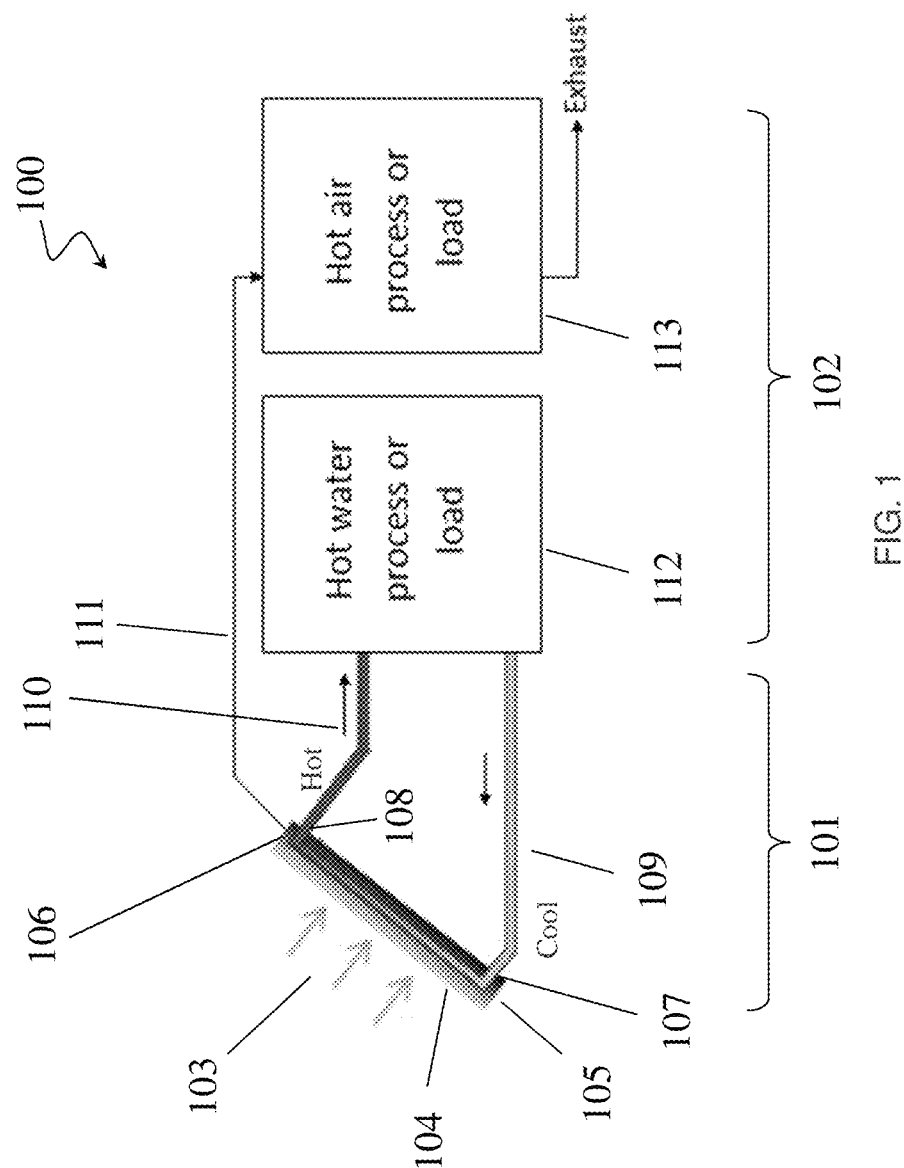
FIG. 1 provides a schematic of a LATSC.

FIG. 1 depicts a non-limiting embodiment of a thermal energy transfer system 100 that includes a solar energy collector 101 and a thermal process component 102. In this embodiment, solar radiation 103 impinges on a solar absorber 104, thereby transferring thermal energy to the solar absorber 104. A first fluid (e.g., air) enters into a cavity of the solar collector through a first fluid inlet 105, travels through the cavity where it acquires thermal energy and combines with a first fluid that enters into the cavity through openings in the solar absorber 104. The first fluid exits the cavity through a fluid outlet 106 and travels through a first fluid supply line 111 to supply thermal energy to thermal process subcomponent 113 (e.g., a desiccant heating component of a desiccant regeneration device). In one embodiment, a first fluid flow device (e.g., a fan) is positioned in line with the first fluid supply line 111 to draw the first fluid into the cavity through the first fluid inlet 105 and through the plurality of openings in the solar absorber 104, and to move the first fluid from the cavity out through the first fluid outlet 106. A second fluid (e.g., water) enters a second fluid inlet 107 into a conduit that passes through the cavity, travels through the cavity where it acquires thermal energy and remains fluidically isolated from the first fluid, and exits the cavity through a second fluid outlet 108. The second fluid exits the cavity through the second fluid outlet 108 and travels through a second fluid supply line 110 to supply thermal energy to thermal process subcomponent 112 (e.g., a desiccant regeneration component of a desiccant regeneration device). After transferring thermal energy to the thermal process subcomponent 112, the second fluid returns to the solar collector 101 through a second fluid return line 109. In one embodiment, a second fluid flow device is configured in line with the second fluid return line and/or the second fluid outlet line to circulate the second fluid through the system.

The solar energy collectors in certain embodiments comprise a housing forming a cavity for containing a fluid, in which the cavity comprises an outlet (at least one outlet) for allowing the fluid to exit the cavity. The solar energy collector may also comprise a solar absorber configured and arranged for absorbing incident solar radiation. The solar absorber may comprise a plurality of openings configured and arranged for permitting passage of ambient air through each opening into the cavity of the housing. In certain embodiments, the openings comprise the only inlet into the cavity of the housing. In some embodiments, at least one inlet separate from the openings is provided that allows fluid to enter into the cavity. Accordingly, the housing may be configured and arranged for allowing passage of air into the cavity through at least one inlet and/or through a plurality of openings in the absorber.

The housing of the solar collectors in certain embodiments defines a cavity having a substantially rectangular cross-section. The substantially rectangular cross-section may have at least one dimension (e.g., a depth, width) in a range of 0.01 m to 1 m, 0.01 m to 0.5 m, 0.05 m to 0.5 m or 0.1 m to 0.5 m. The substantially rectangular cross-section may have a perimeter in a range of 0.1 m to 10 m, 0.5 m to 5 m, 1 m to 5 m, or 1 m to 4 m. The housing may have a length between at least one inlet and at least one outlet in a range of 0.5 m to 1 m, 0.5 to 2 m, 0.5 m to 5 m, or 0.5 m to 10 m, or more. The housing of the solar collectors, which may be referred to in some embodiments herein as a shell, may be made of any appropriate materials for a particular application including but not limited to metals, polymers, ceramics, composites, etc. For example, the housing may be made of aluminum, copper, brass, bronze, stainless steel, nickel, silver, tin, zinc and alloys thereof. In some embodiments, the housing comprises or is made of a polymer, such as, for example, polyethylene, polycarbonate, cellulose based polymers, ethylene propylene diene monomer rubber (EDPM), polyamide thin film composite (TFC), polypropylene, polyphenylene oxide, cross-linked polyethylene (PEX), and linear low density polyethylene (LLDPE).

The solar absorber may be of any suitable size and shape, depending on the application. For example, the solar absorber may be a plate. The plate may be configured and arranged to form a wall of the housing. The plate may have a length and/or width in a range of 0.5 m to 1 m, 0.5 m to 2 m, 0.5 m to 5 m, or 0.5 m to 10 m, or more. The solar absorber may be made of any appropriate material, including but not limited to metals, polymers, ceramics, composites, etc. For example, the solar absorber may be made of copper, brass, bronze, aluminum, stainless steel, nickel, silver, tin, zinc and alloys thereof. In some embodiments, the solar absorber is made of a polymer, such as, for example, polyethylene, polycarbonate, cellulose based polymers, ethylene propylene diene monomer rubber (EDPM), polyamide thin film composite (TFC), polypropylene, polyphenylene oxide, cross-linked polyethylene (PEX), and linear low density polyethylene (LLDPE). The solar absorber may be coated or uncoated. The solar absorber may be coated with a material to establish a desired emissivity. For example, the solar absorber may be coated with a dark, e.g., black, material. The coating material may be a paint (e.g., a high-temperature resistant paint), a polymer coating, an epoxy coating, or other appropriate coating. The coating may be applied to the absorber material by, for example, painting, dipping, chemical vapor deposition, physical vapor deposition, etc. The absorber (coated or uncoated) may have an emissivity of at least 0.1, at least 0.2, at least 0.3, at least 0.4, at least 0.5, at least 0.6, at least 0.7, at least 0.8, at least 0.9, at least 0.95, or at least 0.99.

The openings in the solar absorber may be holes (e.g., holes having a substantially circular cross-section). The openings in the solar absorber may have a circular, elliptical, rounded, rectangular, triangular, or polygonal shaped cross-section, for example. The holes in certain embodiments have a diameter (or average opening width) in a range of 0.2 mm to 10 mm, 0.5 mm to 5 mm, 1 mm to 5 mm, 1 mm to 3 mm or 1 mm to 2 mm. The openings may comprise louvers. The openings may be arranged in random pattern or a non-random pattern. The openings may be arranged a triangular, rectangular, square, pentagonal, or hexagonal pattern. The pitch of the openings in the absorber may be in a range of 10 mm to 100 mm, 1 mm to 50 mm, 5 mm to 50 mm, 5 mm to 25 mm, or 2 mm to 20 mm. In some embodiments, the density of openings in the solar absorber is in a range of 400 to 40,000 openings/m$^2$, 100 to 1000 openings/m$^2$, 400 to 4000 openings/m$^2$, 400 to 8000 openings/m$^2$, 400 to 40,000 openings/m$^2$, 1000 to 20,000 openings/m$^2$, 10,000 to 20,000 openings/m$^2$, 20,000 to 40,000 openings/m$^2$, or 400 to 40,000 openings/m$^2$. The plurality of openings may be configured and arranged such that the following relationship is satisfied:

$$0.25 < \left(\frac{\text{pitch}}{D_h}\right)^{-1.21} \text{Re}_d^{0.43} < 1.039,$$

in which pitch is the average distance between the center of each opening, $D_h$ is the diameter of each opening, and $\text{Re}_d$ is a Reynolds number based on air flowing through the openings at an air flow velocity through each opening within a range of 0.001 m/s to 0.01 m/s.

The solar absorber may be a thin flat plate (e.g., a copper plate) perforated with small closely spaced holes to continuously draw air warmed by the front of the plate (forming a laminar sublayer) before it can develop into free convection plumes (in calm conditions) or be sheared away (in windy conditions). In some configurations, approximately half the available heat may be collected in the transpired air, and water flowing through the tubes may extract the remaining available heat. Air and water flow rates may be controlled so as to continuously optimize performance for a given application. In applications that operate primarily with hot water, a substantial fraction of heat may be diverted to the air stream in order reduce front losses.

The solar energy collectors may include a plurality of conduits configured and arranged for passing a liquid (e.g., water) through the collector to acquire thermal energy, e.g., from the solar absorber. The plurality of conduits may be attached (e.g., directly attached) to the solar absorber. The conduit may be attached to the solar absorber in a manner that facilitates transfer of thermal energy from the solar absorber (e.g., which acquires thermal energy from impinging solar radiation) to the conduit through conduction, such that the thermal energy is then transferred to a fluid (e.g., water) passing within the conduit. For example, the conduits may be brazed or welded to the solar absorber.

The solar energy collectors may comprise a fluid flow device configured and arranged for moving air within the housing from at least one inlet to at least one outlet, such that as the air moves through the housing it acquires thermal energy. The fluid flow device may also or instead be configured and arranged for drawing ambient air through the plurality of openings into the housing, and moving the air drawn through the openings toward the at least one outlet. The fluid flow device may be downstream of the opening to draw fluid through the housing. The first fluid flow device may be, for example, a fan or vacuum pump.

The solar energy collector may comprise a fluid flow device configured and arranged for moving a liquid (e.g., water or aqueous solution, e.g., a glycol solution) through the at least one conduit. This fluid flow device may be a pump, such as, for example, a centrifugal pump, a displacement pump, a diaphragm pump, etc. The fluid flow device may be configured and arranged for moving the liquid through the at least one conduit at a mass flow rate per cross-sectional area of less than 0.02 kg/s-m$^2$. The fluid flow device may be configured and arranged for moving the liquid through the at least one conduit at a mass flow rate per cross-sectional area in a range of 0.001 to less than 0.02 kg/s-m$^2$. The fluid flow device may be configured and arranged for moving the second fluid through the at least one conduit at a mass flow rate per cross-sectional area in a range of 0.02 kg/s-m$^2$ to 0.1 kg/s-m$^2$. In some embodiments, the lateral spacing between conduits is in a range of 0.5 cm to 20 cm, 0.5 cm to 10 cm, 0.5 cm to 20 cm, 1 cm to 10 cm, or 1 cm to 50 cm, depending on the material being used for the solar absorber, the thickness of the solar absorber, the conduit size and flow characteristics, etc. In some embodiments, for relatively low conductivity plates, the spacing between conduits is relatively small; whereas for relatively high conductivity plates the spacing is relatively large. In some embodiments, the appropriate spacing of the conduits depends on the thermal conductivity and/or the thickness of the solar absorber. In some embodiments, the conductivity and/or thickness of the solar absorber (e.g., solar absorber plate) are such that the fin efficiency (equation 35) is in a range of 0.8 to 0.95 In some embodiments, conductivity and/or thickness of the solar absorber (e.g., solar absorber plate) are such that the fin efficiency (equation 35) is in a range of 0.5 to 0.99

The solar energy collector may comprise an air flow device configured and arranged for moving air from within the housing through the outlet at a capacitance rate, $\dot{m}c_{p_{air}}$, and a liquid flow device configured and arranged for moving a liquid (e.g., water, aqueous solution, etc.) through the conduit, at a fluid capacitance rate, $\dot{m}c_{p_{liquid}}$, such that $R_{\dot{m}cp}$ is between 0.1 and 0.9, in which $R_{\dot{m}cp}$ is $$\frac{\dot{m}c_{p_{air}}}{\dot{m}c_{p_{air}} + \dot{m}c_{p_{liquid}}}.$$

In some embodiments, the air flow device and the liquid flow device are configured and arranged to produce liquid flow and air flow conditions such that $R_{\dot{m}cp}$ is in a range of 0.1 to 0.3, 0.1 to 0.4, 0.1 to 0.5, 0.4 to 0.6, 0.5 to 0.6, 0.5 to 0.9, 0.6 to 0.9, 0.7 to 0.9 or 0.5 to 0.8. In some embodiments, the air flow device and the liquid flow device are configured and arranged to produce liquid flow and air flow conditions such that $R_{\dot{m}cp}$ is greater than 0.4. In some embodiment the range of $R_{\dot{m}cp}$ selected depends on the total thermal capacitance rate of air and liquid (e.g., water), and/or the wind speed.

Methods of Operating Solar Energy Collectors

Methods are provided for operating solar energy collectors. The methods may involve positioning any one of the solar energy collectors disclosed herein in an appropriate environment such that solar radiation impinges on the solar absorber, thereby transferring thermal energy to the solar absorber. The methods may involve causing air (e.g., ambient air) to move through the housing from the at least one inlet to the at least one outlet, in which thermal energy from the solar absorber is transferred to the air. The methods may also involve causing a liquid (e.g., water, an aqueous solution, etc.) to move through the at least one fluid conduit, in which thermal energy from the solar absorber is transferred to the liquid. The air may be caused to move through the housing from the at least one inlet to the at least one outlet, by operating a suitably configured air flow device. Similarly, the liquid may be caused to move through one or more conduits in the collector, by operating a suitably configured air flow device. The collector may be operated to control the thermal capacitance rates of the air and liquid. For example, the collector may be operated such that air passes through the housing and exists the housing outlet at a capacitance rate, $\dot{m}c_{p_{air}}$, and liquid moves through the conduit at a capacitance rate, $\dot{m}c_{p_{liquid}}$, such that a desired efficiency is achieved. In some embodiments, the capacitance rates are controlled such that $R_{\dot{m}cp}$ is between 0.3 and 0.9, in which $R_{\dot{m}cp}$ is $$\frac{\dot{m}c_{p_{air}}}{\dot{m}c_{p_{air}} + \dot{m}c_{p_{liquid}}}.$$

The capacitance rates may be controlled such that $R_{\dot{m}cp}$ is between 0.4 and 0.7. The capacitance rates may be controlled such that $R_{\dot{m}cp}$ is between 0.5 and 0.6. Other appropriate capacitance rates may be used.

Thermal Energy Transfer Systems

Air conditioning is important in cities around the world with hot and humid climates. One such example is that of Abu Dhabi where summertime temperatures range between 35-50° C. and humidity levels can rise to 0.025 $kg_w/kg_a$. These climatic conditions can make air conditioning energy intensive due to the high percentage of latent cooling required. It is estimated that over 60% of peak electricity usage in some locations (e.g., Abu Dhabi) is attributed to cooling. In some embodiments of the invention, solar cooling systems that incorporate solar energy collectors disclosed herein may be used for dehumidification, or may be used to facilitate evaporative cooling. In some embodiments of the invention, systems are provided in which solar energy collectors are used to supply heat to thermally regenerated desiccant cycles. These systems may address latent loads needed for air conditioning in these regenerated desiccant cooling systems, and may allow for the separation of latent and sensible energy components of the desiccant cycle. In some configurations, regenerated liquid can be stored for use at night. In one embodiment of the invention, a liquid-air transpired solar collector (LATSC) provides a low-cost, unglazed solar thermal collector which heats air and water simultaneously. The heated air and water may be used in liquid desiccant regeneration applications.

Thermal energy transfer systems may include one or more of the solar energy collectors disclosed herein and a device for which the solar energy collector(s) supply thermal energy, such as, for example, a liquid desiccant regeneration (LDR) device. Any of a variety of desiccant regeneration devices may be used, including, for example, a spray cooled type, a packed bed type or a falling film type LDR. In these systems, the solar energy collector may be configured and arranged for supplying water and air, which have acquired thermal energy in the collector, to the desiccant regeneration cycle. For example, the system may be configured and arranged to supply heated air to provide thermal energy for heating of a desiccant, and heated water to provide thermal energy for regenerating the desiccant.

Figure 38:
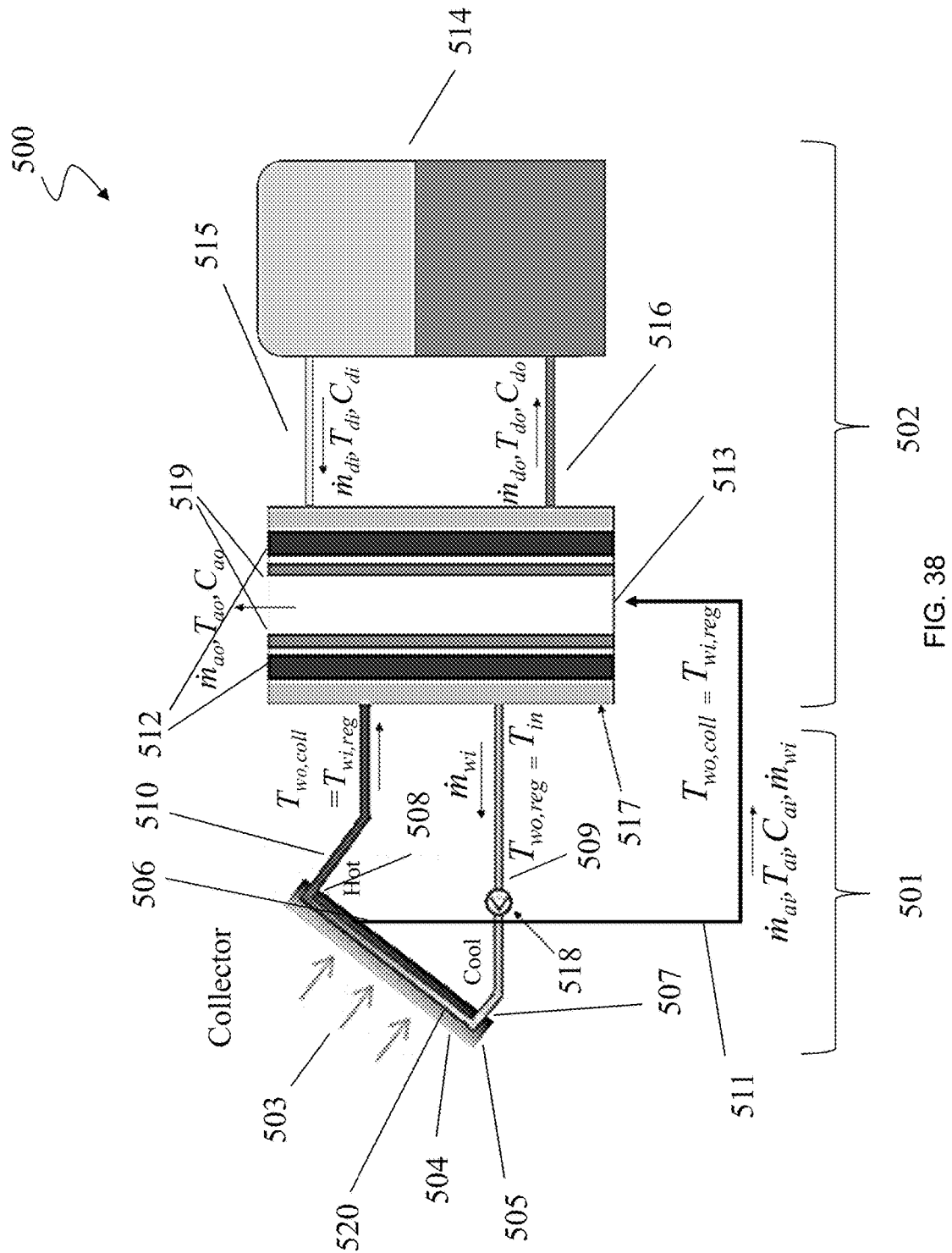
FIG. 38 provides a schematic of LATSC coupled with LDR and a stratified storage tank.

FIG. 38 depicts a non-limiting embodiment of a thermal energy transfer system 500 that includes a solar energy collector 501 and a desiccant regeneration device 502. The desiccant regeneration device 502 includes a desiccant storage tank 514 and a regenerator 517 (a cross-section of the regenerator is depicted). In this embodiment, solar radiation 503 impinges on a solar absorber 504, thereby transferring thermal energy to the solar absorber 504. A first fluid (e.g., air) enters into a cavity of the solar collector through a first fluid inlet 505, travels through the cavity where it acquires thermal energy and combines with a first fluid that enters into the cavity through openings in the solar absorber 504. The first fluid exits the cavity through a fluid outlet 506 and travels through a first fluid supply line 511 to the regenerator where is passes through the regenerator first fluid channel 513, thereby supplying thermal energy for desiccant heating. Within the first fluid channel 513, the first fluid transfer thermal energy to the desiccant falling film 519 and acquires fluid (e.g., water vapor) that evaporates from the desiccant falling film 519, which passes down the walls of the first fluid channel 513.

The first fluid, in the embodiment disclosed in FIG. 38, operates in an open loop. In one embodiment, a first fluid flow device (e.g., a fan) is incorporated into the system (e.g., positioned in line with the first fluid supply line 511) to draw the first fluid into the cavity through the first fluid inlet 505 and through the plurality of openings in the solar absorber 504, and to move the first fluid from the cavity out through the first fluid outlet 506. A first fluid flow device may alternatively, or in addition, be positioned downstream of the regenerator first fluid channel 513 to draw the first fluid through the regenerator first fluid channel 513.

The second fluid (e.g., water), in the embodiment disclosed in FIG. 38, operates in closed loop. The second fluid enters a second fluid inlet 507 into at least one conduit 520 that passes through the cavity of the collector, travels through the cavity where it acquires thermal energy and remains fluidically isolated from the first fluid, and exits the cavity through a second fluid outlet 508. The second fluid exits the cavity through the second fluid outlet 508 and travels through a second fluid supply line 510 to the regenerator second fluid cavity 512, in which it supplies thermal energy to the desiccant falling film 519 to facilitate desiccant regeneration. After transferring thermal energy to the desiccant, the second fluid returns to the solar collector 501 through a second fluid return line 509. In this embodiment, a second fluid flow device 518 (e.g., a pump) is configured in line with the second fluid return line 509. A second fluid flow device may alternatively be positioned in second fluid supply line 510.

Desiccant, meanwhile, is circulated in a closed loop through the regenerator 517. Desiccant enters the regenerator 517 from the desiccant storage tank 514 through supply line 515. The desiccant dries in regenerator 517 as is passes down the first fluid channel 513 as a desiccant falling film 519 along the walls of the first fluid channel 513. The desiccant becomes concentrated due to heating by the first fluid and second fluid passing through the regenerator and transferring thermal energy to the desiccant causing fluid (e.g., water vapor) to evaporate from the desiccant. Fluid (e.g., water vapor) evaporating from the desiccant is transferred to the first fluid in the regenerator first fluid channel 513. The concentrated desiccant returns to the desiccant storage tank through the desiccant return line 516. The concentrated desiccant may be used in a dehumidification, evaporative cooling process, or other suitable process, for example.

Exemplary embodiments of the invention will be described in more detail by the following examples. These embodiments are exemplary of the invention, which one skilled in the art will recognize is not limited to the exemplary embodiments. A listing of abbreviations and nomenclature used in formulas appearing in the Examples and elsewhere in the application is provided at the end of the Examples.

EXAMPLES

Example 1: LATSC Numerical Model

This example relates to a hybrid solar collector referred to as a Liquid-Air Transpired Solar Collector (LATSC). The LATSC is useful for processes that utilize both hot air and hot water. A schematic of a LATSC supplying heat to two processes is depicted FIG. 1. In developing a numerical model of the LATSC, heat transfer mechanisms from the absorber plate and from the back of the collector were considered.

Figure 2:
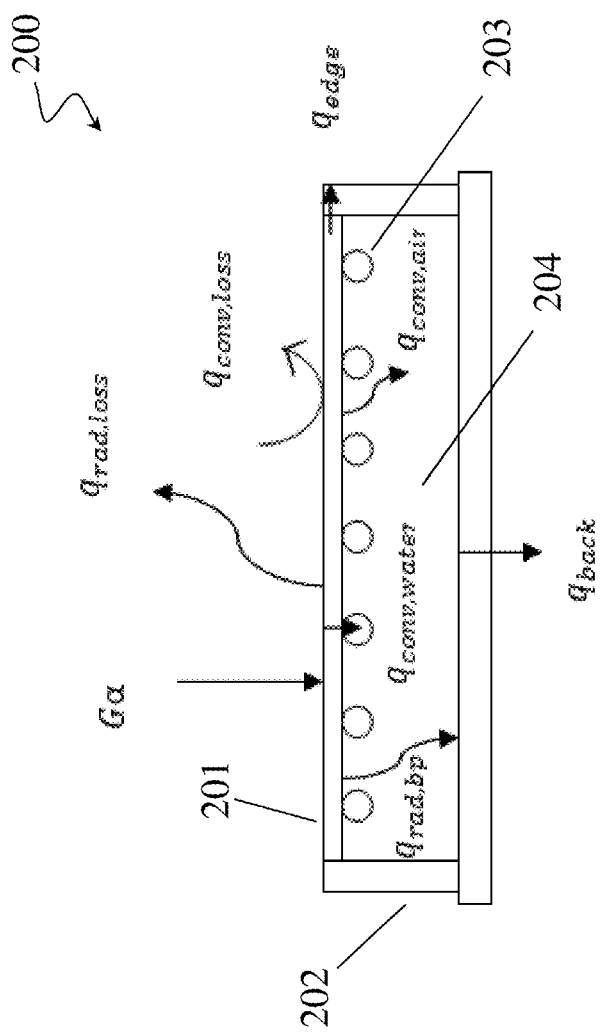
FIG. 2 provides a schematic of an absorber plate depicting heat loss pathways from the absorber plate.

A schematic diagram in FIG. 2 shows the different modes of heat transfer in a cross-section of a solar energy collector 200. The solar energy collector 200 includes a housing 202 forming a cavity 204 for containing a fluid, and solar absorber 201 connected with the housing 202. The solar energy collector 200 also includes a plurality of conduits 203 in the cavity. Losses were categorized as convective and radiative front of plate losses ($q_{conv,loss}$, qrad,loss), convective and radiative back of plate losses ($q_{conv,air}$, $q_{rad,bp}$) and back of collector losses ($q_{back}$) in which radiation and convection modes were combined. The useful energy transferred to the water in the tubes was ($q_{conv,water}$ or $q_u$). As the absorber plate of the collector was of the fin and tube type, the established heat transfer analysis through a fin could be applied as long as all other heat transfer mechanisms from the plate were adequately addressed. Thus the heat transferred to the air sucked through the plate ($q_{conv,air}$) was considered to be a loss from the plate in order to evaluate the heat transferred to the water and the consequent temperature rise. To perform a heat balance on the collector, an elemental area of the collector absorber plate was analyzed, as depicted in FIG. 3, illustrating two openings $301_{1-2}$ and a conduit 300.

The heat transfer process shown were distributed over the plate but for clarity advection terms are shown on the left and convection and radiation on the right. Here the left hand side of FIG. 3 deals with the enthalpy balance of air where the enthalpy of air entering from the back of the element is $\dot{m}_a cp_a T_{ai}$ while that entering through the plate is $$\frac{\dot{m}_{a,total} cp_a}{L} dy T_{a,exit}.$$

The outlet enthalpy of air through the element is $$\left(\dot{m}_a + \frac{\dot{m}_{a,total}}{L} dy\right) cp_a T_{ao}.$$

Figure 3:
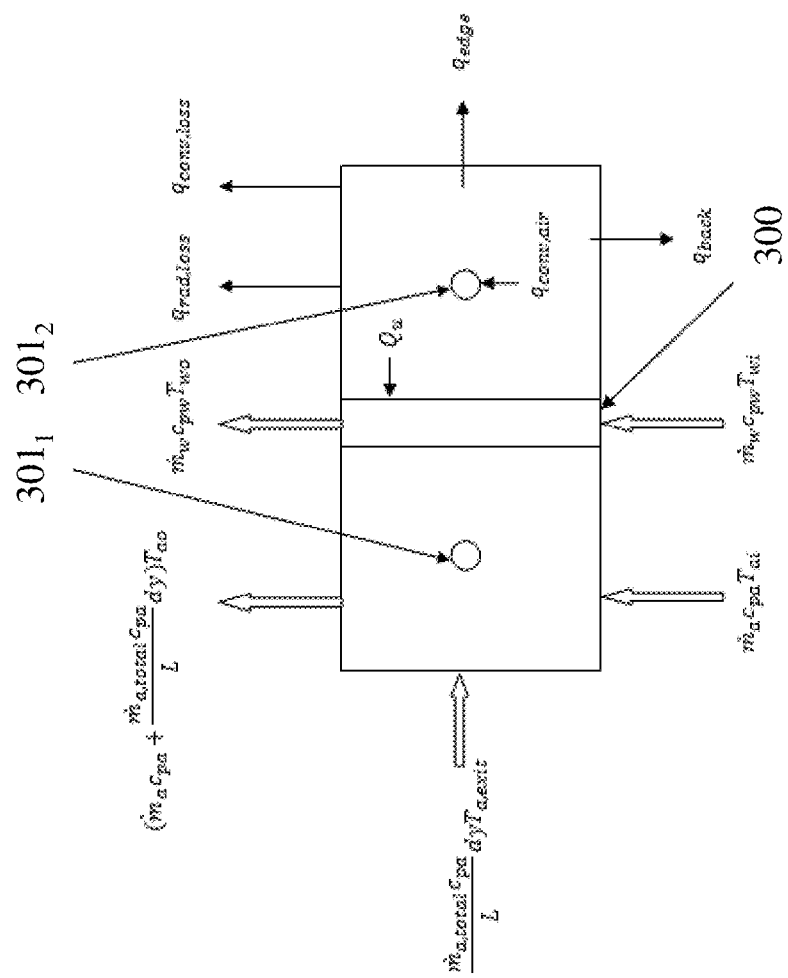
FIG. 3 provides a depiction of an energy balance on an elemental area of the absorber plate.

The right side of FIG. 3 deals with the enthalpy balance of the water. The balance follows as:

$$q_u = (G\alpha - (q_{rad,loss} + q_{c,air} + q_{conv,loss} + q_{back} + q_{edge})) \tag{1}$$

In order to determine the useful heat transferred to the water ($q_u$), the other heat transfer mechanisms were evaluated first.

Convective Heat Transfer to Suction Air

The first to be evaluated was the heat transferred to the air flowing through the holes, $q_{c,air}$. The Nusselt number for air flow through a low porosity plate was:

$$Nu_h = 2.75\left(\left(\frac{pitch}{D_h}\right)^{-1.21} Re_h^{0.43} + 0.011 por * Re_h \left(\frac{V_w}{V_s}\right)^{0.48}\right) \tag{2}$$

where $$Re_d = \frac{V_s D_h}{por * v_a} \tag{3}$$

And the suction velocity $V_s$ was given by:

$$V_s = \frac{\dot{m}_a}{\rho_a A\left(1 - \frac{D_t}{sep}\right)} \tag{4}$$

For a transpired solar collector, the suction velocity was given by:

$$V_{s,t} = \frac{\dot{m}_a}{\rho_a A_c} \tag{5}$$

Figure 4:
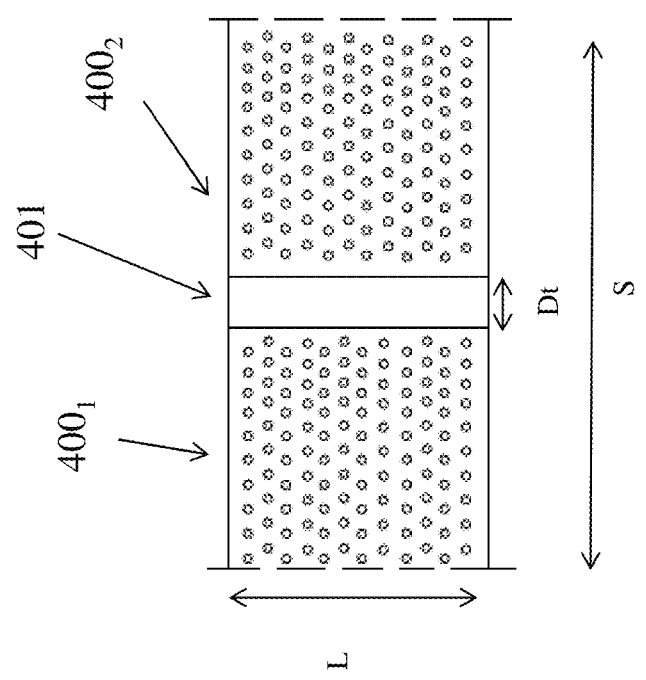
FIG. 4 provides a schematic of one tube and two fins of a collector.

However, in this case there were small perforation-free regions 401, between regions containing perforations $400_1$, $400_2$. Holes were not drilled in the perforation-free regions 401 because of the presence of the tubes, as shown in FIG. 4. FIG. 4 shows one tube and the two half fins to highlight the area in between the fins which were not perforated where W is the width of the collector, L is the length of the collector, $D_t$ is the diameter of the tubes and s is the separation between the tubes. Thus the perforated area was not equal to the total area of the collector. The perforated area ($A_p$) can be expressed as:

$$A_p = A_c\left(1 - \frac{Dt}{s}\right) \tag{6}$$

This difference in the perforated and absorber area involved the modification of equation (5) to equation (4).

From the Nusselt number the heat transfer coefficient was obtained for air flowing through the holes as:

$$U_h = \frac{Nu_h k_a}{D_h} \tag{7}$$

The heat exchange effectiveness of the plate was a function of NTU which was obtained using the general formula:

$$NTU = \frac{U_h A}{(\dot{m}_{in} C_p)_a} = \frac{U_h A_{pt}}{\rho_a V_s C_{pa} A_p} \tag{8}$$

Where the plate area, $A_{pl}$, was the solid plate area between the holes. The ratio of the plate area to perforated area could be expressed in terms of porosity as:

$$\frac{A_{pl}}{A_p} = 1 - por \tag{9}$$

This led to the modified NTU equation:

$$NTU = \frac{U_h(1 - por)}{\rho_a V_s C_{pa}} \tag{10}$$

The heat exchange effectiveness was finally written as:

$$\varepsilon_{hx} = 1 - \exp(-NTU) \tag{11}$$

The heat exchange effectiveness correlation developed by Kutscher (1993) was for air flow through a perforated plate assuming that the plenum behind the plate was relatively large (200-300 mm depth). For smaller plenums (50-130 mm depth) as in the LATSC, a modification to the heat exchange effectiveness would be applied:

$$\varepsilon_{hx,mod} = \varepsilon_{hx}(0.9589 + 0.0004 d_p + 0.000000032 d_p^2) \tag{12}$$

Where $d_p$ was the plenum depth and was in mm. The modified correlation above was valid for plenum depths from 50 mm to 130 mm.

From the heat exchange effectiveness of the plate, the heat transferred to the holes in the plate was obtained in terms of the mean plate temperature of the differential element ($T_{pl}$) and the ambient temperature, $T_{amb}$, as:

$$q_{c,air} = \varepsilon_{hx,mod} W(T_{pl} - T_{amb}) dy \tag{13}$$

Convective Front Loss

Kutscher had also developed a correlation for the heat transfer coefficient for wind losses from the front of a perforated plate in terms of wind velocity, $V_w$ and suction velocity, $V_s$:

$$U_{wf} = 0.82 \frac{V_w V_a \rho_a C_{pa}}{V_s L} \tag{14}$$

Equation (13) could be directly used to determine the total convective front losses as:

$$q_{conv,loss} = U_{wf}(T_{pl} - T_{amb}) \tag{15}$$

Radiative Front Losses

For the model it was assumed that the radiation from the front of the absorber plate was predominantly to the sky. The sky model developed by Berdahl and Martin (Duffie & Beckman, 1980) was used to determine the effective sky temperature in terms of the dry bulb temperature ($T_{amb}$), dew point temperature ($T_{dp}$) and the hour from midnight (h).

$$T_{sky} = T_{amb}(0.711 + 0.0056 T_{dp} + 0.000073 T_{dp}^2 + 0.013 \cos(15h))^{1/4} \tag{16}$$

Since the effective sky temperature was the temperature of a black sky that would result in the same heat exchange, the radiation heat transfer to the sky was expressed as:

$$q_{rad,loss} = \varepsilon \sigma (T_{pl}^4 - T_{sky}^4) W\, dy \tag{17}$$

Where $\varepsilon$ was the emissivity of the plate while $\sigma$ was the Stephan Boltzmann constant.

Edge Losses

The edge loss coefficient for heat loss from the absorber plate was expressed as:

$$U_e = \frac{k_e}{t_e}\left(\frac{A_e}{A_c}\right) \tag{18}$$

Thus the heat loss through the edge was:

$$q_{edge} = U_e(T_{pl} - T_{amb}) W\, dy \tag{19}$$

Back Losses

The back losses of the collector resulted from radiation from the back of the absorber plate to the bottom of the plenum, and convection between air and bottom of plenum, followed by heat conduction through the back insulation to the collector back and convective and radiative heat loss at the back of the collector. The radiation heat transfer coefficient for heat transfer between the absorber plate and back plate was given by:

$$U_{pr} = \frac{\sigma(T_{pl}^2 + T_{bp}^2) + (T_{pl} + T_{bp})}{\frac{1}{\varepsilon_{ab}} + \frac{1}{\varepsilon_{bp}} - 1} \tag{20}$$

where $T_{bp}$ was the back plate temperature and $\varepsilon_{ab}$ and $\varepsilon_{bp}$ are the back of the absorber plate and bottom of channel emissivities. For the convective heat transfer from the back plate, the air was considered to be flowing through the channel in laminar flow with the upper plate being heated with uniform flux and lower plate insulated. For this case the Nusselt number is 5.39. The heat transfer coefficient was expressed as:

$$U_p = \frac{Nu_p k_a}{D_p} \tag{21}$$

Where $D_p$ was the hydraulic diameter of the plenum:

$$D_p = \frac{4A_{cr}}{P} \tag{22}$$

The total heat transfer from the front of the back plate was:

$$q_{back,loss} = U_{pr}(T_{pl} - T_{bp}) + U_p(T_{bp} - T_{ai}) \tag{23}$$

The heat transfer coefficient for conduction through the back insulation was given by:

$$U_{bi} = \frac{k_{bi}}{t_{bi}} \tag{24}$$

The heat transferred through the back insulation was:

$$q_{back} = U_{bi} * (T_{bp} - T_{bc}) \tag{25}$$

Furthermore the convective heat transfer coefficient at the back of the collector was:

$$U_{wb} = \frac{Nu_{wb} k_a}{W} \tag{26}$$

Where:

$$Re_{wb} = \frac{V_w W}{v_a} \tag{27}$$

$$Nu_{wb} = 0.664(Re_{wb}^{0.5} * Pr_{wb}^{0.33}) \tag{28}$$

The radiative heat transfer coefficient from the back of the collector to ground was:

$$U_{br} = \frac{\sigma(T_{bc}^2 + T_g^2) + (T_{bc} + T_g)}{\frac{1}{\epsilon_{bc}} + \frac{1}{\epsilon_g} - 1} \tag{29}$$

where the ground temperature is assumed to be equal to ambient temperature.

The total heat transfer from the back of the collector was:

$$q_{back,loss} = U_{wb}(T_{bc} - T_{amb}) + U_{br}(T_{bc} - T_g) \tag{30}$$

Combined Losses

Having developed the equations for all the heat transfer pathways, the combined heat transfer coefficient was expressed in terms of the combined heat loss and $(T_{pl} - T_{amb})$ as:

$$U_l = \frac{q_{rad,loss} + q_{c,air} + q_{conv,loss} + q_{edge} + q_{back,loss}}{(T_{pl} - T_{amb})} \tag{31}$$

Now the heat transferred to the water in the tubes can be calculated from the energy balance equation (1) and equation (31) as:

$$Q_u = W * dy * (G - U_l(T_{pl} - T_{amb})) \tag{32}$$

As the plate temperature varies in both the x and y direction, it was useful to express $Q_u$ in terms of the local fluid temperature $T_f$:

$$Q_u = W * dy * F'(G - U_l(T_f - T_{amb})) \tag{33}$$

Where F' is the collector efficiency factor which accounts for thermal resistances between various points on the plate and the cooling water. Part of the resistance was due to the fin efficiency, F, of the collector plate. These factors were given by:

$$F' = \frac{\frac{1}{U_l}}{s\left(\frac{1}{U_l(D_t + (s - D_t)F)} + \frac{1}{C_b} + \frac{1}{\pi D_t h_{fi}}\right)} \tag{34}$$

where $$F = \frac{\tanh * m \frac{s - D_t}{2}}{m \frac{s - D_t}{2}} \tag{35}$$

and $$m = \sqrt{\frac{U_l}{k_p \delta}} \tag{36}$$

The heat transfer coefficient for convection in the tube, $h_{fi}$, was given by:

$$h_{fi} = \frac{Nu_w k_w}{D_t} \tag{37}$$

where the Nusselt number correlation was for laminar, fully developed flow through a pipe with constant heat flux, given by:

$$Nu_w = 4.4 + b\left[\frac{\left(\frac{Re_w * Pr_w D_t}{L}\right)^n}{1 + c\left(\frac{Re_w * Pr_w D_t}{L}\right)^o}\right] \tag{38}$$

where b, c, n and o are constants with the following values:

b=0.00172
c=0.00281
n=1.66
o=1.29

The Prandtl number, $Pr_w$, velocity of water in tubes, $V_{wa}$, cross sectional area of tubes, $A_t$ and Reynolds number of water flowing through the tubes, $Re_w$ were given by:

$$Pr_w = \frac{v_w c_{pw} \rho_w}{k_w} \tag{39}$$

$$V_{wa} = \frac{\dot{m}_w}{\rho_w A_t} \tag{40}$$

$$A_t = \frac{\pi D_t N}{4} \tag{41}$$

$$Re_w = \frac{V_w D_t}{v_w} \tag{42}$$

Equating the thermal energy gain of the water via advection to the heat transferred to the tube, an ordinary differential was obtained of the form:

$$\dot{m}_w c_{pw} \frac{dT_w}{dy} = Q_u \qquad (43)$$

to solve for the water outlet temperature by integration.

Similarly, the air side enthalpy balance was cast as an Ordinary Differential Equation (ODE) by using the following equation to replace $T_{a,exit}$:

$$\varepsilon_{hx,mod} = \frac{T_{a,exit} - T_{amb}}{T_{pl} - T_{amb}} \qquad (44)$$

The ODE obtained to solve for the air outlet temperature was:

$$(\dot{m}_{ai} + \Delta \dot{m}_a)\frac{dT_a}{dy} = \frac{\dot{m}_{a,tot}}{L}[(1-\varepsilon_{hx,mod})T_{amb} + \varepsilon_{hx,mod}T_{pl} - T_{ai}] \qquad (45)$$

where $\varepsilon_{hx,mod}$ was the heat exchange effectiveness of the perforated absorber plate.

Lastly a mass balance was applied to solve for the air flow exiting each element.

$$\frac{d\dot{m}_a}{dy} = \frac{\dot{m}_{a,total}(y)}{L} \qquad (46)$$

Uncoupled vs. Coupled Heat Transfer Behind Absorber Plate

The model developed above did not take in to account the heat transferred to the air as it moves up the back channel or plenum. The back channel contribution was expected to be relatively small. Nevertheless, there may be some heat transfer to the air due to the temperature gradient between the air in the plenum and the front (upper) and back (lower) plates as shown in FIG. 5. To accurately account for this heat transfer of the air in the plenum, a correlation may be used for heating of air in a channel with uniform injection and uniform heat flux at one wall. In order to evaluate correlations relevant to the particular geometry used (injection through holes on a pitch comparable to the channel depth), two scenarios were considered which serve as the upper and lower bounds for the heat transfer between plate and air in the channel. The first case is referred to as the 'uncoupled' model in which a finite air flow rate through a uniformly porous plate will produce a laminar boundary layer that is continuously replenished from the plate thus essentially completely suppressing convective coupling with the cooler air that is already moving through the channel. In other words, air entering the plenum from the perforations does not substantially mix with the air that is already in the plenum and moving along the channel behind the absorber plate towards the exit. Since the air temperature at the exit of the perforations at any point y (z=0) (sign convention according to the coordinates shown in FIG. 5) is greater than the air already in the plenum at the same y (z<0), the temperature gradient between the absorber plate and the air in contact with the absorber plate will be lower, leading to a lower heat transfer to the air in the plenum. This scenario provides an upper limit of the water outlet temperature and lower limit of the air outlet temperature. The second case is referred to as the 'coupled' model in which it is considered that there is essentially no boundary layer replenishment by air through the plate. In other words the incoming air from the perforations instantly fully mixes with the air already in the plenum and the temperature of the air in contact with the back of the absorber plate is assumed to be the average air temperature in the plenum and not the air exit temperature from the perforations. Using the coupled model the upper limit of the air outlet temperature and lower limit of the water outlet temperature was obtained.

To account for this heat transfer, the air was considered to be flowing through the channel in laminar flow with the upper plate being heated with uniform flux and lower plate insulated for both the 'uncoupled' and 'coupled' case. For this case the Nusselt number obtained from standard tables is 5.39. The heat transfer coefficient was expressed as:

$$U_{ab} = \frac{Nu_{bp}k_a}{D_p} \qquad (47)$$

where $D_p$ is the hydraulic diameter of the plenum:

$$D_p = \frac{4A}{P} \qquad (48)$$

The heat transferred to the air behind the collector for the uncoupled scenario is thus:

$$q_{ab} = U_{ab}*(T_{pl}-T_{exit}) + U_{ab}*(T_{bp}-T_{ai}) \qquad (49)$$

while for the coupled scenario it is:

$$q_{ab} = U_{ab}*(T_{pl}-T_{ai}) + U_{ab}*(T_{bp}-T_{ai}) \qquad (50)$$

For the uncoupled/coupled heat transfer model, this heat transfer term must be added to the enthalpy balance equation (1) and the right side of the ODE for air (45) to give:

$$q_u = (G\alpha - (q_{rad,loss} + q_{c,air} + q_{conv,loss} + q_{back} + q_{edge} + q_{ab}))*dy \qquad (51)$$

and $$(\dot{m}_{ai} + \Delta \dot{m}_a)\frac{dT_a}{dy} = \frac{\dot{m}_{a,tot}}{L}[(1-\varepsilon_{hx,mod})T_{amb} + \varepsilon_{hx,mod}T_{pl} - T_{ai}] + q_{ab} \qquad (52)$$

Solving Procedure

Figure 6:
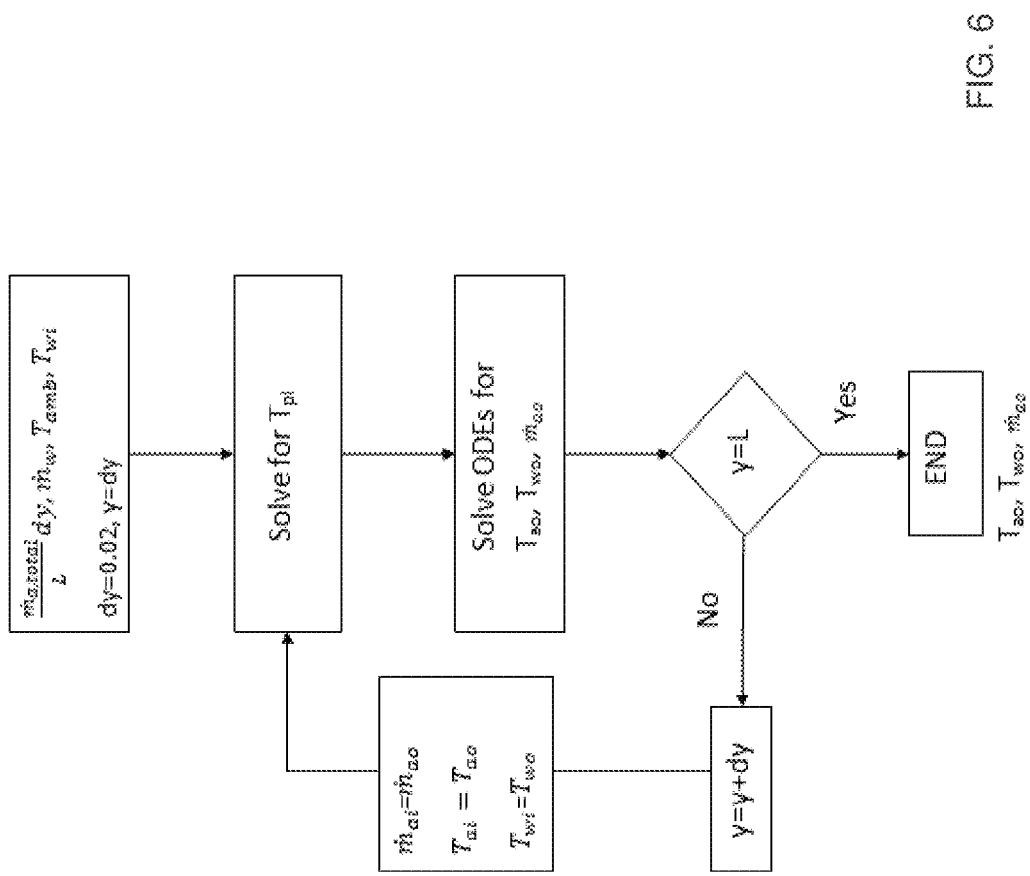
FIG. 6 is a block flow diagram illustrating an example of a solving procedure.

The three ODEs developed were solved simultaneously using the software package Engineering Equation Solver (EES). EES allowed for the fast solving of multiple implicit nonlinear equations and it was particularly useful in solving for $T_{pl}$, because $T_{pl}$ could not be expressed explicitly. $T_{pl}$ was then simultaneously used in the ODE solver to determine the outlet air and water temperatures for each node up until the last node. A flow chart depicting the solving procedure is shown in FIG. 6. EES also provided a parametric table which facilitated a sensitivity analysis. Furthermore, EES had an inbuilt library of air and water properties which were called during the iterative solving procedure.

Example 2: Sensitivity Analysis of the LATSC Model

Sensitivity Analysis

With the collector model described in Example 1, the performance sensitivity of the collector to varying the ambient temperature ($T_{amb}$), inlet water temperature ($T_{wi}$), collector emissivity ($\epsilon$), solar radiation (G), wind speed ($V_w$)

and total thermal capacitance of air and water $(\dot{m}c_p)_{total}$ was evaluated. Moreover for each analysis, the ratio of thermal capacitance of air to total thermal capacitance ($R_{\dot{m}cp}$) was varied to observe its effect on the efficiency of the collector along with the other varying parameters. The efficiency of the collector was given by:

$$\eta_c = \frac{\dot{m}_a C_{pa}(T_{ao} - T_{ai}) + \dot{m}_w C_{pw}(T_{wo} - T_{wi})}{G * A} \quad (53)$$

Two batches of sensitivity analysis were performed. The first batch evaluated the performance of the collector to changes in $(\dot{m}c_p)_{total}$ and $(R_{\dot{m}cp})$ with other physical and weather parameters held constant while the second batch was aimed at producing performance curves for the collector at ASHRAE 93 recommended water flow rate and its corresponding optimum air flow ratio. For both batches, three sets of analyses were carried out. For all three analyses, the collector dimension, air properties, weather condition and solar radiation have been held constant at values specified in Table 2.1.

Batch 1

Figure 7:
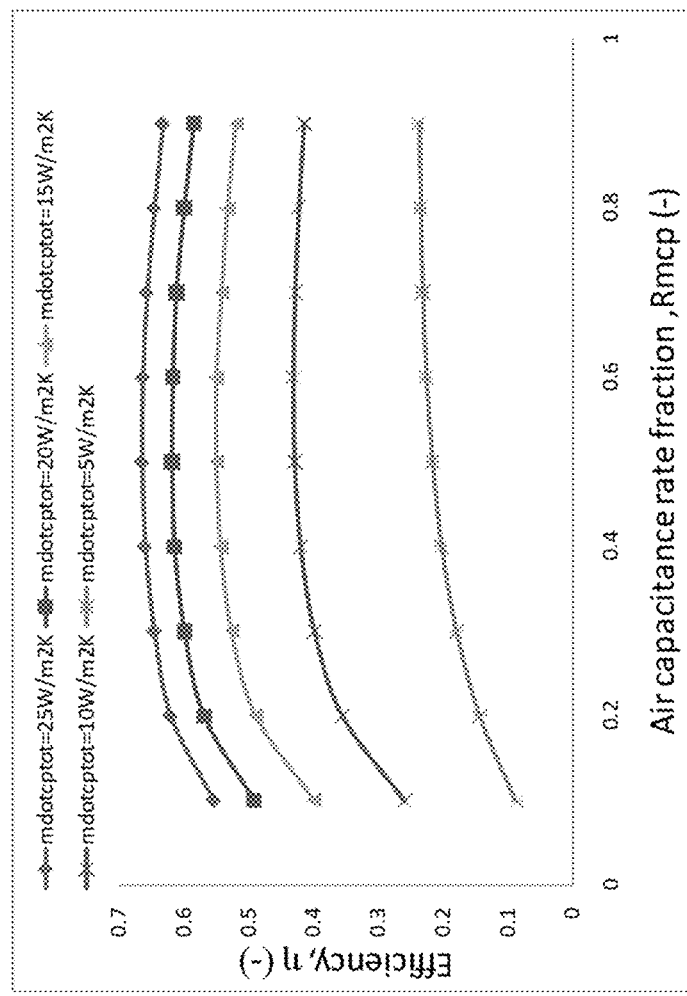
FIG. 7 is a graph providing a comparison of efficiency vs. $R_{\dot{m}cp}$ for a range of $(\dot{m}c_p)_{total}$ with $T_{w,i}=T_{amb}=25°$ C. uncoupled air heating.
Figure 8:
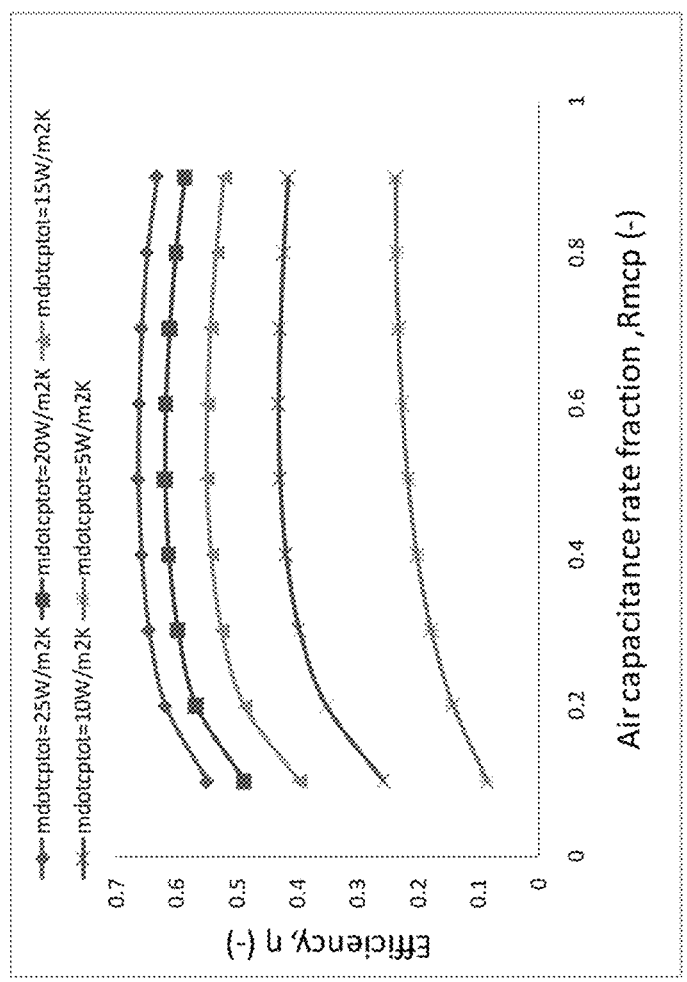
FIG. 8 is a graph providing a comparison of efficiency vs. $R_{\dot{m}cp}$ for range of $(\dot{m}c_p)_{total}$ with $T_{w,i}=T_{amb}=25°$ C. for coupled air heating.
Figure 9:
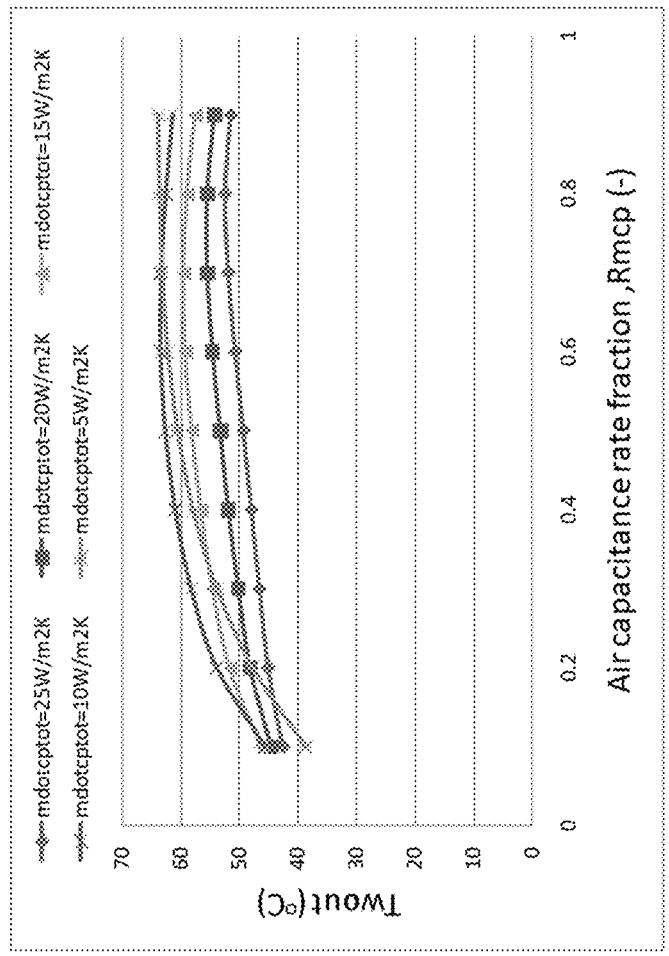
FIG. 9 is a graph providing a comparison of water outlet temperature vs. $R_{\dot{m}cp}$ for range of $(\dot{m}c_p)_{total}$ with $T_{w,i}=T_{amb}=25°$ C. for uncoupled air heating.
Figure 10:
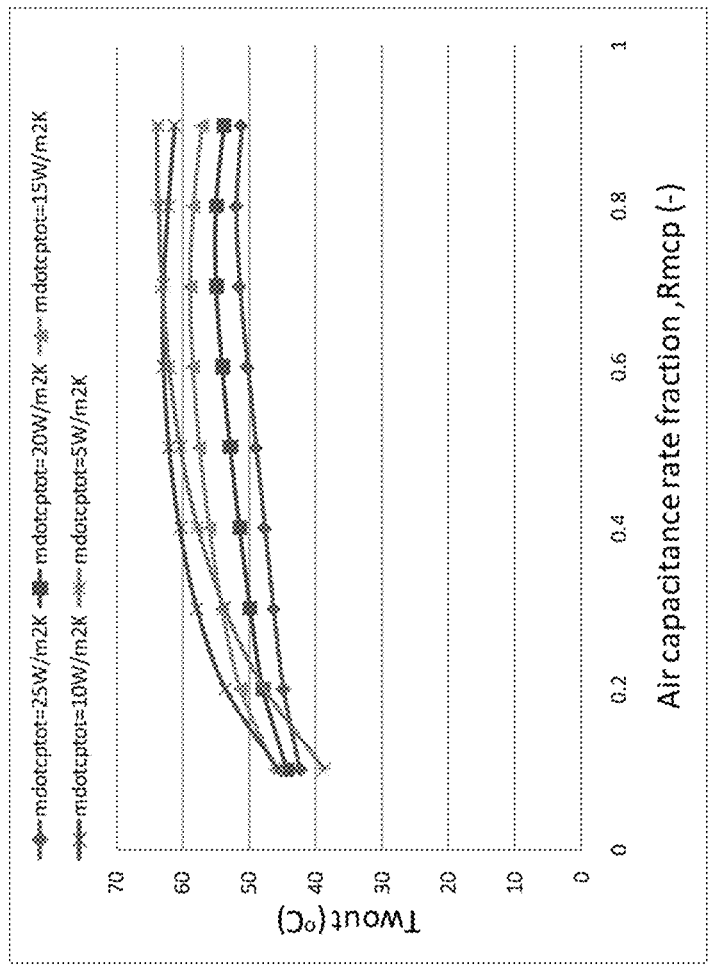
FIG. 10 is a graph providing a comparison of water outlet temperature vs. $R_{\dot{m}cp}$ for range of $(\dot{m}c_p)_{total}$ with $T_{w,i}=T_{amb}=25°$ C. for coupled air heating.

The first analysis was aimed at obtaining the performance of the collector with different $(\dot{m}c_p)_{total}$ entering the collector along with a range of values of $R_{\dot{m}cp}$ from 0.1 to 0.9. The range of values of $(\dot{m}c_p)_{total}$ was from 5 W/m²K to 25 W/m²K at five equal intervals and the ambient temperature was maintained at =25° C. The overall collector efficiency and the outlet water temperature were compared for varying $R_{\dot{m}cp}$. The results obtained for these analyses are shown in FIG. 7 and FIG. 9 for the model without heating of air behind the collector plate and in FIG. 8 and FIG. 10 when air was heated behind the collector plate.

TABLE 2.1

Geometric parameters, fluid properties and baseline conditions used in the sensitivity analysis

| Property | Value |
| --- | --- |
| Solar radiation (S) | 800 W/m² |
| Wind speed($V_w$) | 3 m/s |
| Air temperature($T_{amb}$) | 25° C. |
| Air density ($\rho_a$) | 1.184 kg/m³ |
| Air Viscosity ($\mu_a$) | 1.849*10⁻⁵ Ns/m² |
| Air Cp ($c_{pa}$) | 1.007 kJ/kgK |
| Length of collector (L) | 2 m |
| Width of collector (W) | 1 m |
| Plenum depth (D) | 0.1 m |
| Perimeter of plenum cross section | 2.2 m |
| Plate absorptivity | 0.9 |
| Plate emissivity | 0.9 |
| Hole diameter | 0.00159 m |
| Hole pitch (triangular pattern) | 0.025 m |

Figure 11:
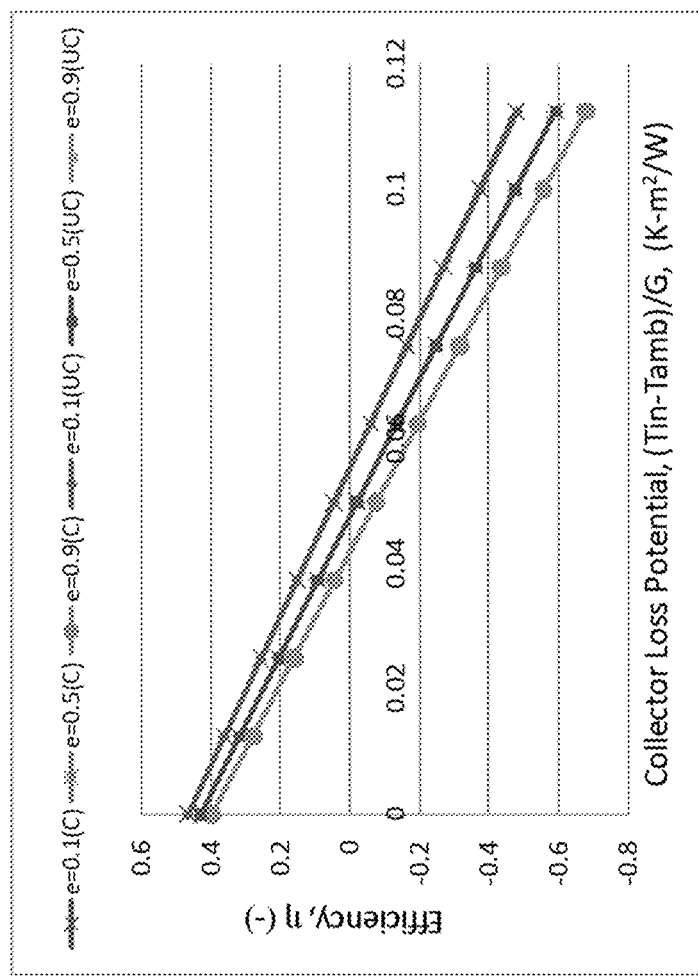
FIG. 11 is a graph providing a comparison of efficiency vs. $\Delta T/G$ for $R_{\dot{m}cp}=0.1$ and $T_{amb}=25°$ C. for uncoupled (UC) and coupled (C) air heating behind plate.
Figure 12:
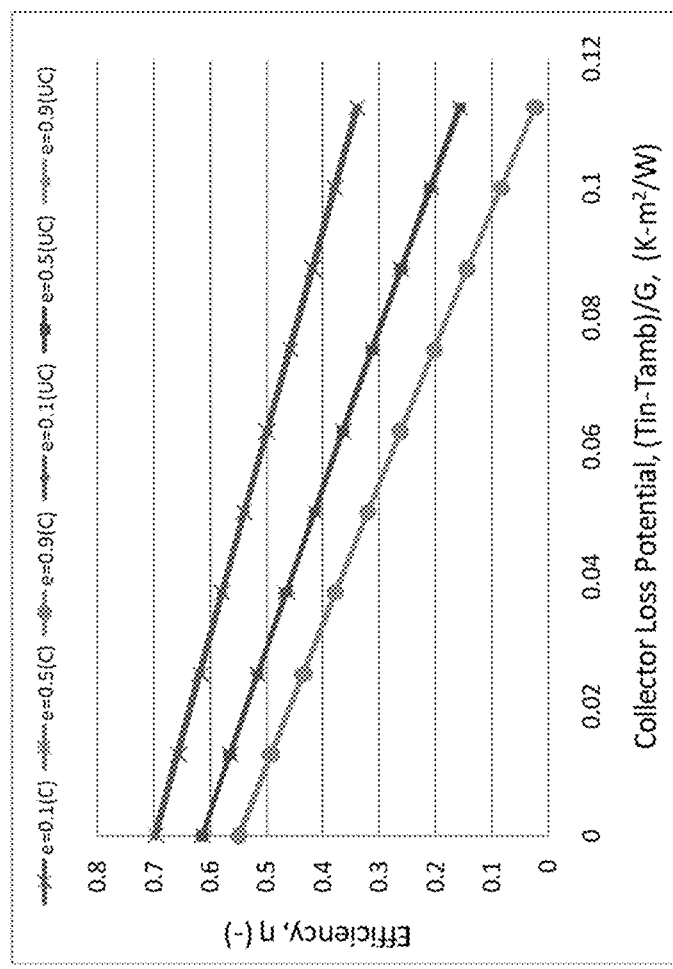
FIG. 12 is a graph providing a comparison of efficiency vs. $\Delta T/G$ for $R_{\dot{m}cp}=0.5$ and $T_{amb}=25°$ C. for uncoupled (UC) and coupled (C) air heating behind plate.
Figure 13:
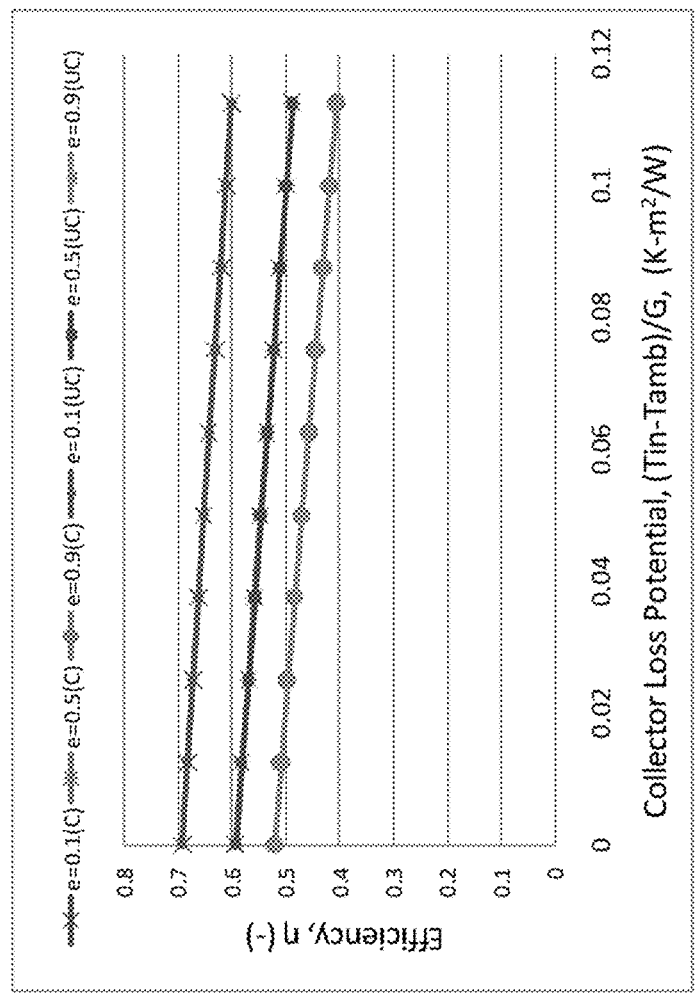
FIG. 13 is a graph providing a comparison of efficiency vs. $\Delta T/G$ for $R_{\dot{m}cp}=0.9$ and $T_{amb}=25°$ C. for uncoupled (UC) and coupled (C) air heating behind plate.
Figure 14:
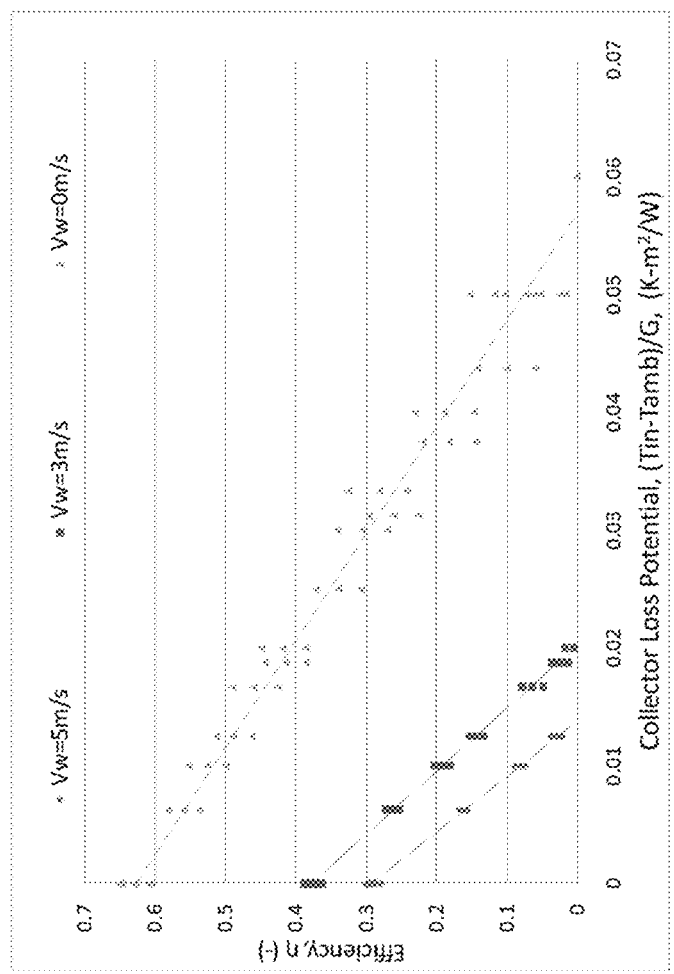
FIG. 14 is a graph providing a comparison of efficiency vs. $\Delta T/G$ for $R_{\dot{m}cp}=0.1$, $(\dot{m}c_p)_{total}=15$ W/m²K and varying G, $T_{amb}$, $T_{win}$, and $V_w$ for uncoupled heating behind collector plate.
Figure 15:
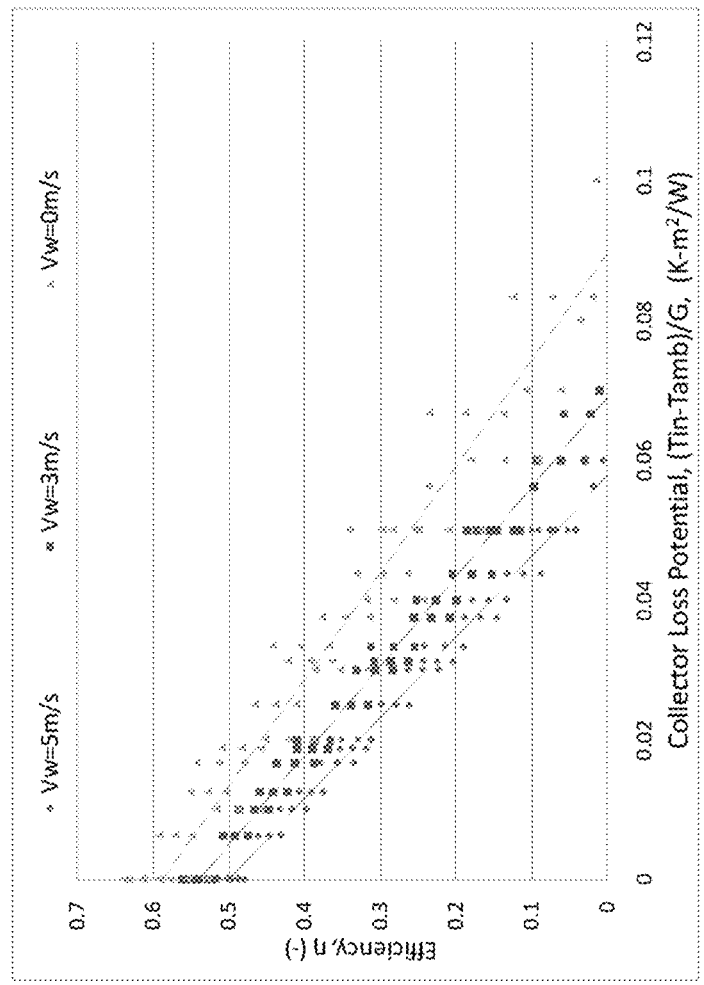
FIG. 15 is a graph providing a comparison of efficiency vs. $\Delta T/G$ for $R_{\dot{m}cp}=0.5$, $(\dot{m}_p)_{total}=15$ W/m²K and varying G, $T_{amb}$, $T_{win}$, and $V_w$ for uncoupled heating behind collector plate.
Figure 16:
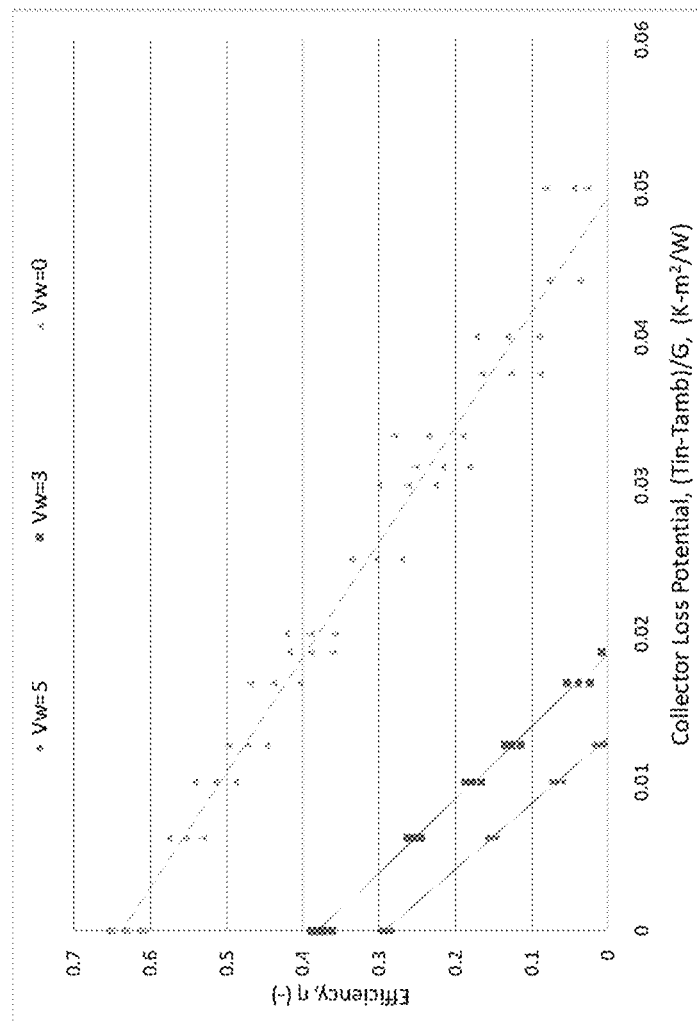
FIG. 16 is a graph providing a comparison of efficiency vs. $\Delta T/G$ for $R_{\dot{m}cp}=0.1$, $(\dot{m}c_p)_{total}=15$ W/m²K and varying G, $T_{amb}$, $T_{win}$, and $V_w$ for heating behind collector plate.
Figure 17:
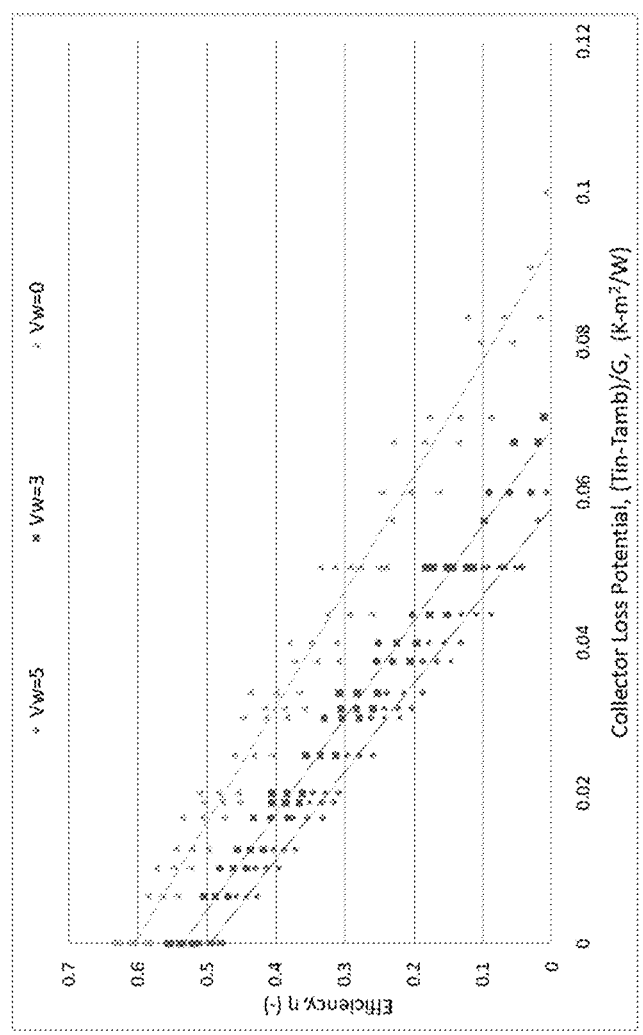
FIG. 17 is a graph providing a comparison of efficiency vs. $\Delta T/G$ for $R_{\dot{m}cp}=0.5$, $(\dot{m}c_p)_{total}=15$ W/m²K and varying G, $T_{amb}$, $T_{win}$, and $V_w$ for coupled heating behind collector plate.

The second set of analysis was performed by varying the inlet temperature of the water from 25° C. to 115° C. to obtain the efficiency of the collector. The ambient temperature for this analysis was fixed at 25° C. and the $(\dot{m}c_p)_{total}$ was fixed at 15 W/m²K. The emissivity and $R_{\dot{m}cp}$ was also varied to obtain a family of curves for emissivities and $R_{\dot{m}cp}$ s of 0.1, 0.5 and 0.9. The results are shown in FIG. 11, FIG. 12 and FIG. 13 respectively. Table 2.2:

Conditions Used in Sensitivity Analyses

| Parameter | Values |
| --- | --- |
| ⁽¹⁾Air temperature ($T_{amb}$) | 25, 35, 45 (° C.) |
| ⁽¹⁾Water inlet temperature ($T_{wi}$) | 25-115 (° C.) with 10° C. intervals |
| ⁽¹⁾Air to total thermal capacity ration ($\dot{m}c_{p\ ratio}$) | 0.1, 0.3, 0.5, 0.7, 0.9 |
| ⁽²⁾Solar radiation (G) | 300, 500, 800 (W/m²) |
| ⁽²⁾Wind speed ($V_w$) | 0, 3, 5 (m/s) |

⁽¹⁾G and $V_w$ were fixed for the first two sensitivity exercises at values given in Table 2.1.
⁽²⁾G and $V_w$ were only varied for the standard collector performance (FIGS. 14-18)

The third analysis developed standard performance curves for the collector for a wider range of varying parameters and conditions. For this analysis $(\dot{m}c_p)_{total}$ was kept constant at 15 W/m²K, while $R_{\dot{m}cp}$, $V_w$, $T_{wi}$, $T_{amb}$ and G were varied. The ranges of values for which these parameters were varied are displayed in Table 2.2. The results from this analysis are illustrated in FIGS. 14-15 and FIGS. 16-17 for uncoupled air heating and coupled air heating behind the collector plate.

Finally the pitch and diameter of the holes was varied to assess the impact on the efficiency of the collector for the coupled model only. First, the hole diameter was varied from 0.001 to 0.0055 m, keeping the pitch constant at 0.025 m. Then the hole diameter was kept constant at 0.00159 m while the pitch was varied from 0.01 to 0.055 m. This allowed for the collector performance to be simulated for a range of values of:

$$0.25 < \left(\frac{\text{pitch}}{D_h}\right)^{-1.21} \text{Re}_d^{0.43} < 1.039 \quad (54)$$

Figure 18:
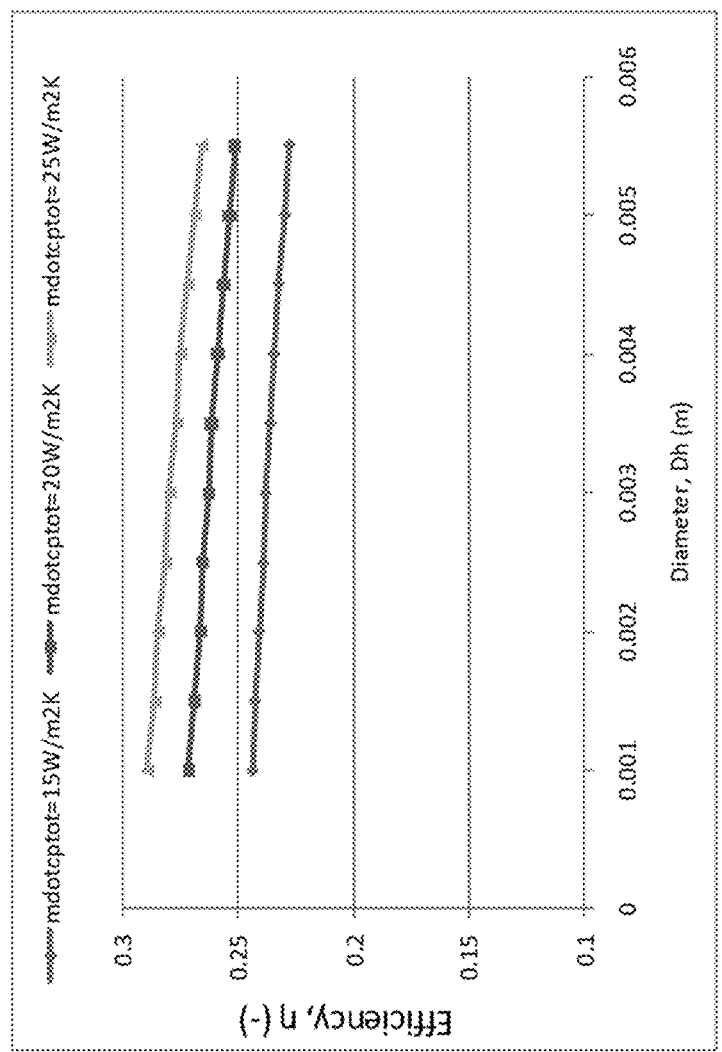
FIG. 18 is a graph providing a comparison of efficiency vs. hole diameter for a constant pitch of 0.025 m and air capacitance ratio of 0.5.
Figure 19:
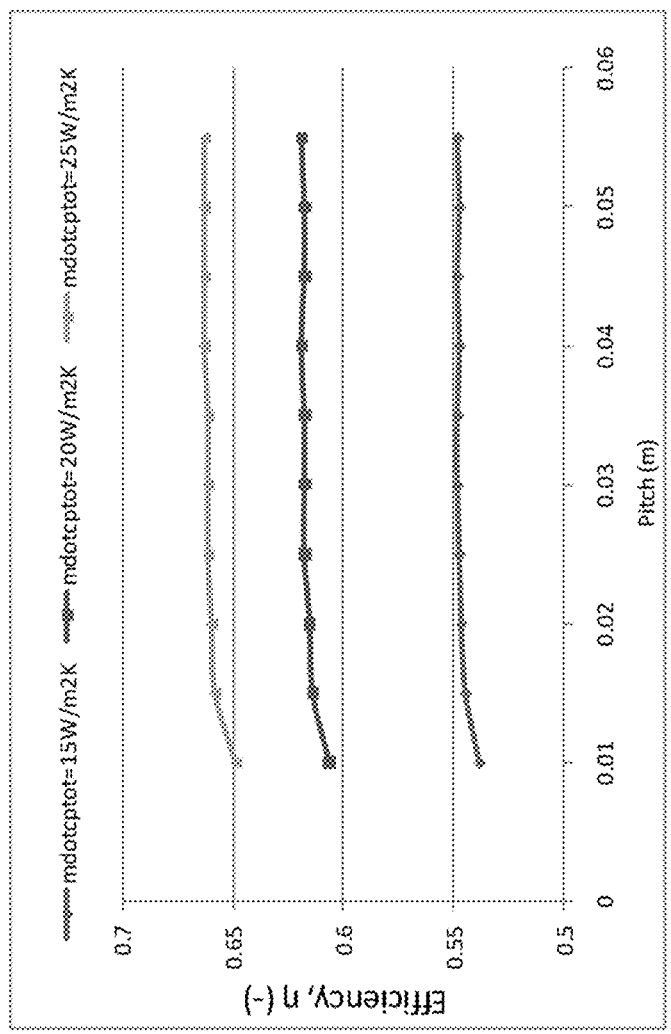
FIG. 19 is a graph providing a comparison of efficiency vs. pitch for a constant hole diameter of 0.00159 m and air capacitance ratio of 0.5.

This range was within the range of values for which equation (54) is valid. The analysis was performed for total capacitance rates of 30, 40 and 50 W/m²K, keeping the air capacitance ratio of 0.5. The results of these analyses are shown in FIG. 18 and FIG. 19 respectively.

Batch 2

Figure 20:
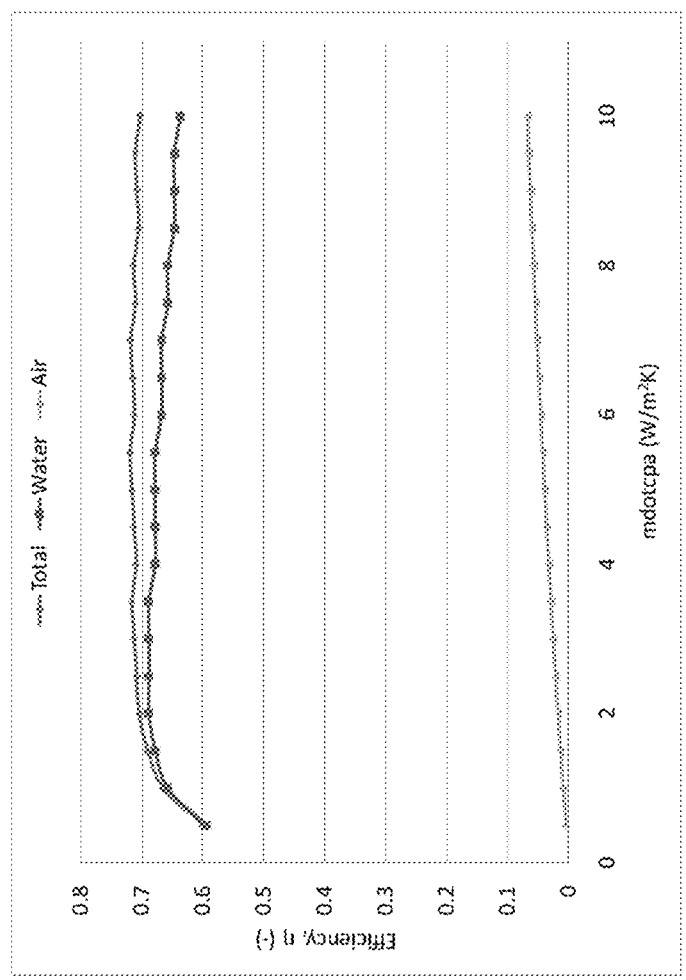
FIG. 20 is a graph providing a comparison of air, water and total thermal efficiencies of the collector with increasing air flow rate at $V_w=1$ m/s, at a constant water flow rate of 0.02 kg/s-m2.
Figure 21:
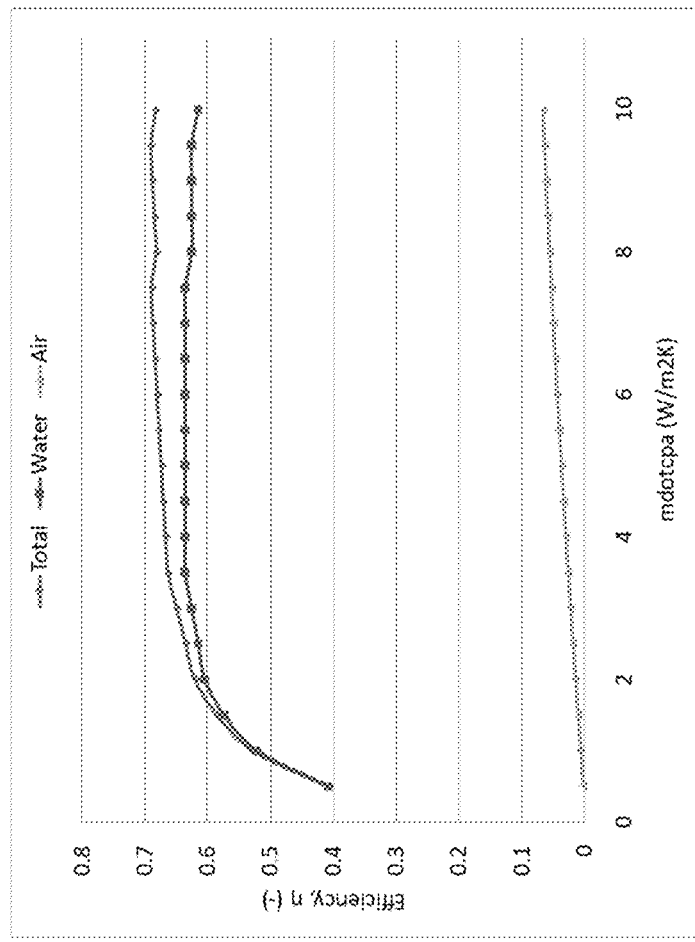
FIG. 21 is a graph providing a comparison of air, water and total thermal efficiencies of the collector with increasing air flow rate at $V_w=3$ m/s.
Figure 22:
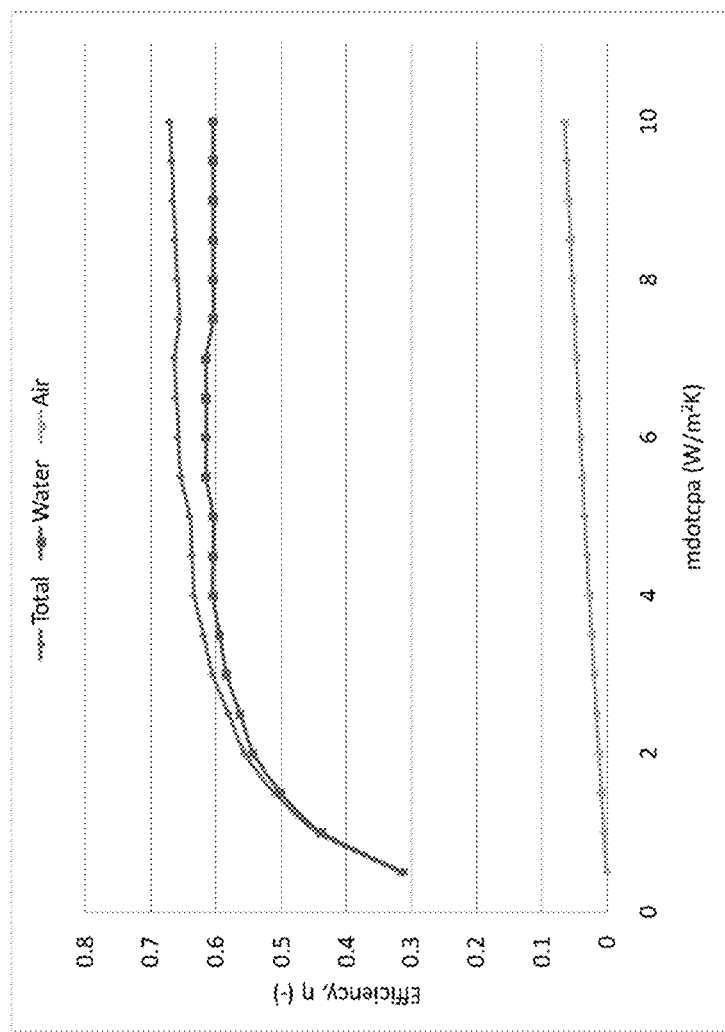
FIG. 22 is a graph providing a comparison of air, water and total thermal efficiencies of the collector with increasing air flow rate at $V_w=5$ m/s.

The sensitivity analyses performed above was for low flow rate applications. In order to compare the LATSC with a conventional flat plate collector, the model was simulated at a water flow rate of 0.02 kg/s-m², which is used for the testing of water heating collectors specified by ASHRAE 93. This amounted to a water thermal capacitance rate of 83.5 W/m²-K. First the optimum air flow rate was determined for maximum heat transfer to the water. For this, the water thermal capacitance rate was kept constant at 83.5 W/m²-K while the air thermal capacitance rate was varied from 0 to 20 W/m²-K for wind speeds of 1 m/s, 3 m/s and 5 m/s. The water heating efficiency, air heating efficiency and total efficiency of the collector with varying air flow rates is shown in FIGS. 20-22.

The air thermal capacitance rates at which the water heating efficiency was maximum was 2.5 W/m²-K, 5 W/m²-K and 6.5 W/m²-K (i.e. $R_{\dot{m}cp}$ in the range of 0.029-0.072) for wind speeds of 1 m/s, 3 m/s and 5 m/s respectively. The collector was then simulated for wind speeds of 1 m/s, 3 m/s and 5 m/s with their respective optimum air flow rates, varying the emissivity of the plate as well as the water inlet temperature. The input parameters for the model were those given in Table 2.1. The values for the inlet water temperature were those given in Table 2.2.

Figure 23:
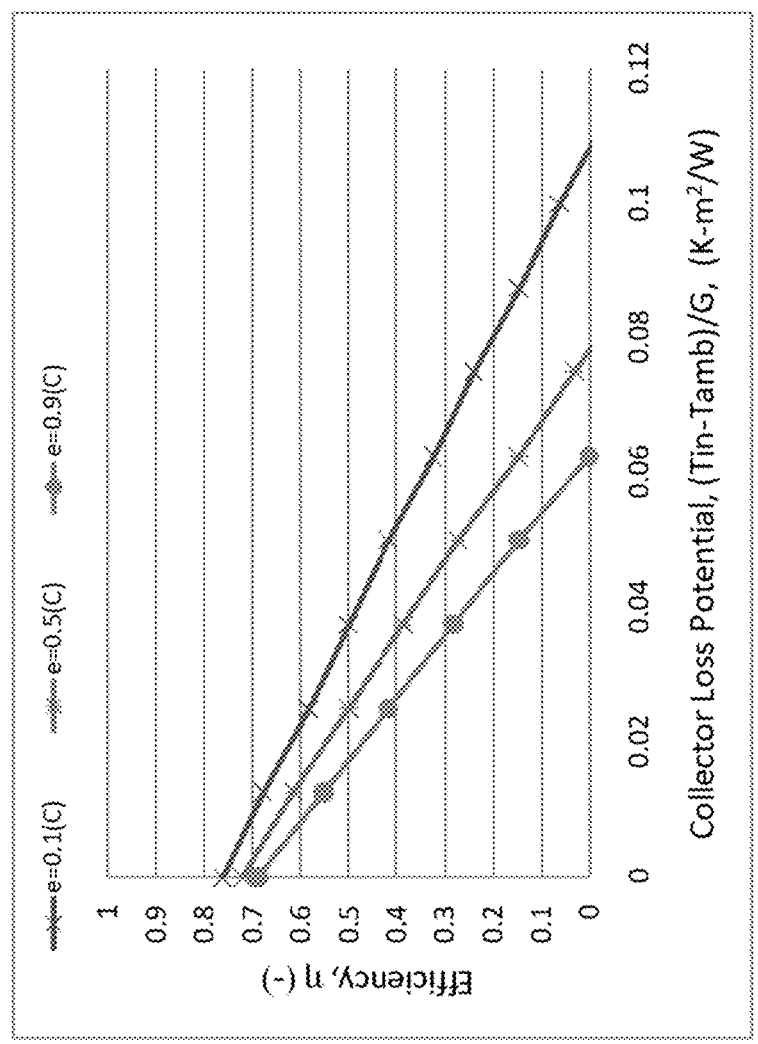
FIG. 23 is a graph providing a comparison of total collector efficiency vs. $\Delta T/G$ at $V_w=1$ m/s.
Figure 24:
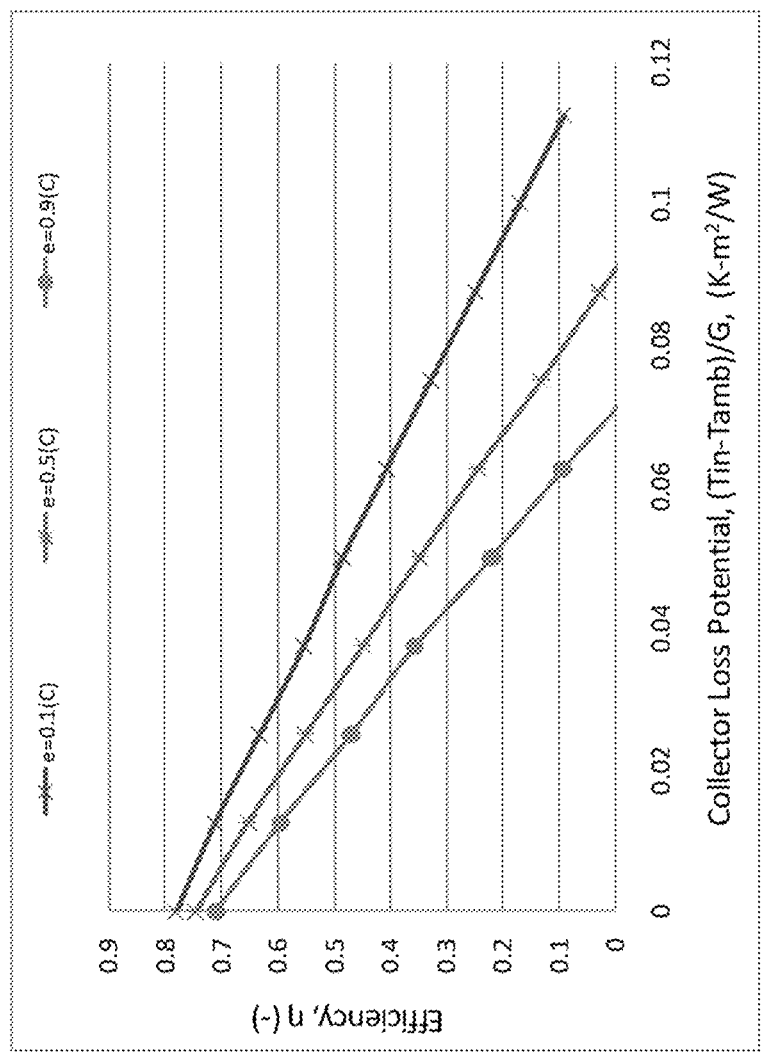
FIG. 24 is a graph providing a comparison of total collector efficiency vs. $\Delta T/G$ at $V_w=3$ m/s.
Figure 25:
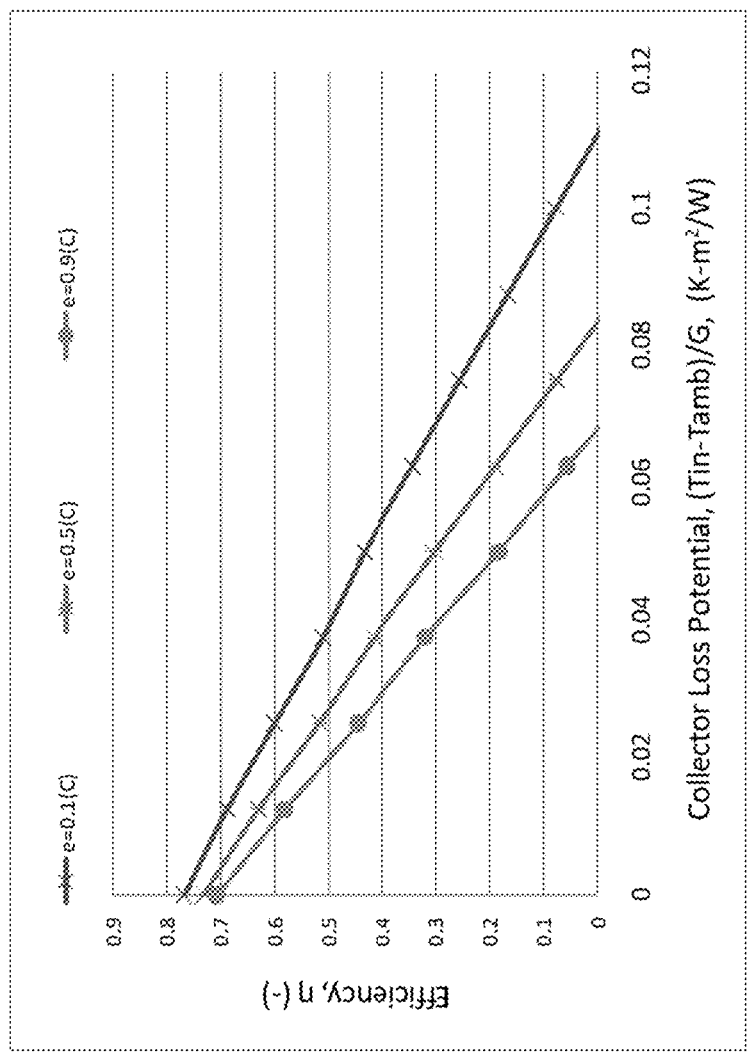
FIG. 25 is a graph providing a comparison of total collector efficiency vs. $\Delta T/G$ at $V_w=5$ m/s.
Figure 26:
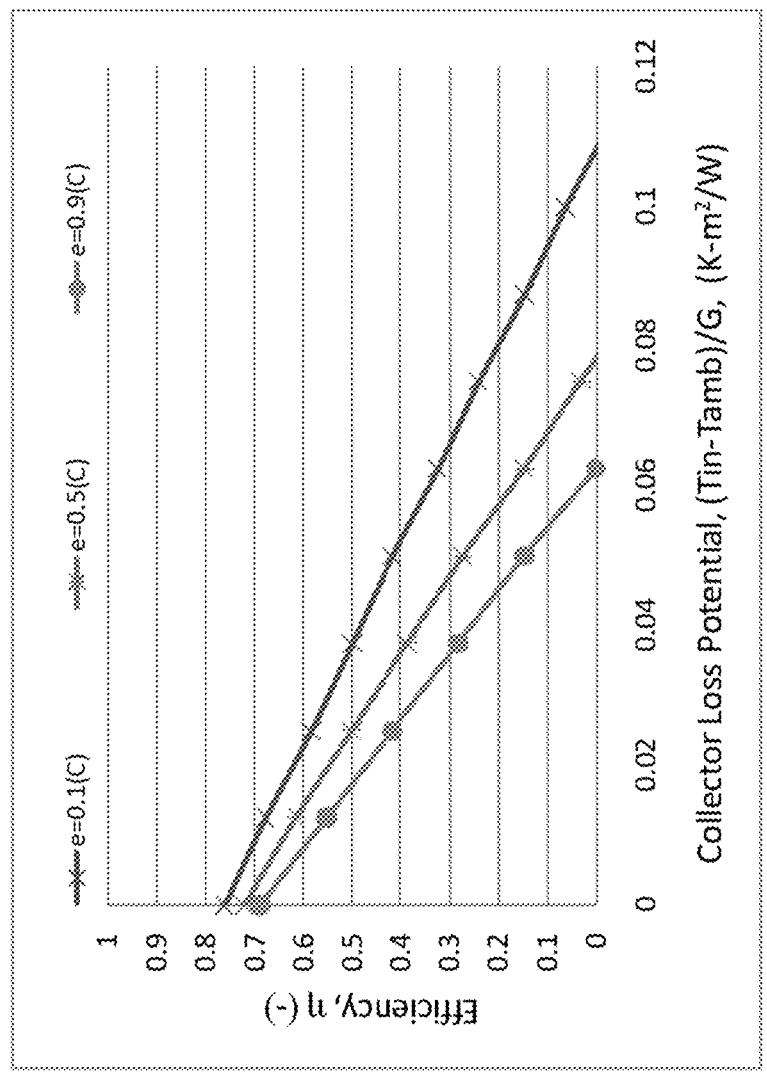
FIG. 26 is a graph providing a comparison of collector water heating efficiency vs. $\Delta T/G$ at $V_w=1$ m/s.
Figure 27:
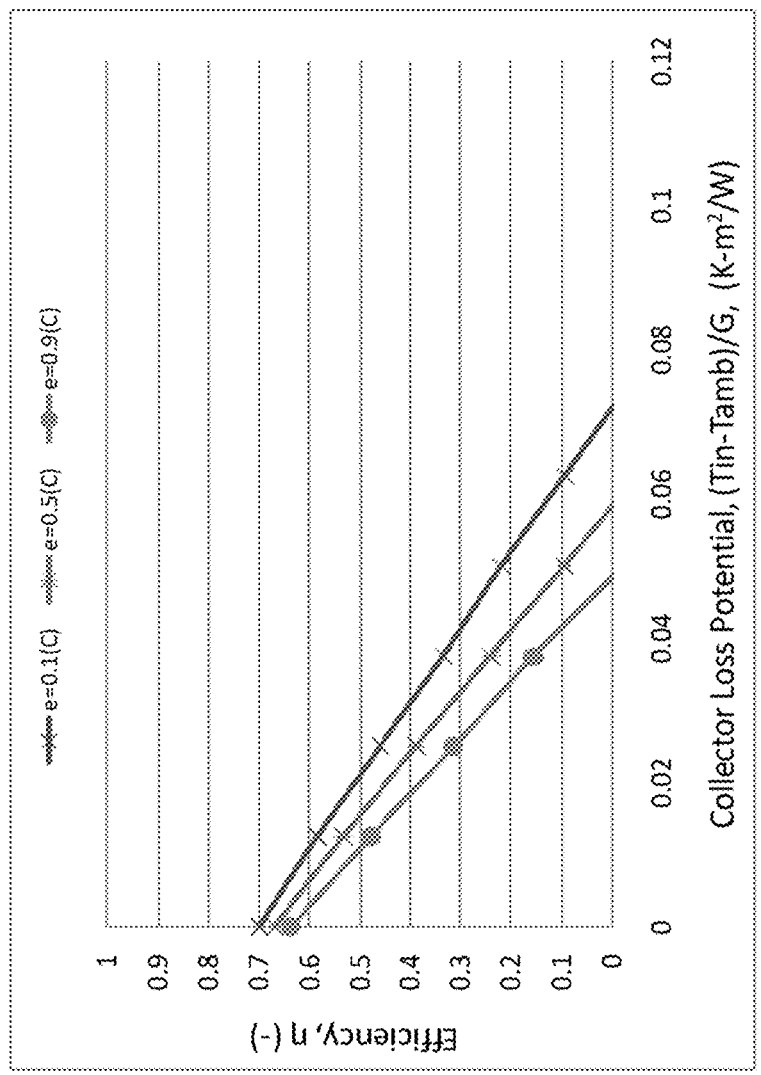
FIG. 27 is a graph providing a comparison of collector water heating efficiency vs. $\Delta T/G$ at $V_w=3$ m/s.
Figure 28:
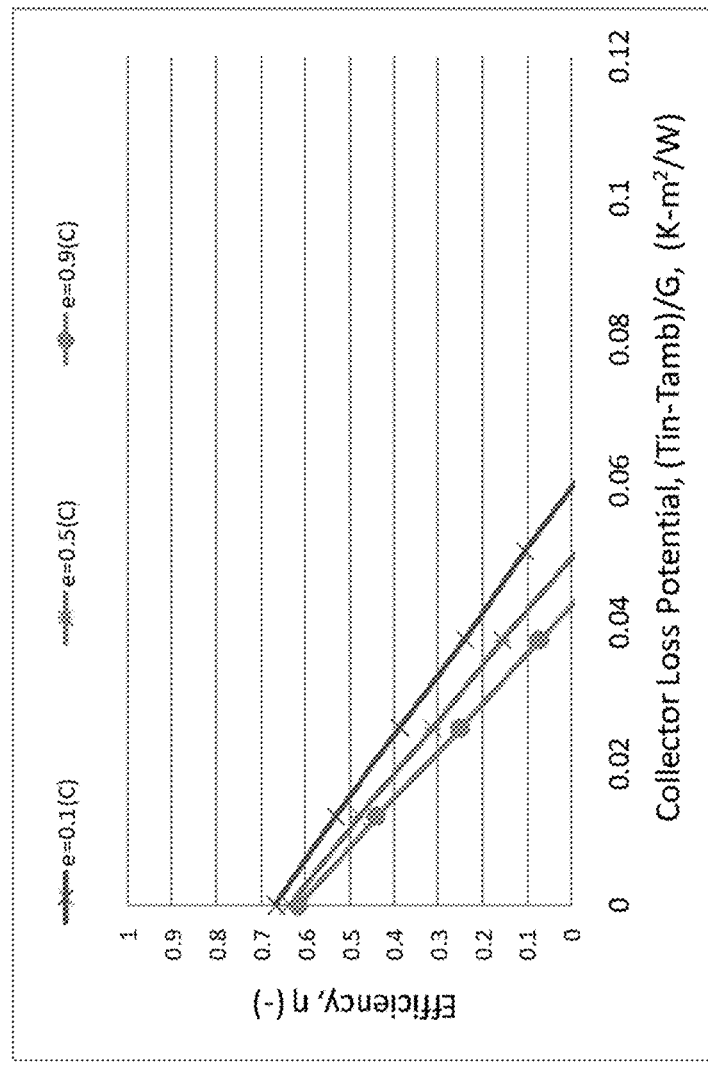
FIG. 28 is a graph providing a comparison of collector water heating efficiency vs. $\Delta T/G$ at $V_w=5$ m/s.
Figure 29:
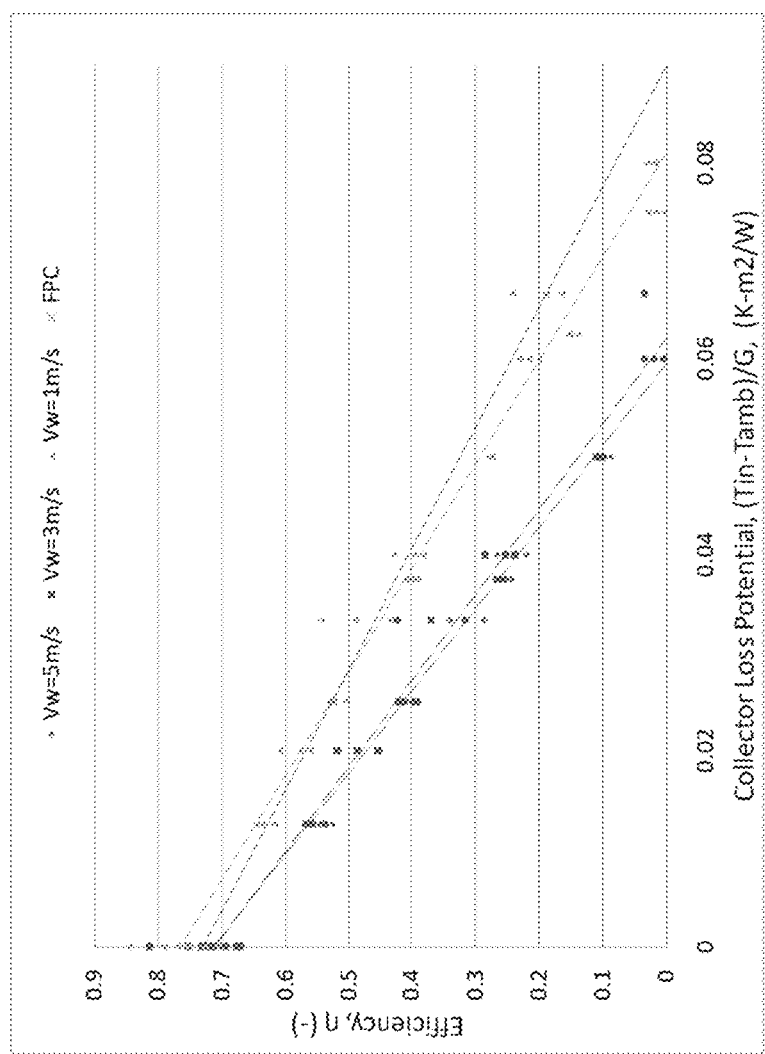
FIG. 29 is a graph providing a comparison of total collector efficiency vs. $\Delta T/G$ with emissivity=0.9.

FIGS. 23-25 show families of curves for the total efficiency of the collector for varying $(T_{in}-T_{amb})/G$ and plate emissivities. FIGS. 26-28 show the water heating efficiency of the LATSC for varying $(T_{in}-T_{amb})/G$ and plate emissivities. Finally a set of performance curves was obtained for wind speeds of 1 m/s, 3 m/s and 5 m/s under varying solar radiation, G, inlet water temperature, $T_{in}$, and ambient temperature, $T_{amb}$. The values of solar radiation, inlet water temperature and ambient air temperature used as inputs to the model are given in Table 2.2. The performance curves for wind speeds of 1 m/s, 3 m/s and 5 m/s are shown in FIG. 29.

Results

The results from the first sensitivity analysis show that the efficiency of the collector was highest when $R_{\dot{m}cp}$ was between 0.5 and 0.6 for both the uncoupled and coupled air heating model. It also shows the general trend of increasing efficiency with increasing $(\dot{m}c_p)_{total}$. Without wishing to be bound by theory, the existence of a maximum efficiency point at an intermediate ratio of air-to-total flow rate may be attributed to circumstances where when $R_{\dot{m}cp}$ increases, convective losses due to wind decrease, leading to an increase in the efficiency of the collector. However, after a certain increase in $R_{\dot{m}cp}$, further increase in the ratio may have very little effect on convective losses. Thus, as the mass flow rate of water decreases, the plate temperature may increase, leading to a relatively rapid increase in radiative losses and, consequently, a decrease in collector efficiency.

The collector may be more efficient overall when heating of air behind the plate is promoted rather than suppressed. However the efficiency difference may not be as large as observed in FIG. 7 and FIG. 8. Thus, with suppression of convective coupling behind the plate (which may be accomplished, for example, by using tiny louvers instead of holes), the collector can be accurately modeled using the uncoupled model. Suppression of convection behind the plate may be useful for heating the water preferentially for the desiccant regeneration applications.

The second sensitivity analysis showed a trend of decreasing efficiency of the collector for all three $R_{\dot{m}cp}$ of 0.1, 0.5 and 0.9 as $(T_i-T_{amb})/G$ was increased (FIGS. 11-13). As the $R_{\dot{m}cp}$ was increased, the decrease in efficiency with increasing $(T_i-T_{amb})/G$ was less steep. Without wishing to be bound by theory, this may be related to increased heat transfer to the air, which enters the collector at ambient temperature, with higher water inlet temperatures. The high flow rate of air through the collector may prevent the plate from heating up too much, corresponding to low plate temperatures, which allows the collector to maintain a high efficiency at high inlet temperatures. This mode may be useful in applications that use more hot air than hot water.

The results from the third sensitivity analysis showed a decrease in the efficiency of the collector as $\Delta T/G$ was increased. The was illustrated by adding a line of best fit to the results obtained from the analysis. Furthermore it was observed that when $R_{\dot{m}cp}$ was low (FIG. 14), the efficiency of the collector was sensitive to the wind speed. Without wishing to be bound by theory, this observation may relate to conditions in which at a low $R_{\dot{m}cp}$, convective losses from the collector were weakly suppressed and thus an increase in the wind speed increased the convective losses, hence decreasing the collector efficiency. It was observed in FIG. 15 ($R_{\dot{m}cp}=0.5$) that the LATSC behaves similar to a glazed collector. Thus, local wind conditions may be considered when applying a similar generalization to lower air capacitance ratios.

From the last sensitivity analysis, it was observed that there was a relatively small, reduction in the efficiency of the collector with increase in pitch and hole diameter. Thus the efficiency of the collector may be sensitive to changes in the pitch and diameter for low porosity absorber plates.

The performance curves obtained for the LATSC in the second batch of sensitivity analysis showed that a single glazed collector may only slightly outperform the LATSC under light wind (1 m/s) in terms of total thermal efficiency. This is depicted in FIG. 29 which compares the performance of a LATSC under light wind (1 m/s) and heavier wind (3 m/s & 5 m/s) with a plate absorber emissivity of 0.9 (non-selective absorber) and a single glazed flat plate collector with a non-selective absorber. The second batch of sensitivity analysis showed trends similar to those seen in the first batch.

Example 3: Experimental Assessment of LATSC

Figure 32:
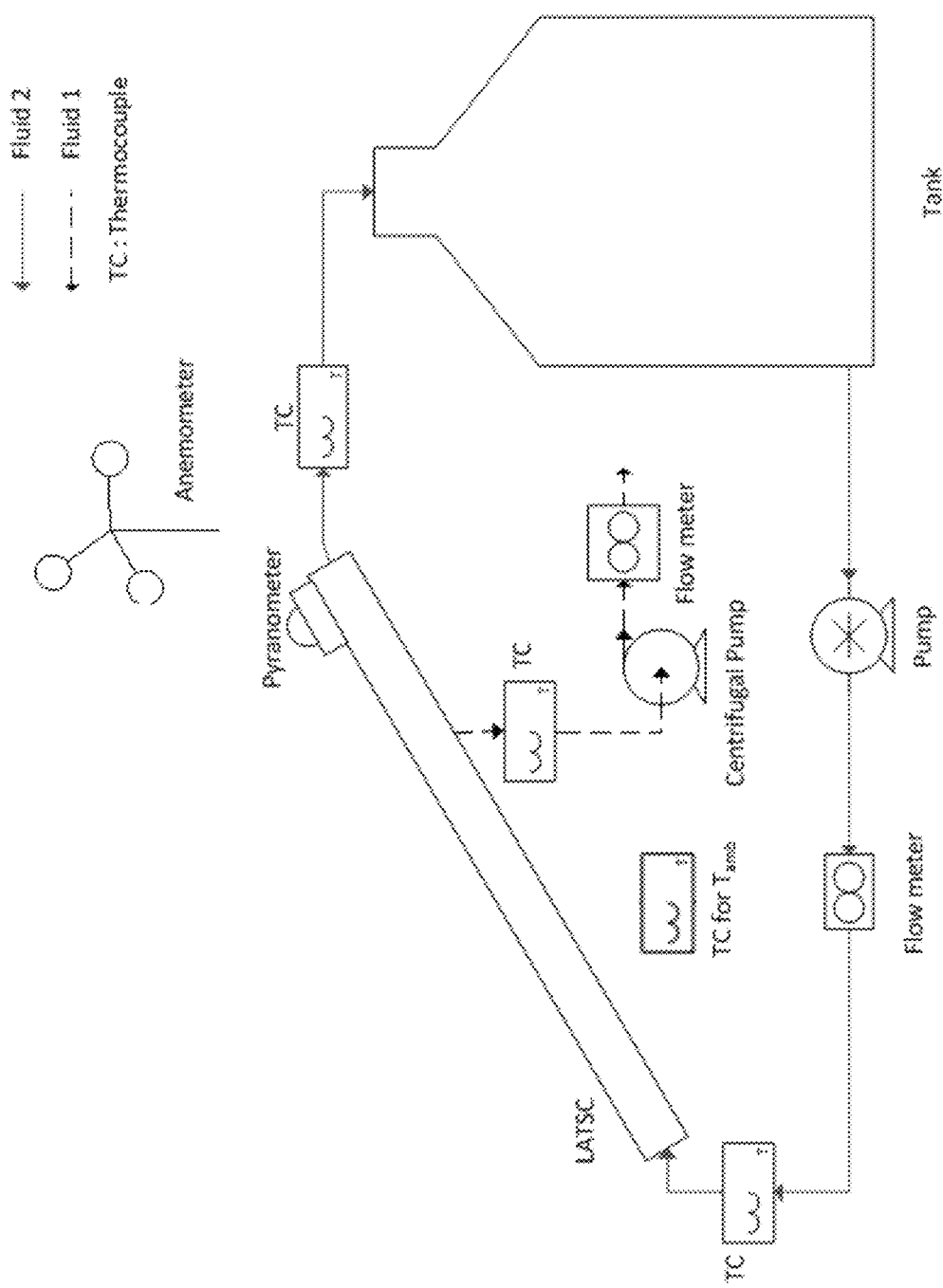
FIG. 32 is a schematic of an example of a LATSC experimental setup.

To further evaluate the model disclosed in Examples 1 and 2, an experiment was conducted to test a LATSC. A LATSC was constructed which comprises a 2 m² flat plate, tube-fin type, collector, as depicted in FIG. 32.

The thermal testing of the collector involved accurate measurement of both the total solar energy incident and the total thermal energy gain of the collector. The solar energy incident was measured by the use of pyranometers and accurate measurement of the collector absorber area. Assessment of the thermal energy gain involved the measurement of the inlet and outlet temperatures of air and water as well as their respective flow rates. The total thermal energy gain of the collector was given by:

$$Q_{u,tot}=[\dot{m}C_p(T_{out}-T_{in})]_a+[\dot{m}C_p(T_{out}-T_{in})]_w \quad (55)$$

The specific heat capacity of water and air were calculated in EES using established property data as a function of temperature and pressure.

The efficiency of the collector was then calculated by:

$$\eta_c = \frac{Q_{u,tot}}{GA} \quad (56)$$

where G was the solar radiation and A was the collector absorber area. The efficiency of the collector was defined as the ratio of the useful energy output in the heating of air and water to the total incident radiation on the collector surface.

Experimental LATSC Apparatus

Frame

A structure was constructed from angle iron bars to support the collector and to provide mounting areas for pyranometers and a data-logger box. In addition, supporting bars to the rig were capable of being adjusted in order to change the tilt of the collector.

Pyranometers

Two Licor pyranometers, one on each side of the collector, were used in order to measure the solar radiation incident on the collector. The Licor pyranometers measured the radiation using a photodiode configured for measuring incident energy of wavelengths in the band gap 400 nm-700 nm. The pyranometers also provided cosine loss correction and have a maximum error of +/−5%.

Flow Meter

The water flow range used for the hybrid collector (the LATSC) testing was 0.1-1.2 liters/min (corresponding to $(\dot{m}C_p)_{tot}=50$ W/m²-K and $(R_{\dot{m}cp}=0.1$-$0.5))$ while the flow rate used for the flat plate collector testing was 2.72 l/min for which a flow meter was used. A flow meter was used that could accurately measure the flow rate in this range. This flow meter was a low flow turbine wheel flow sensor from Omega Engineering. The flow meter was calibrated within the range 0.6 l/min to 1.2 l/min and it was accurate to +/−5%.

Another flow meter was calibrated for the flat plate collector testing and it was accurate to +/−5%.

An additional flow meter was obtained to measure relatively lower flow rates. The flow rates measurable were from 0.27 l/min to 5 l/min with a full scale error of 1%. The multiplier of this flow meter varied linearly with flow rate.

Pressure Transducer

An pressure transducer was procured from Omega Engineering in order to measure the pressure drop across the orifice plates and flow nozzles. The pressure transducer was calibrated to a full scale accuracy of +/−0.2%. The range of measurement of the transducer was from 0-2 in $H_2O$.

Thermocouples

T-type 24 gauge, special limits, thermocouple wires with soldered junctions were used to measure the ambient and air side temperatures along the plate and at the exit. T-type grounded thermocouple (1/16" SS sheath) probes were used to measure the water inlet and outlet temperature. The thermocouple probes were installed with a counter-flow orientation with the flow of water in the pipe to enhance heat transfer and ensure a fast and accurate response to changes in temperature. The thermocouples installed in the water tank to monitor the stratification were T-type (24 gauge).

Orifice Plates and Air Flow Nozzles

Orifice plates and air flow nozzles were used to accurately measure the flow rate of air sucked through the collector. Orifice plates are relatively cheap, and may function with a minimum Reynolds number of 5000. By comparison, air flow nozzles may function with a minimum Reynolds number of 10000. Also, air flow nozzles allow for lower static pressure loss. As a result orifice plates were used for lower flow rates while the flow nozzles were used for higher flow rates. The orifice plates were manufactured locally adhering to ISO 5167 standards while the flow nozzles, of ASME long-radius type, were procured from Helander Metal Corporation. Two orifice plates were used with inner diameters of 30 mm and 40 mm while 2 flow nozzles were used with throat diameters of 25.4 mm and 38.1 mm. A flange assembly was constructed for housing the orifice plates and nozzles and to provide a leak free connection to the pipe.

Air Ducting and piping, Flow Conditioner

A flexible air duct was used to connect the collector air outlet with the fan. A 0.5 in×8.5 in×8.5 in long square duct followed by a square to circular reducer and a 55 mm (ID) PVC pipe were then used to connect the fan outlet to the flange assembly. A flow conditioner was installed at the start of the upstream pipe in order to promote the transition of the flow to laminar and smooth. The PVC pipe upstream of the flange assembly is 0.55 m (10 pipe diameters) long while the pipe downstream is 0.275 m (5 pipe diameters) long.

Fan

A variable speed fan was used to provide the pumping power for air suction through the plate.

Water Circulating Pump

A low speed, low power pump was used for closed cycle circulation of water through the collector. The pump being used was a fixed speed pump and it could not be controlled using the logger. Therefore a manual needle valve was used to control the flow rate of water.

An additional pump was used to mix the water in the tank before tests to ensure a near constant temperature during the test. The flow rate of the pump was 90 l/min and the turnover rate for the 567 (150 gal) tank was 6.7 minutes.

Anemometer

An ultrasonic, solid state, 2-axis anemometer was used to measure the wind speed. The instrument provides wind speed values with an accuracy of +/−2%.

Instrumentation

Data Logger

The data logger used for the experiment was a CR1000 from Campbell Scientific. The data logger provided 8 differential voltage channels, 2 pulse channels as well as control and excitation ports to allow control of instruments. The data logger was programmed using Loggernet CRBasic compiler. The scan time for the data was 1 second while the average scanned data was recorded every 30 seconds. The data logger was powered by a 12V Dc power supply. Electrically conducting parts of the setup (copper pipes, collector body) were grounded to the data logger ground lug.

Multiplexer

The number of thermocouples installed exceeded the differential channels available on the data logger required the use of a thermocouple multiplexer to provide additional channels. For this an AM25T Solid State Thermocouple Multiplexer from Campbell Scientific was used to connect all the thermocouples to the logger. The multiplexer was powered through the 12V power outlet port on the data logger and its isothermal terminal block sensor is accurate to +/−0.1K.

Real Time Monitoring

Real time monitoring was used to monitor the functionality of all the sensors during the individual tests and to monitor the air and water flow rates for any fluctuations from the desired flow rate of testing. A long serial cable with two short haul modems was used to transmit the data from the data logger to the workstation indoors. The band rate of the logger was limited to 9600 due to the long serial cable.

Testing

Flat Plate Collector Testing

A flat plate collector testing was performed with certain parameters being consistent with ASHRAE 93 specified standards. A summary of the test conditions and parameters are given in Table 3.1.

TABLE 3.1

ASHRAE 93 specified test parameters

| Parameter | Guideline | |
| --- | --- | --- |
| Solar radiation | Min: 800 W/m², | Max variation: +/−50 W/m² |
| Wind Speed | 2-4 m/s | |
| Water flow rate | 0.2 kg/sm² | Max variation: +/−1% |
| Inlet temperature | Variation +/− 0.1 K | |

Figure 30:
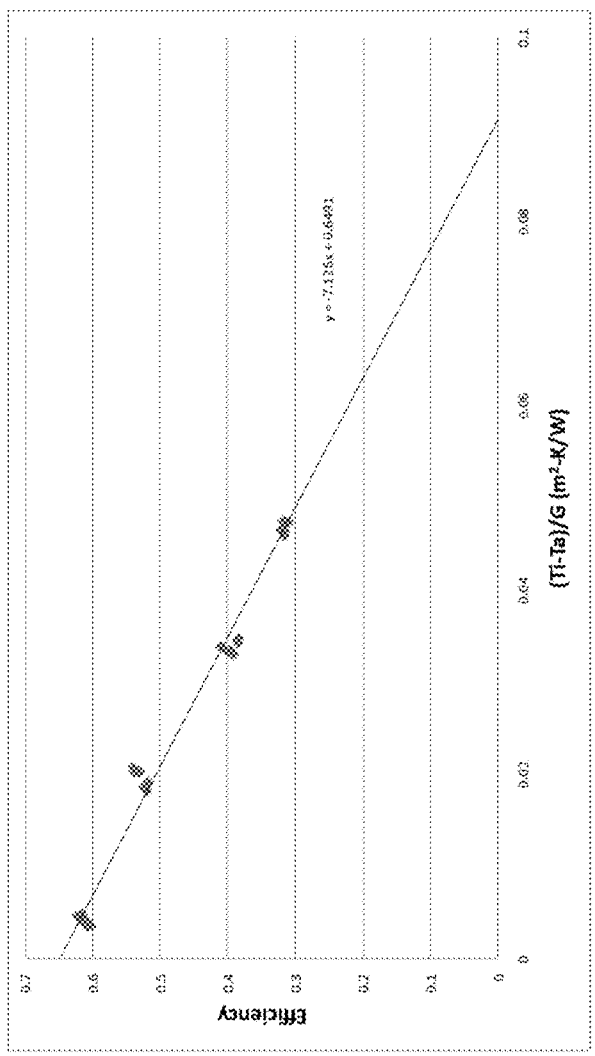
FIG. 30 is a graph providing a comparison of collector efficiency vs Loss Potential $(T_i-T_a)/G$.

The collector was tested for performance indicators, such as efficiency and incident angle modifier. The collector efficiency was measured at different values of $(T_{in}-T_{amb})/G$ which was modulated in part by adjusting the inlet temperature. The collector was tested with at least 4 different equally spaced inlet temperatures. The inlet temperatures that were used in the testing were: 30° C., 45° C., 60° C. and 70° C. The inlet and outlet water temperatures, solar radiation, wind speed and water flow rate were recorded for these tests. The efficiency of the collector was calculated by using equations 1 and 2 where the air thermal component is zero. The standard plot for efficiency vs. $(T_{in}-T_{amb})/G$ is shown in FIG. 30. The plot above displays the equation of the line of best fit for the test points. This equation is representative of:

$$\eta = F_R(\tau\alpha)_{avg} - F_R U_l \left(\frac{T_{in} - T_{amb}}{G}\right) \quad (57)$$

The glazing of the flat plate collector is made of low iron glass. Using the equation of the line of best fit, the values of $F_R$ and $U_1$ were calculated to be:

$$F_R = 0.791 \tag{5}$$

$$U_1 = 9.009 \text{ W/m}^2\text{K}$$

Figure 31:
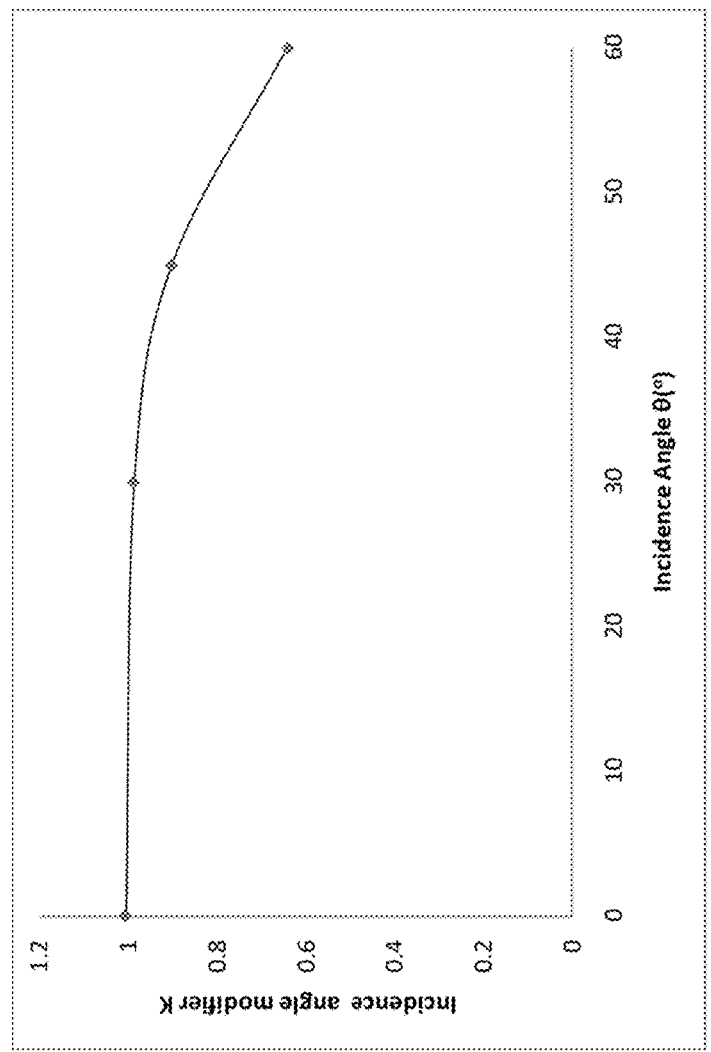
FIG. 31 is a graph providing a comparison of incidence angle modifier vs incidence angle for flat plate collector.

An incident angle modifier (IAM) test was performed on the flat plate collector to determine the effect of the change in the incident angle of the solar radiation on the performance of the collector. The glass cover on the collector has an absorptivity and transmissivity which depends on the incident angle and is the major cause of the degradation in efficiency at higher incident angles. In accordance with ASHRAE 93, the collector was tested at different times of the day when incident angles to the collector were 0, 30°, 45° and 60°. FIG. 31 shows the incidence angle modifier vs incidence angle relationship for the flat plate collector.

LATSC Testing

A test procedure was devised whereby the solar radiation and inlet water temperature guidelines were adhered to as in ASHRAE 93 for water collectors, while the water and air flow rates were established according to the total thermal capacitance and air capacitance ratio. A total thermal capacitance of 25 W/m²K was used for the testing of the collector with air capacitance ratios from 0.1-0.5. Higher ratios could be obtained using a different water flow meter and air fan. The experimental setup of the LATSC is shown in FIG. 32.

Figure 33A:
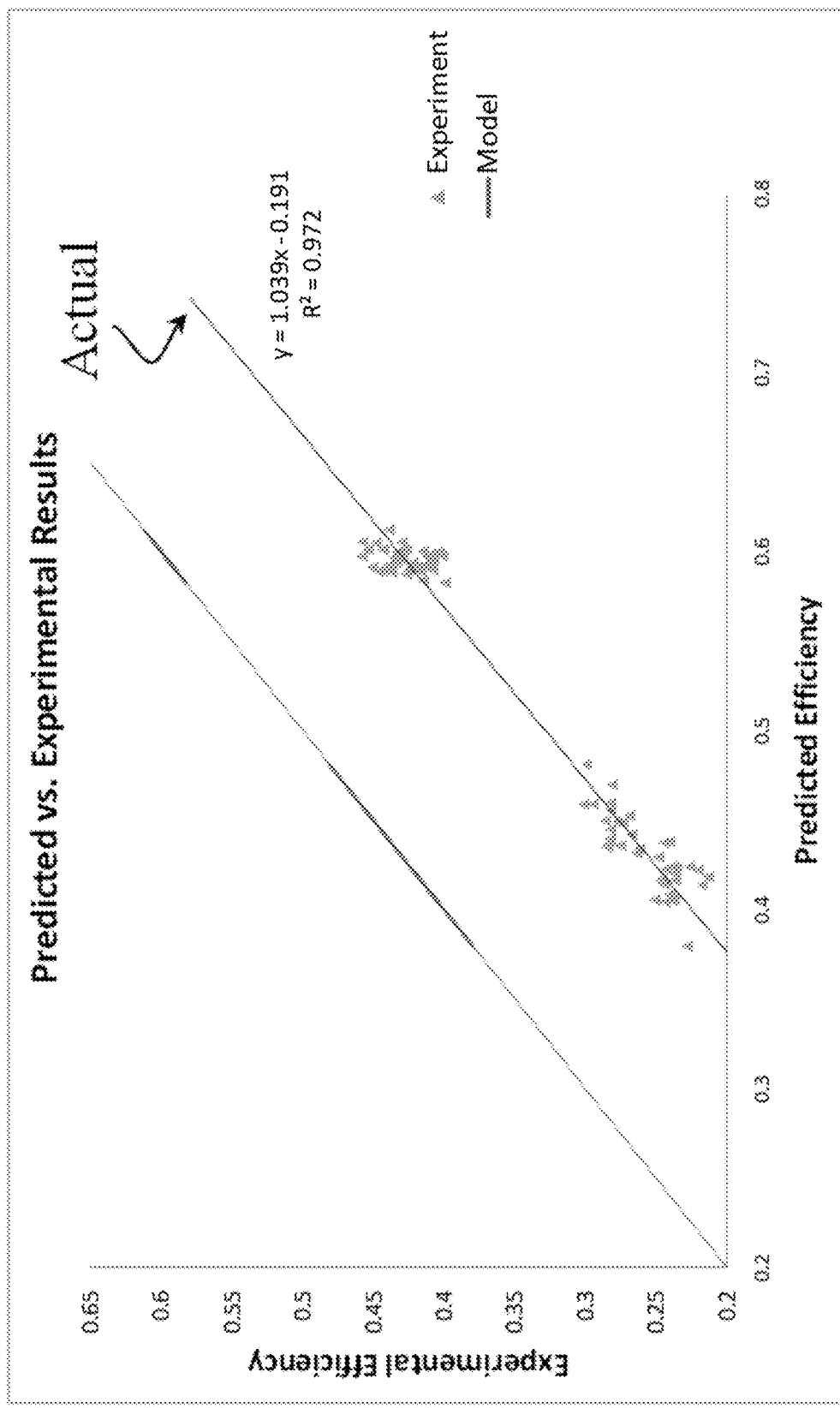
FIG. 33A is a graph providing a comparison of predicted vs experimental efficiency.
Figure 33B:
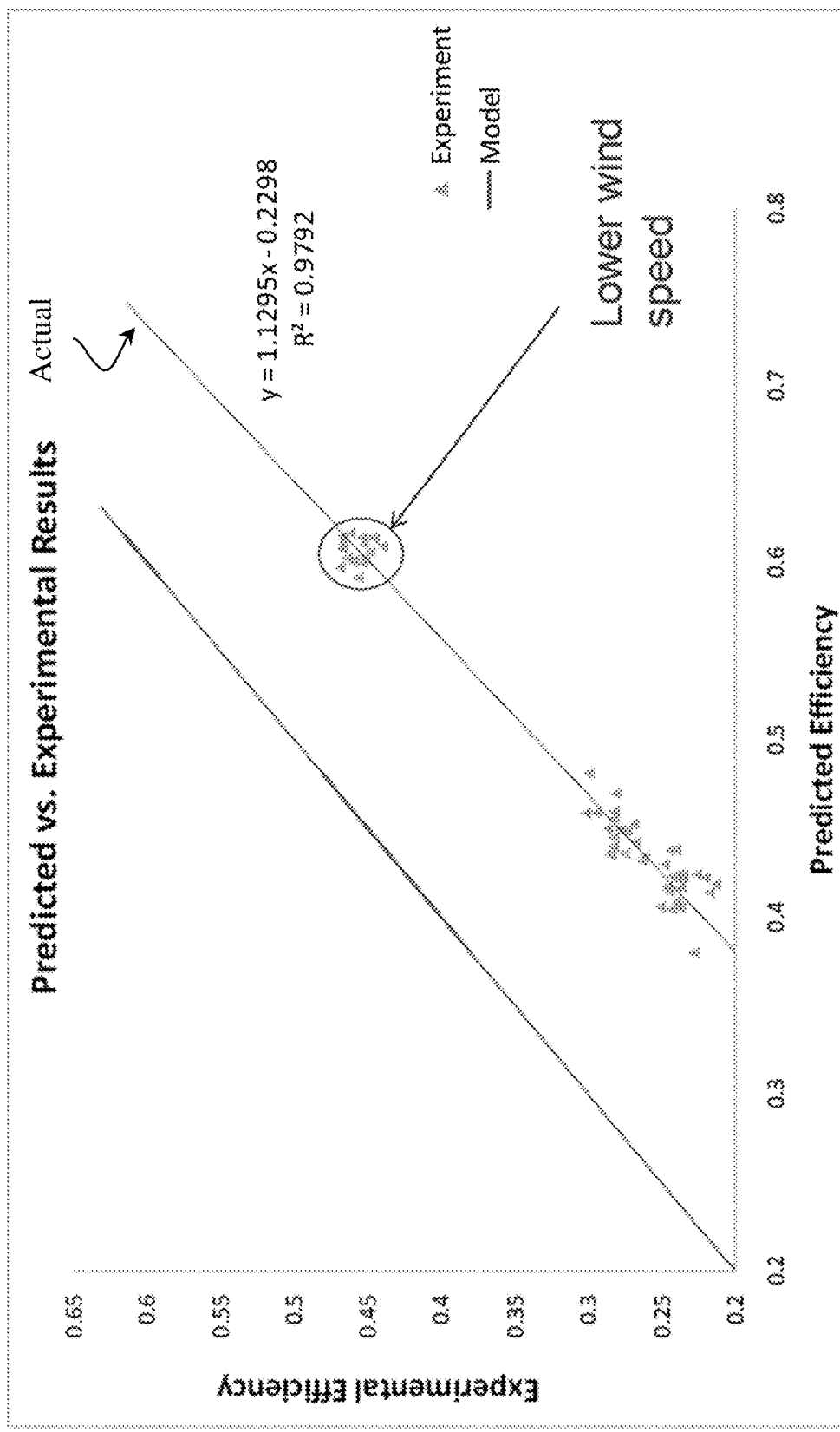
FIG. 33B is a graph providing a comparison of predicted vs experimental efficiency.

The collector was tested at $T_{in}$ close to ambient and also for a higher inlet temperature of about 60° C. The water was heated by a heating element in the tank. Additionally, the collector was tested at different times of the day for the performance of the collector with changes in the incident angle. Using the ambient conditions and air and water temperatures and flow rate data measured from the experimental setup as input to the LATSC model, expected values for the efficiency of the collector were obtained and compared with the empirical efficiency of the collector. The model and predicted efficiency of the collector are shown in FIGS. 33A and 33B. A line of best fit was drawn through the points which allow a comparison between the modeled efficiency with the experimental efficiency. The data points that were used in the above plot are for wind speeds in the range of 3-4 m/s, as shown in FIG. 33A.

When additional points were added which were recorded at lower wind speeds (1-2 m/s), the difference between the modeled efficiency and the experimental efficiency decreased. This is shown by the increase in the slope of the line of best fit through the data points. At lower wind speeds, the starting length of the thermal boundary layer is smaller and therefore there is less an effect on the experimental efficiency due to the starting length, as shown in FIG. 33B.

The performance of the LATSC was also measured at different incident angles of direct solar radiation. The testing procedure for the LATSC was identical to that for the flat plate collector. The method of computing the IAM was such that the efficiency of the LATSC was first calculated for the experimental results using equations (55 & 56). Then the theoretical efficiency of the collector was calculated for solar radiation incident normal to the collector using the numerical model developed in Examples 1-2. The difference between the two efficiencies was then subtracted from 1 to give the absolute IAM of the collector for particular incidence angle to the model efficiency.

$$\text{IAM}_{abs} = 1 - (\eta_{th,n} - \eta_{exp}) \tag{58}$$

The relative IAM was then obtained by normalizing the absolute deviation with the maximum absolute IAM. A sample calculation of the incidence angle modifier is shown in Table 3.2.

Note that the performance drop with $\theta$ is less for the LATSC than for the flat plate collector at least in part because the $\tau\alpha$ losses of the cover glass was not present.

TABLE 3.2

Method of Calculation of IAM

| Model Efficiency ($\eta_{th,n}$) | Experimental Efficiency ($\eta_{exp}$) | Efficiency Difference ($\Delta\eta$) | Absolute IAM = $1 - \Delta\eta$ | Relative IAM = $(1 - \Delta\eta)/$ $\max(1 - \Delta\eta)$ |
|---|---|---|---|---|
| 0.093740962 | 0.374277 | 0.280536 | 0.719464 | 0.91465 |
| 0.093295903 | 0.396642 | 0.303346 | 0.696654 | 0.885652 |
| 0.094637698 | 0.393612 | 0.298975 | 0.701025 | 0.891209 |
| 0.104737912 | 0.373869 | 0.269131 | 0.730869 | 0.92915 |
| 0.118671215 | 0.369189 | 0.250518 | 0.749482 | 0.952812 |
| 0.253054316 | 0.466454 | 0.2134 | 0.7866 | 1 |

Figure 34:
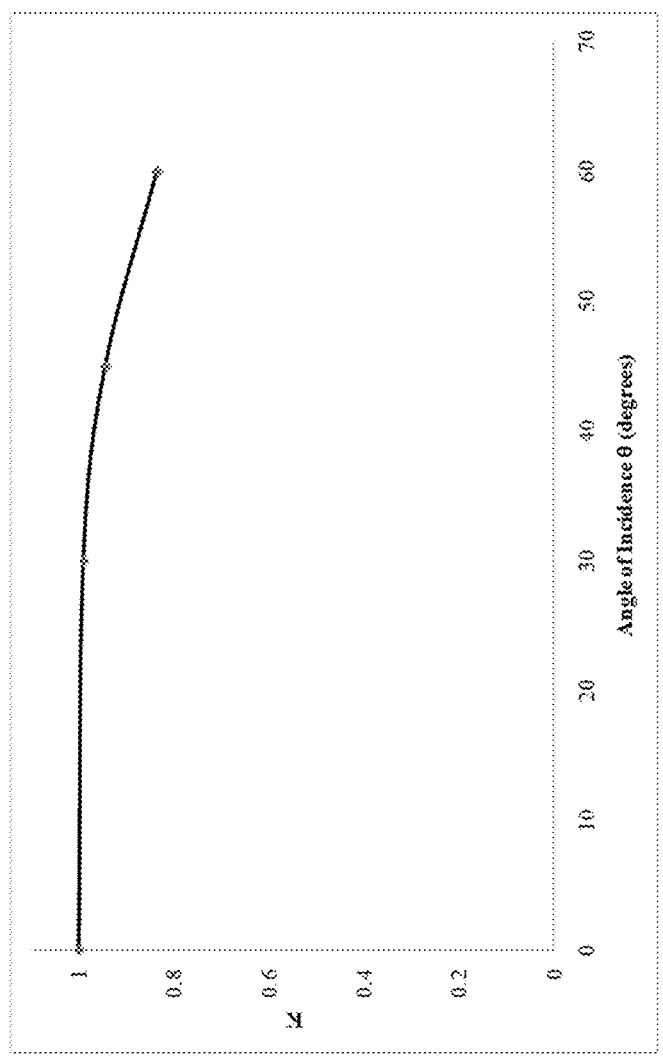
FIG. 34 is a graph providing a comparison of incidence angle modifier vs incidence angle for a LATSC.

The IAM vs incidence angle relationship for the LATSC is shown in FIG. 34.

The measurement system consists of all the sensors and the data acquisition system. Table 3.3 lists the certain parameters associated with each of the measurement instruments.

TABLE 3.3

Instrument Parameters

| Measurement Instrument | Make/Model # | Accuracy/Error (%) |
|---|---|---|
| T-type thermocouple | Omega T-type 24 gauge | +/−(0.1o C. + 0.5%) |
| Pressure transducer | Omega | +/−0.2% Full scale |
| Flow meter | Omega FPR 300 | +/−1% Full scale |
| Pyranometer | Licor LI-200 | +/−5% |
| Orifice Plates | 30 mm & 40 mm inner diameter | +/−5% |
| Air Flow Nozzles | 25.4 mm & 38.1 mm throat diameter | +/−3% |
| 2-D Wind Sensor | Gill WindSonic 2-Axis Ultrasonic Anemometer | +/−2% (at 12 m/s) |

Starting Length

The starting length is given by:

$$L_s \approx \frac{V_w v_a}{V_s^2} \tag{59}$$

The effect of wind speed and suction velocity on the starting length is given in Table 3.4. For this calculation the fluid properties are evaluated at an ambient temperature of 25° C.

TABLE 3.4

Starting lengths in meters for different wind speeds and suction velocity

| Suction velocity(m/s) | Wind Speed (m/s) | | |
|---|---|---|---|
| | 1 | 3 | 5 |
| 0.0189 ($\dot{m}_a c_{pa}$ = 45) | 0.0321 | 0.09363 | 0.1561 |
| 0.006303 ($\dot{m}_a c_{pa}$ = 15) | 0.2809 | 0.8427 | 1.404 |
| 0.0012606 ($\dot{m}_a c_{pa}$ = 3) | 7.022 | 21.07 | 35.11 |

As can be seen in Table 3.4, the starting lengths vary from 0.0321 m (3% of collector width) for low wind speed and high suction velocity to 35.11 m (3511% of collector width) for high wind speed and low suction velocity. Starting length is related with suction velocity.

Differences between theoretical and actual efficiencies that are associated with starting length can be reduced, for example, by using a larger collector and/or by testing in light wind conditions.

Example 4: Liquid Desiccant Regenerator Model

A liquid desiccant regenerator (LDR) model was developed to test the performance of the LATSC as a thermal energy supply source in a desiccant regenerator application. In this regard, a model was built based in part on the following parameters:
1. Steady state operation of the LDR
2. Enthalpy of dilution neglected due to a very small amount of water added/reduced from each control volume
3. Laminar, non wavy, fully wetted flow of liquid desiccant over parallel plate
4. Constant properties of air, water and desiccant in a control volume
5. Fully mixed desiccant film (no thermal gradient, no concentration gradient in x-direction)

However, it should be appreciated that combination LATSC-LDR systems, or other systems disclosed herein that comprise a LATSC, are not intended to be limited based on these parameters. An aim of this LDR model was to allow for the integration of the LATSC with a LDR and determine optimum total thermal capacitance rate, $(\dot{m}C_p)_{tot}$ and ratio, $R_{\dot{m}c_p}$ for a given $\dot{m}_d$. This allowed for confirmation of the usefulness of the LATSC for liquid desiccant regeneration applications.

Figure 35:
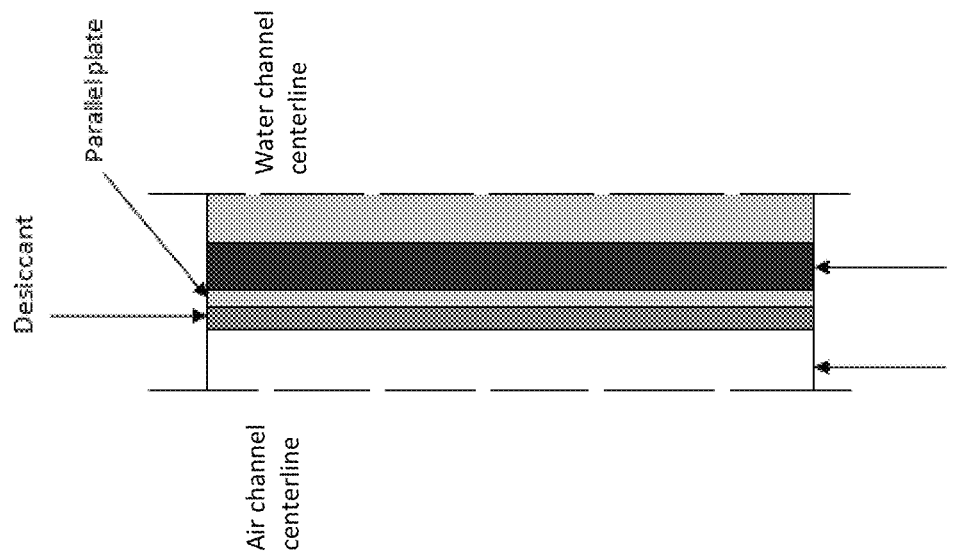
FIG. 35 is a schematic side cross-sectional view of an exemplary LDR

The following LDRs were considered the spray cooled type, packed bed type and falling film type, any one of which could be configured for use with the LATSC. The three differ in part based on their mode of air to desiccant contact. The falling film type model was developed in part because it has the potential to operate with close approach temperatures and high thermodynamic efficiencies. It was configured for internal heating of the desiccant by hot water and simultaneous regeneration of the desiccant by contact with hot air, providing the opportunity for the use of both heated air and water from the LATSC. The schematic of the LDR model is shown in FIG. 35.

The model regenerator consisted of many parallel plates which contain internal channels through which the hot water flows from top to bottom. The regenerator was of a type in which desiccant is sprayed uniformly at the top of the regenerator plate and flows down the air side of the plate as a thin film, and air is injected from the bottom and moves towards the top giving the LDR a counter flow configuration. According to the model, there existed a plane of symmetry at the center of each air-side and water-side channel about which symmetry of physical properties and chemical composition of the water, air and desiccant were encountered in the negative and positive x-direction. Therefore one side of the line of symmetry was evaluated while performing the thermal and chemical analysis on the LDR.

Figure 36:
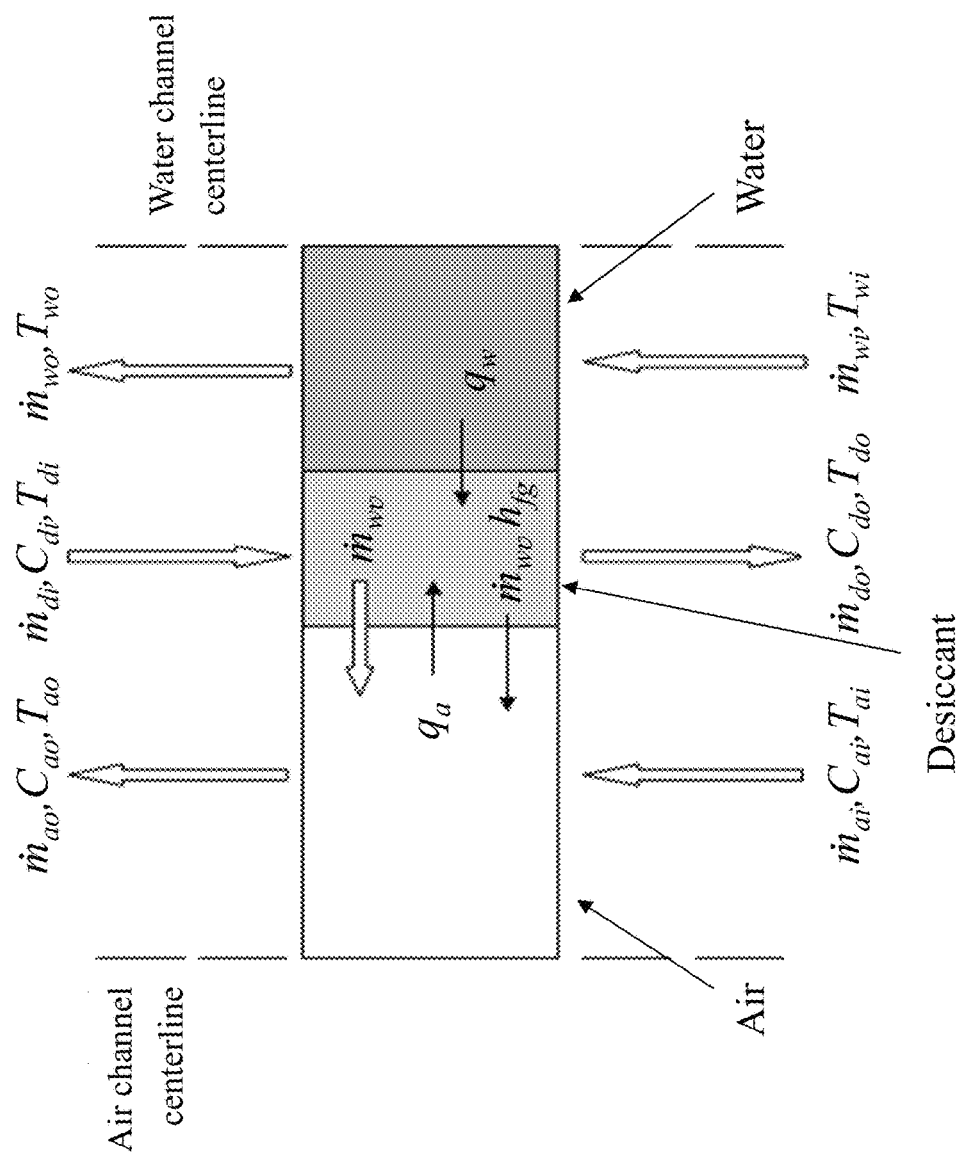
FIG. 36 provides a depiction of heat and mass balance on a differential element of an LDR.

A heat and mass balance is first performed on a control volume of the regenerator shown in FIG. 36.

The three mass balance equations obtained were:
for the air:

$$\dot{m}_{ao} = \dot{m}_{ai} + \dot{m}_{wv} \quad (60)$$

for the desiccant:

$$\dot{m}_{do} = \dot{m}_{di} + \dot{m}_{wv} \quad (61)$$

and for the water:

$$\dot{m}_{wo} = \dot{m}_{wi} \quad (62)$$

where the mass of air is composed of dry air and moisture:

$$\dot{m}_a = \dot{m}_{da} + \dot{m}_{da}\omega \quad (63)$$

Similarly the desiccant solution contains desiccant salt and water:

$$\dot{m}_d = \dot{m}_{ds} + \dot{m}_{wd} \quad (64)$$

The concentrations of water in air and in the desiccant can also be obtained.

The air humidity was:

$$C_{ao} = \frac{c_{ai}\dot{m}_{ai} + \dot{m}_{wv}}{\dot{m}_{ao}} \quad (65)$$

and the desiccant concentration was:

$$C_{do} = \frac{c_{di}\dot{m}_{di} - \dot{m}_{wv}}{\dot{m}_{do}} \quad (66)$$

Energy balances were given for the air, water and desiccant elements.

$$\dot{m}_{da,o}c_{pdao}T_{ao} + (\dot{m}_{da,i}\omega + \dot{m}_{wv})c_{pwv}T_{ao} = \dot{m}_{dai}(c_{pda,i} + \omega c_{pwv})T_{ai} - q_a + \dot{m}_{wv}c_{pwv}T_{di} \quad (67)$$

Equation (67) provides that the airstream enthalpy out of the regenerator equals the airstream enthalpy in, plus the enthalpy of vapor form the desiccant, minus heat transferred to the desiccant stream.

$$\dot{m}_{do}c_{pdo}T_{do} = \dot{m}_{di}c_{pdi}T_{di} + q_a + q_w - \dot{m}_{wv}h_{fg} \quad (68)$$

Equation (68) provides that the change in the desiccant solution enthalpy was proportional to the sum of heat gains from the air and water, minus the enthalpy of evaporation of the moisture rejected to the airstream.

$$\dot{m}_{wo}c_{pwo}T_{wo} = \dot{m}_{wi}c_{pwo}T_{wo} - q_w \quad (69)$$

Equation (69) provides that the change in water temperatures was proportional to the heat transferred to the desiccant stream.

The correlation for heat transfer from air to the desiccant was developed based on a laminar, fully developed flow of air between the two parallel plates. The temperature of the plate at each element was constant for which the Nusselt number ($Nu_a$) is 7.54.

Similarly, in the case of the heat transfer from the water to the desiccant it was considered that the water flow in the channel in the plate was fully developed and laminar while the temperature of the plate at each element was assumed constant. The Nusselt number for the heat transfer from the water to the desiccant ($Nu_w$) is also 7.54.

Convection rates at the air-desiccant interface, $q_a$, and water-desiccant interface, $q_w$, are given by:

$$q_a = h_a(T_{ai} - T_{di})Wdy \tag{70}$$

where $$h_a = \frac{Nu_a k_a}{D_{h,a}} \tag{71}$$

and $$q_w = h_w(T_{wi} - T_{di})Wdy \tag{72}$$

where $$h_w = \frac{Nu_w k_a}{D_{h,w}} \tag{73}$$

Where the $D_{h,a}$ $D_{h,w}$ are the hydraulic diameters of the channels through which the air and water flow.

A mass transfer coefficient for water vapor transfer to the air stream was determined using the Chilton-Colburn analogy:

$$h_m = \frac{h_a}{\rho_a c_{pa}} \left( \frac{\alpha_a}{D_{a,wv}} \right) \tag{74}$$

The water vapor mass transfer for each element was determined according to the following equation:

$$\dot{m}_{wv} = h_m \rho_a (C_{int} - C_{ai}) \tag{75}$$

$C_{int}$ is the equilibrium water vapor concentration at the air-desiccant interface while $C_{ai}$ is the water vapor pressure in the inlet air. The desiccant used for the regenerator analysis was lithium chloride and the known properties of a desiccant-water solution were used. The properties of air and air-water mixtures built in to EES were used.

Solving Procedure

Figure 37:
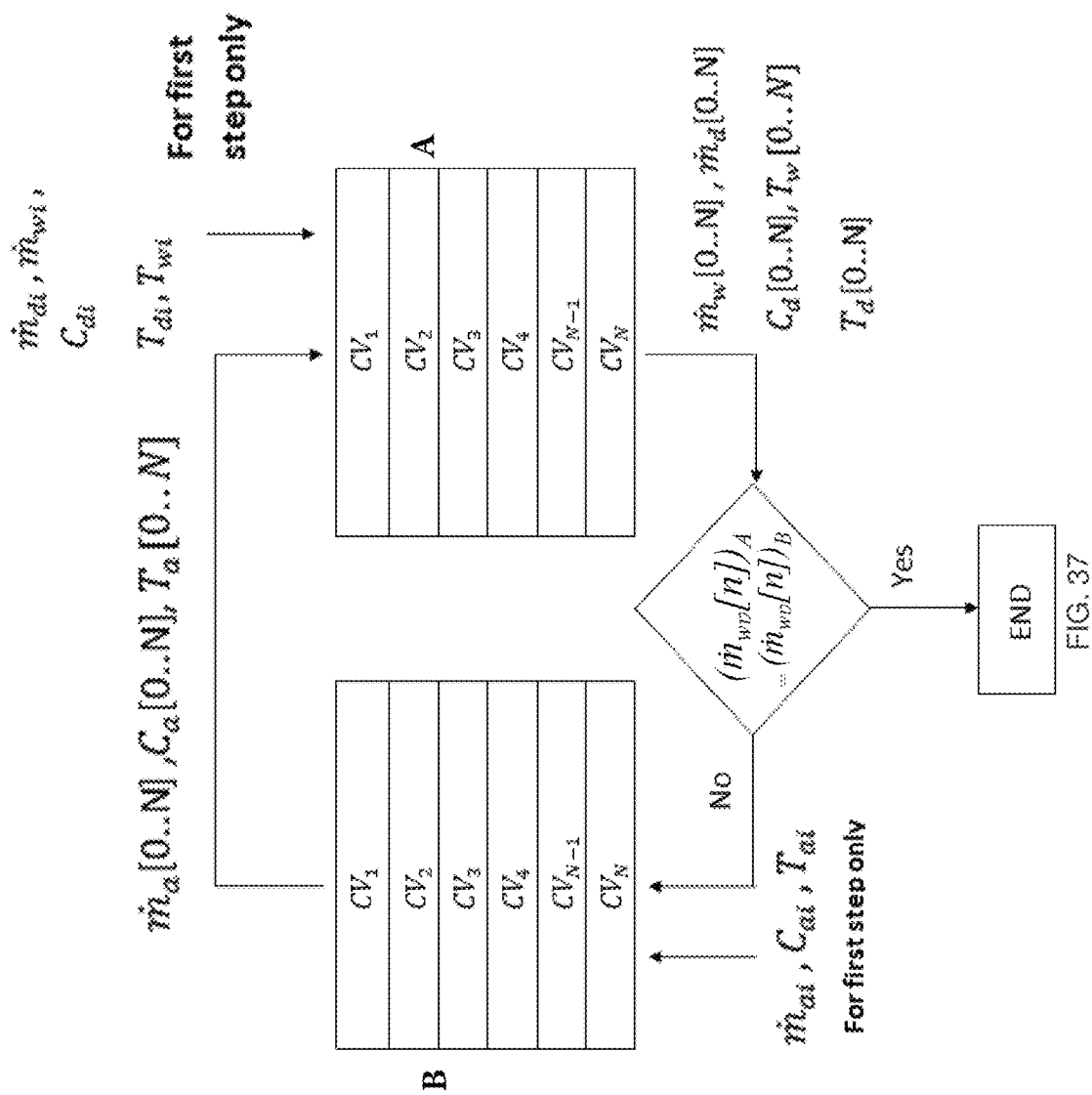
FIG. 37 is a flow diagram illustrating an example of a solving procedure for LDR.

The counter-flow configuration of the LDR meant that the temperatures of all nodes would be solved simultaneously. Therefore an approach used was to split the regeneration process in to two cycles (identified as A & B). In cycle A, the inlet air temperature and concentration for each node were kept constant at the inlet properties of the air while the water and desiccant temperatures and concentrations were solved for each node. These values were then saved, plugged in to the nodes of cycle B, and kept constant while the air temperatures and concentrations were calculated for each node. This procedure was repeated until the water vapor transferred to the air at each node was equal in both cycles. FIG. 37 presents the flow chart of the solver.

Combined Model

The model described above was combined with the LATSC model and simulated using Engineering Equation Solver (EES) to obtain the overall system efficiency ($\eta_{overall}$) for varying $(\dot{m}c_p)_{total}$ and $R_{\dot{m}cp}$. The overall system efficiency was:

$$\eta_{overall} = \eta_c \eta_{reg} \tag{76}$$

where $$\eta_{reg} = \frac{\dot{m}_{da} h_{fg}(\omega_{ao} - \omega_{ai})}{\dot{m}_a c_{pa}(T_{ao} - T_{ai}) + \dot{m}_w c_{pw}(T_{wo} - T_{wi})} \tag{77}$$

$\eta_c$ has previously been defined by equation (56). The regeneration efficiency was the ratio of the energy used to evaporate water from the desiccant solution to the total energy provided by the LATSC. The overall system efficiency was the ratio of the energy used to evaporate the water from the desiccant solution to the incident solar radiation on the collector surface. It may also be expressed as the product of the regeneration efficiency and the collector efficiency. A schematic of the coupled model is illustrated in FIG. 38.

According to this model, there were separate loops for the flow of water, desiccant and air in the coupled system. The water and desiccant salt flow in a closed loop while the air and the moisture in the desiccant flow in an open loop. Based on a steady state operation of the coupled system, the water may be initially pumped to the collector at a constant mass flow rate $\dot{m}_w$ and temperature $T_{in}$ where it may be heated in the collector to $T_{wo}$. The water then enters the regenerator at $T_{wo}$ and exits at $T_{in}$ completing a cycle. Note that the system may be operated such that the exiting water from the regenerator is fed directly into the collector. The air enters the collector at a relatively constant mass flow rate $\dot{m}_a$ and temperature of $T_{amb}$ and exits at a temperature of $T_{ao}$ with relatively little change in mass flow rate. Air then moves into the regenerator at substantially the same temperature and flow rate as at the collector outlet. The air gains mass in the regenerator due to the evaporation of the water from the desiccant stream into the air, after which it leaves the regenerator with a mass flow rate of $\dot{m}_{ao}$ and temperature of $T_{ao,reg}$. The desiccant solution may be pumped from the top of a stratified tank into the regenerator with a concentration of $C_{di}$, temperature $T_{di}$ and mass flow rate $\dot{m}_{di}$. The desiccant solution loses mass in the regenerator as the water evaporates into the air stream leading to an exiting mass flow rate $\dot{m}_{do}$, temperature $T_{do}$ and concentration $C_{do}$.

Figure 39:
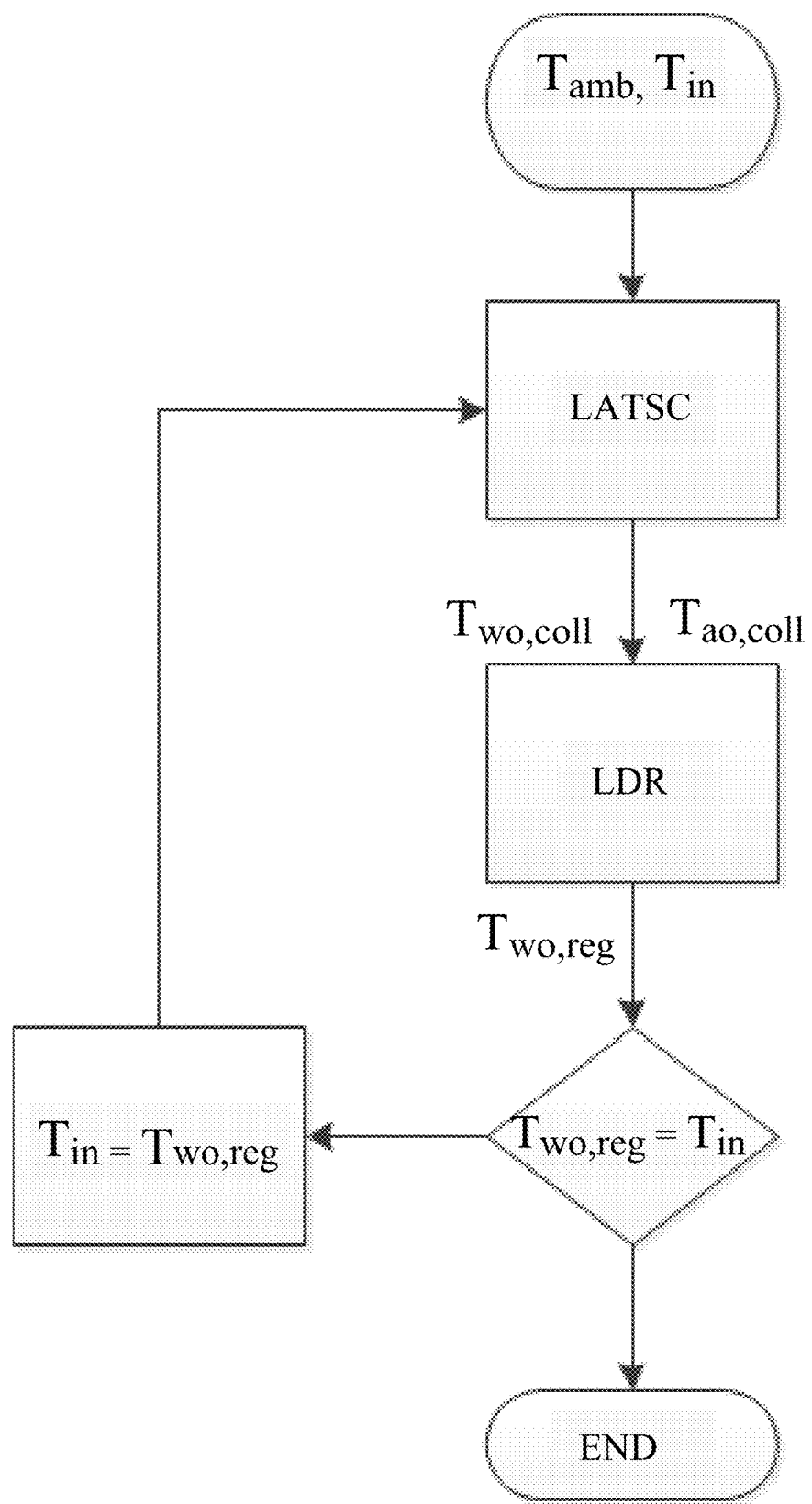
FIG. 39 is a flow diagram illustrating an example of a LATSC-LDR coupled model.

To evaluate the relationship between the collector and regenerator outlet temperatures and the respective water inlet temperatures, the coupled model can be solved iteratively. The solving procedure for the coupled model is shown in FIG. 39. The physical dimensions and inlet conditions of the regenerator are summarized in Table 4.1.

TABLE 4.1

Parameters and Inlet Conditions of the Regenerator

| Parameter | Value |
| --- | --- |
| Plate height | 0.5 m |
| Plate width | 0.5 m |
| Plate spacing | 0.005 m |
| Desiccant flow rate | 0.0013 kg/s |
| Inlet desiccant concentration | 0.2 |
| Control volume height | 0.001 m |
| Number of control volumes | 500 |

Results

Figure 40:
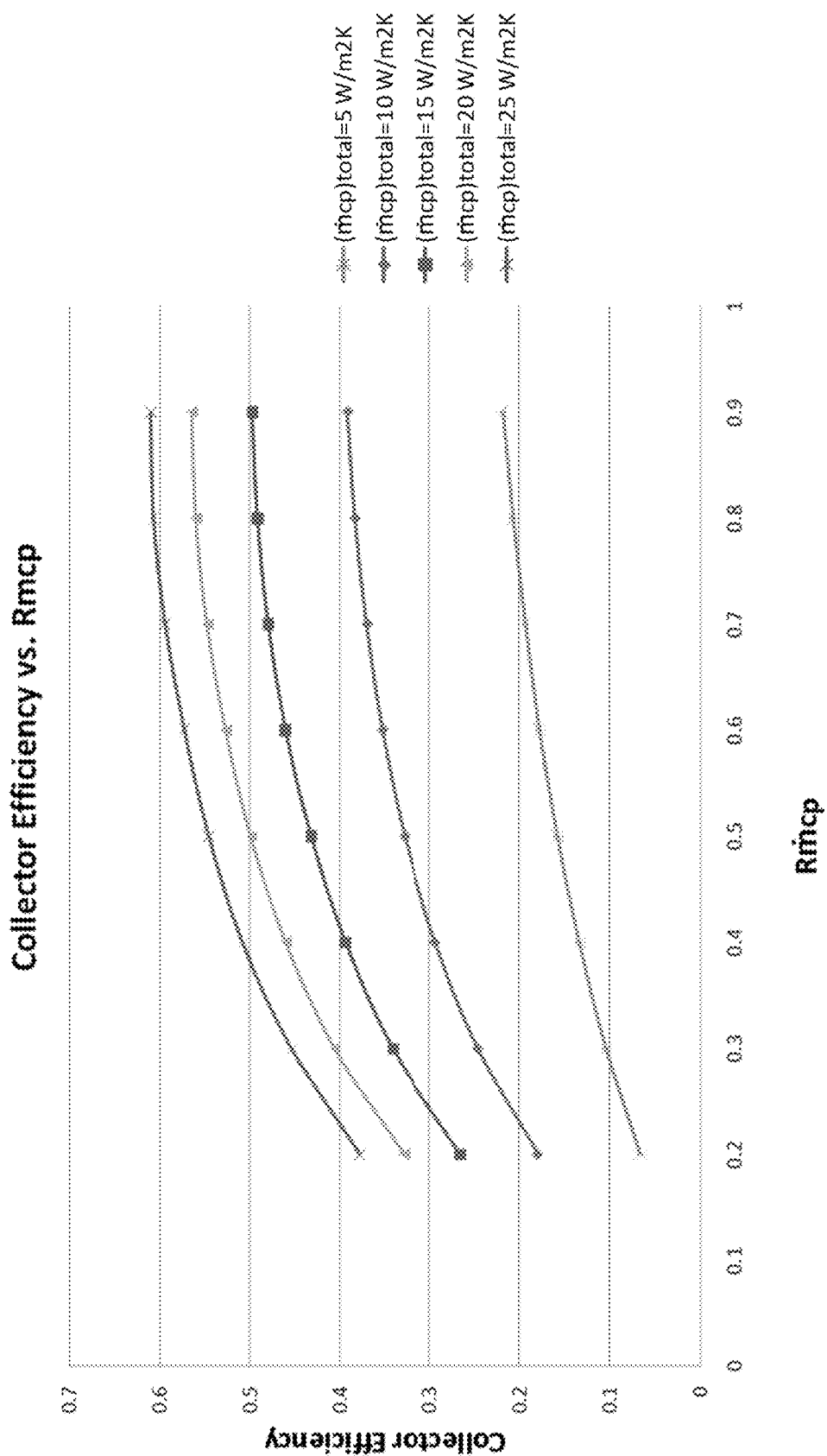
FIG. 40 is a graph providing a comparison of collector efficiency vs $R_{\dot{m}cp}$ for coupled system.
Figure 41:
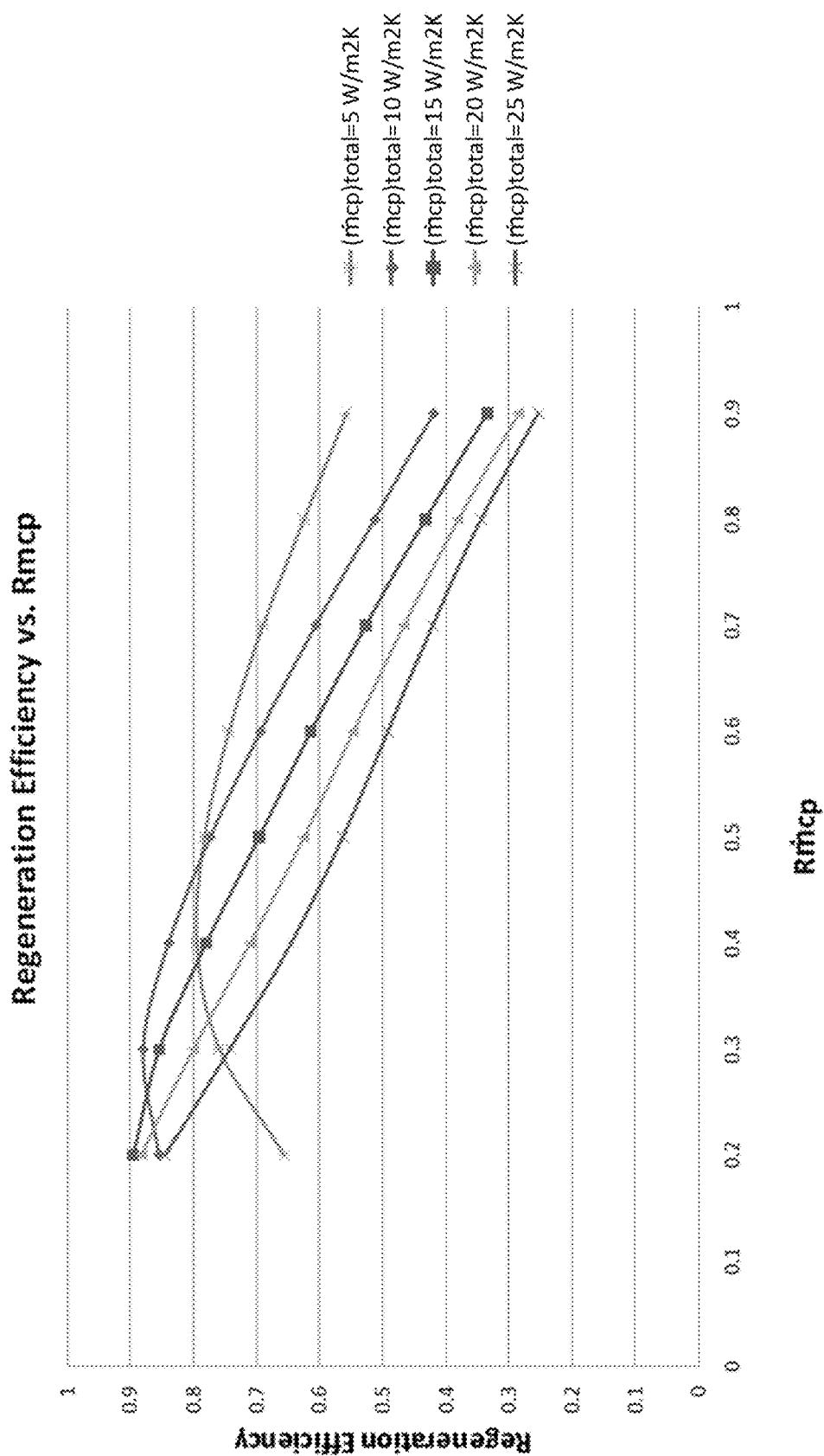
FIG. 41 is a graph providing a comparison of regeneration efficiency vs $R_{\dot{m}cp}$ for coupled system.
Figure 42:
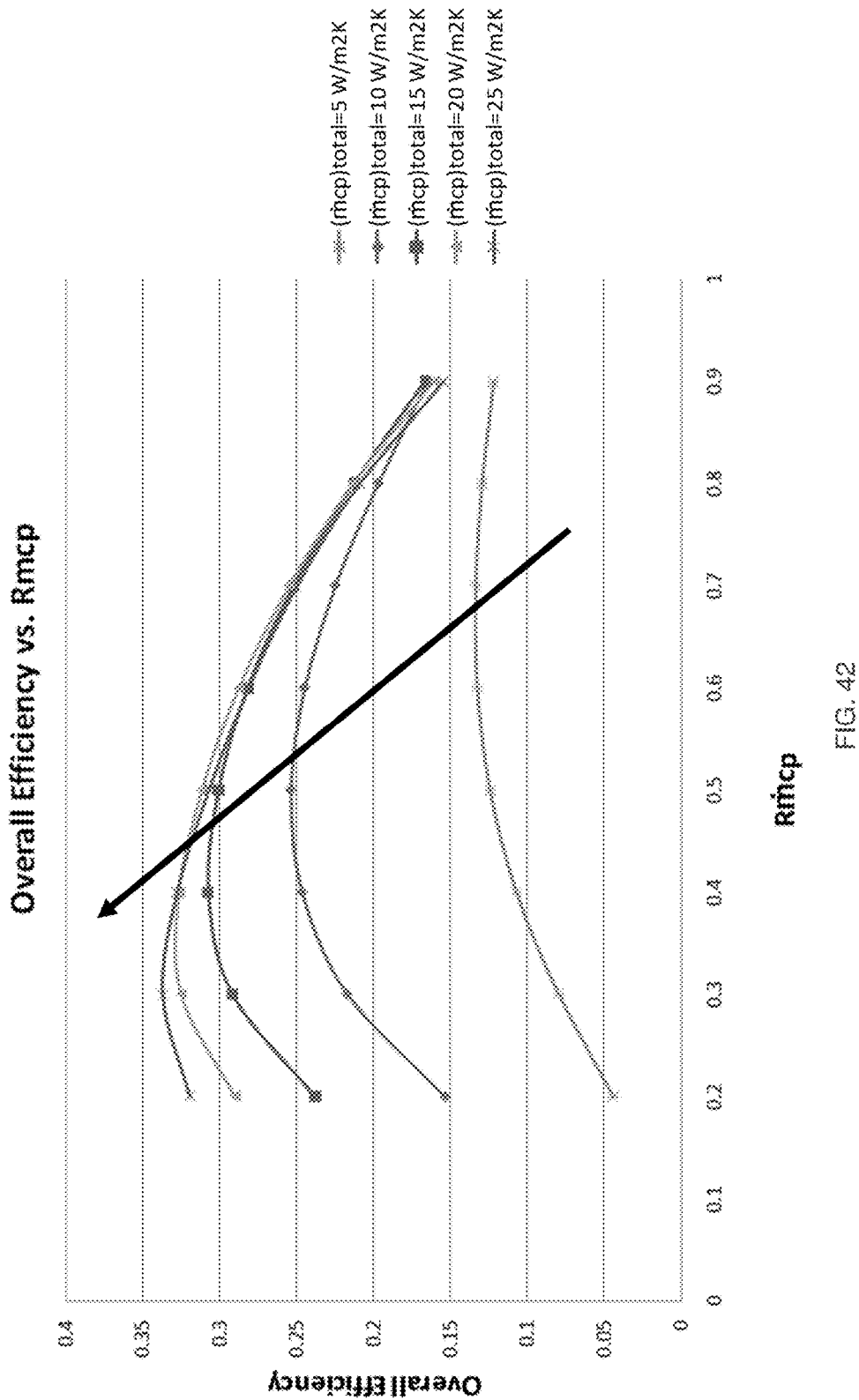
FIG. 42 is a graph providing a comparison of overall efficiency vs $R_{\dot{m}cp}$ for a coupled system.

The $(\dot{m}c_p)_{total}$ system was varied form 5 W/m²K to 25 W/m²K at five equal intervals. For each $(\dot{m}c_p)_{total}$, $R_{\dot{m}cp}$ was varied from 0.2 to 0.9 at intervals of 0.1. The properties of the water, air and desiccant were determined at each node using the EES built in property functions. The collector properties that have been kept constant are listed in Table 2.1. The desiccant mass flow rate was also kept constant at 0.000653 kg/s. FIGS. 40-42 show the variation of the collector, regenerator and overall efficiency with $R_{\dot{m}cp}$ for different $(\dot{m}c_p)_{total}$ for the coupled system.

Figure 43:
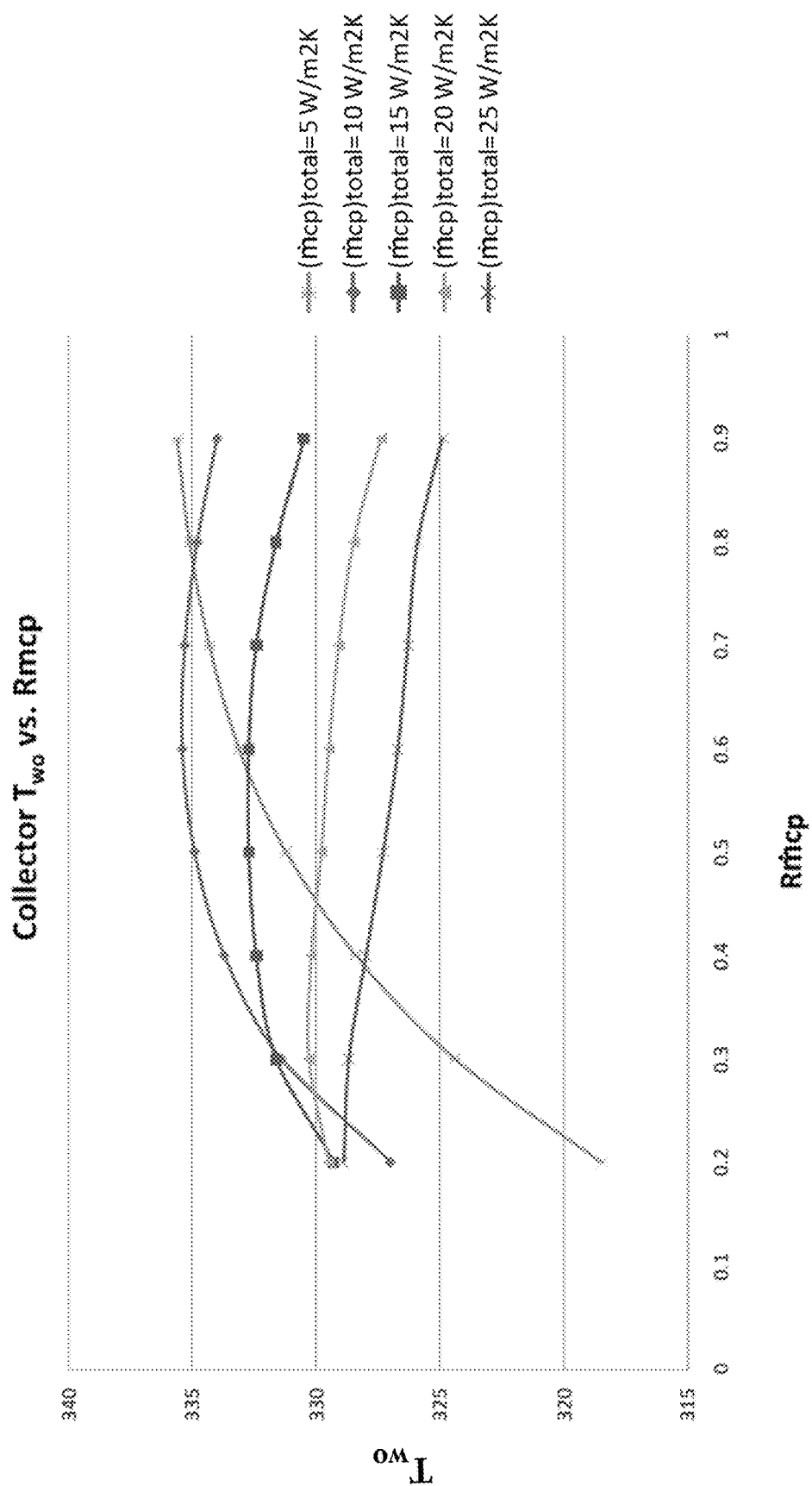
FIG. 43 is a graph providing a comparison of collector water outlet/regenerator water inlet temperature vs $R_{\dot{m}cp}$.
Figure 44:
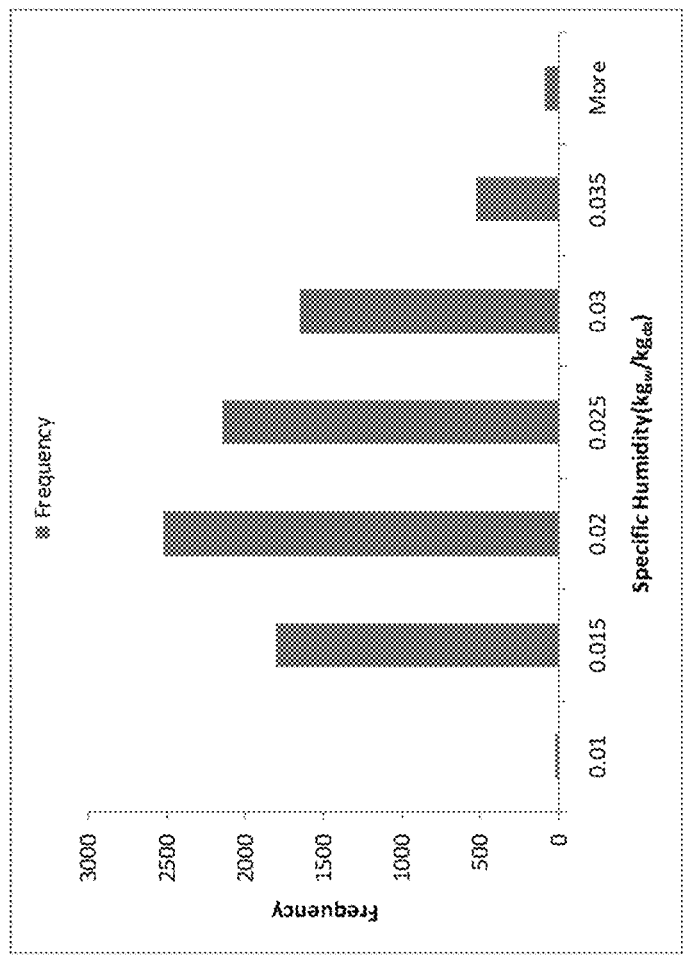
FIG. 44 is a graph providing a histogram showing the frequency of occurrence of specific humidity during the year in Abu Dhabi.

According to this model, the collector efficiency was observed to increase as $R_{\dot{m}cp}$ was increased from 0.2-0.9 at a constant $(\dot{m}c_p)_{total}$. This was associated with a large temperature drop for water across the regenerator when $R_{\dot{m}cp}$ was increased, $((\dot{m}c_p)_w$ decreases), leading to a lower inlet water temperature supplied to the collector. The regenerator efficiency tended to decrease with an increase in $R_{\dot{m}cp}$. This was because higher water flow rates maintained a constant high temperature in the internally heated regenerator, leading to higher regeneration efficiencies. While the temperature of the inlet water to the regenerator was higher at higher $R_{\dot{m}cp}$s, in some configurations that temperature may not be sustained for long in the regenerator due to constant heat transfer to the desiccant for regeneration. The variation of the collector water outlet temperature or regenerator water inlet temperature with $R_{\dot{m}cp}$ at a different $(\dot{m}c_p)_{total}$ is shown in FIG. 43.

In this example, the desiccant regeneration rate and efficiency were associated with the temperature of the desiccant at the air-desiccant interface. The temperature may be maintained by constant heat transfer from the hot water and air to the desiccant. In this model, a relatively substantial amount of heat transfer to the desiccant was from the water, in part because of the higher thermal conductivity of water. To increase the regeneration rate, the water that may be supplied to the regenerator having a relatively high temperature and thermal capacitance rate. A decrease in regeneration efficiency may be observed when $R_{\dot{m}cp}$ is low for the very low $(\dot{m}c_p)_{total}$ of 5 W/m²K. It may also be observed that, in some configurations, even though the thermal capacitance rate of the water increases with a decrease in $R_{\dot{m}cp}$, the temperature of water supplied may decrease rapidly due to convection losses at the front of the collector, leading to a drop in the regeneration efficiency.

In this example, the overall efficiency was observed to increase with an increase in $R_{\dot{m}cp}$ and reach a maximum after which it tended to decrease. Also, a maximum overall efficiency was achieved at different $R_{\dot{m}cp}$ for different $(\dot{m}c_p)_{total}$. As $(\dot{m}c_p)_{total}$ increased, the $R_{\dot{m}cp}$ at which the maximum efficiency was observed decreased. This interaction is noted by the arrow in FIG. 42.

Example 5: Assessment of Combined LATSC and LDR Model

In this example, a combined LATSC and LDR system was assessed based on typical weather conditions in Abu Dhabi. Typical weather conditions were determined by assessing the weather data for one year in Abu Dhabi. Examples of conditions that influence the performance of the combined collector-regenerator system are solar radiation, ambient temperature, wind speed and humidity. To determine these values for a typical Abu Dhabi day, TMY2(2005) data for Abu Dhabi were plotted on a histogram for each of the parameters with different equally sized bins depending on the variability of a particular parameter. For example solar radiation varied for most parts of the day between 300 W/m² to over 1000 W/m² while wind speed tended to range between 0 and 5 m/s. The range of values of the parameters and the bin sizes for the parameters are shown in Table 5.1:

TABLE 5.1

Range and bin sizes of weather parameters used in optimization

| Parameter | Range | Bin Size |
| --- | --- | --- |
| Solar Radiation | 300-1000 W/m² | 100 W/m² |
| Wind Speed | 0-5 m | 1 m/s |
| Humidity | 0.01-0.035 kg$_w$/kg$_{da}$ | 0.005 kg$_w$/kg$_{da}$ |
| Ambient temperature | 15-45° C. | 5° C. |

The range of values taken for solar radiation to plot the histogram started with a radiation of 300 W/m². The solar radiation plotted was the incident solar radiation on a tilted surface with slope 24.43° (latitude of Abu Dhabi). The histograms for solar radiation, wind speed, humidity and ambient temperature are shown in FIGS. 44-47.

Figure 45:
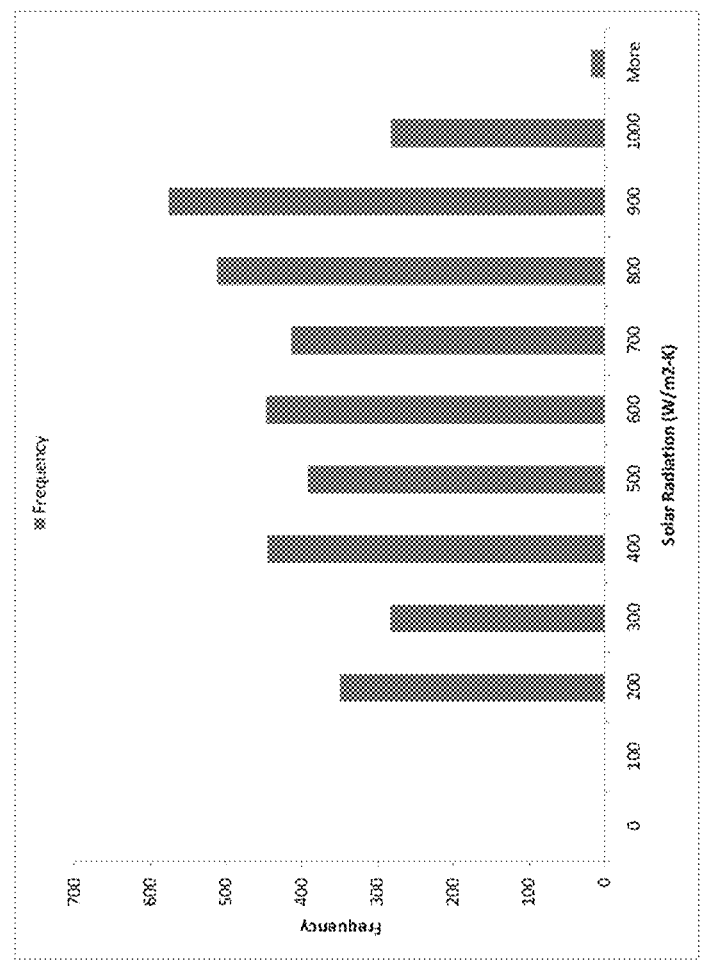
FIG. 45 is a graph providing a histogram showing the frequency of occurrence of solar radiation during the year in Abu Dhabi.
Figure 46:
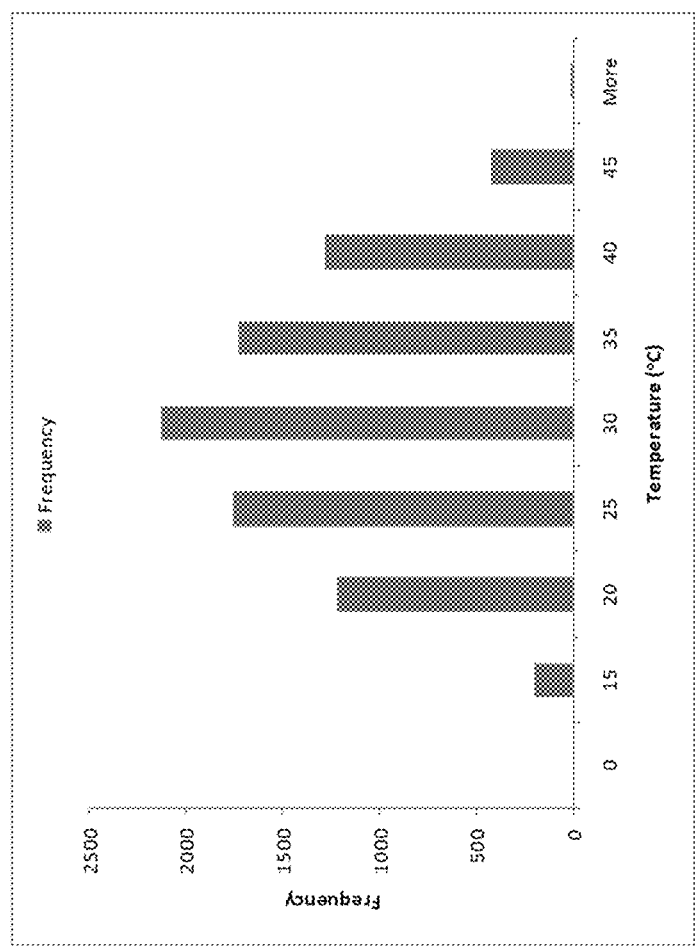
FIG. 46 is a graph providing a histogram showing the frequency of occurrence of ambient temperature during the year in Abu Dhabi.
Figure 47:
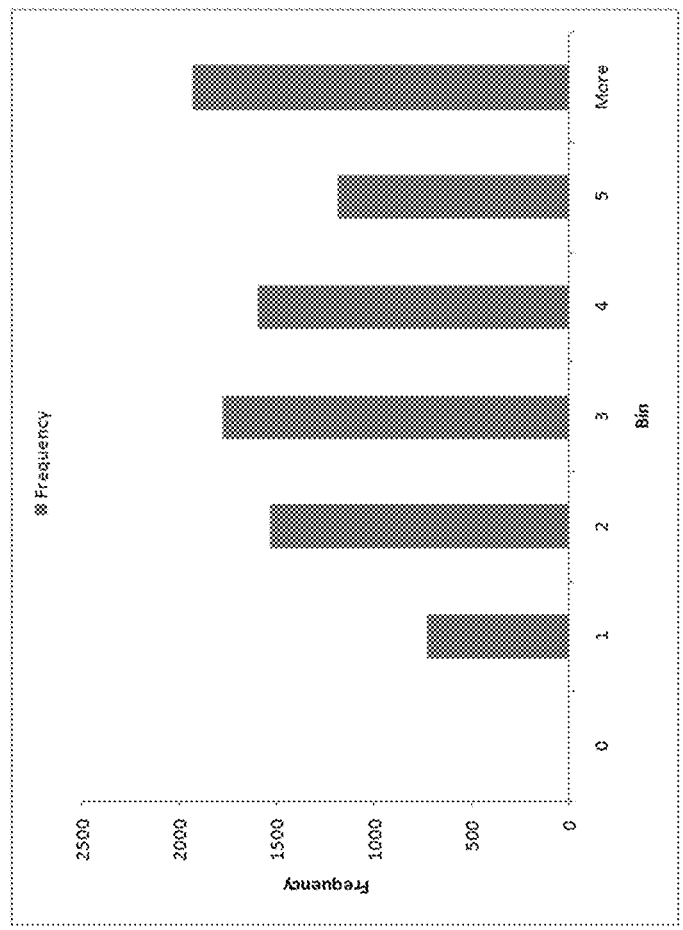
FIG. 47 is a graph providing a histogram showing the frequency of occurrence of wind speed during the year in Abu Dhabi.

The solar radiation used here was for that incident on a tilted surface with slope=24.43°. It was observed, as depicted in FIG. 45, that the highest number of occurrences of solar radiation takes place between 800-900 W/m². Thus the typical solar radiation incident on a collector with slope 24.43° was taken to be 850 W/m².

Similarly the likely wind speed occurrence was between 3-5 m/s. Thus the typical wind speed was taken to be 4 m/s. The humidity varies between 0.01-0.035 kg$_w$/kg$_{da}$. The maximum occurrence of humidity was at 0.02 kg$_w$/k$_{da}$ which was taken as the typical humidity. Lastly the ambient temperature was between less than 15° C. to greater than 45° C. and the greatest occurrence of ambient temperature was between 25-30° C. Therefore the typical temperature was taken to be 27.5° C.

These typical Abu Dhabi weather conditions were fed in to the LATSC and LDR combined system code. The objective of the optimization was to regenerate the liquid desiccant to a concentration of 0.4 while maximizing the desiccant flow rate. Thus an objective function was defined as:

$$f(\text{objective}) = \frac{\text{abs}(C_{do} - 0.4)}{\dot{m}_{di}} + \frac{1}{\dot{m}_{di} * 1000} \quad (78)$$

The system was optimized by minimizing this objective function. The numerator in the first term was the absolute difference between the outlet desiccant concentration and the desired outlet desiccant concentration. The process involved minimization of this term. Thus this term is divided by $\dot{m}_{di}$, which was on the order of $10^{-4}$. This allowed the optimization solver to bring the outlet desiccant concentration as close to zero as possible. The second term was the desiccant flow rate in the denominator, and as the desiccant outlet concentration reaches 0.4, the optimizer focused on maximizing the desiccant flow rate.

Figure 48:
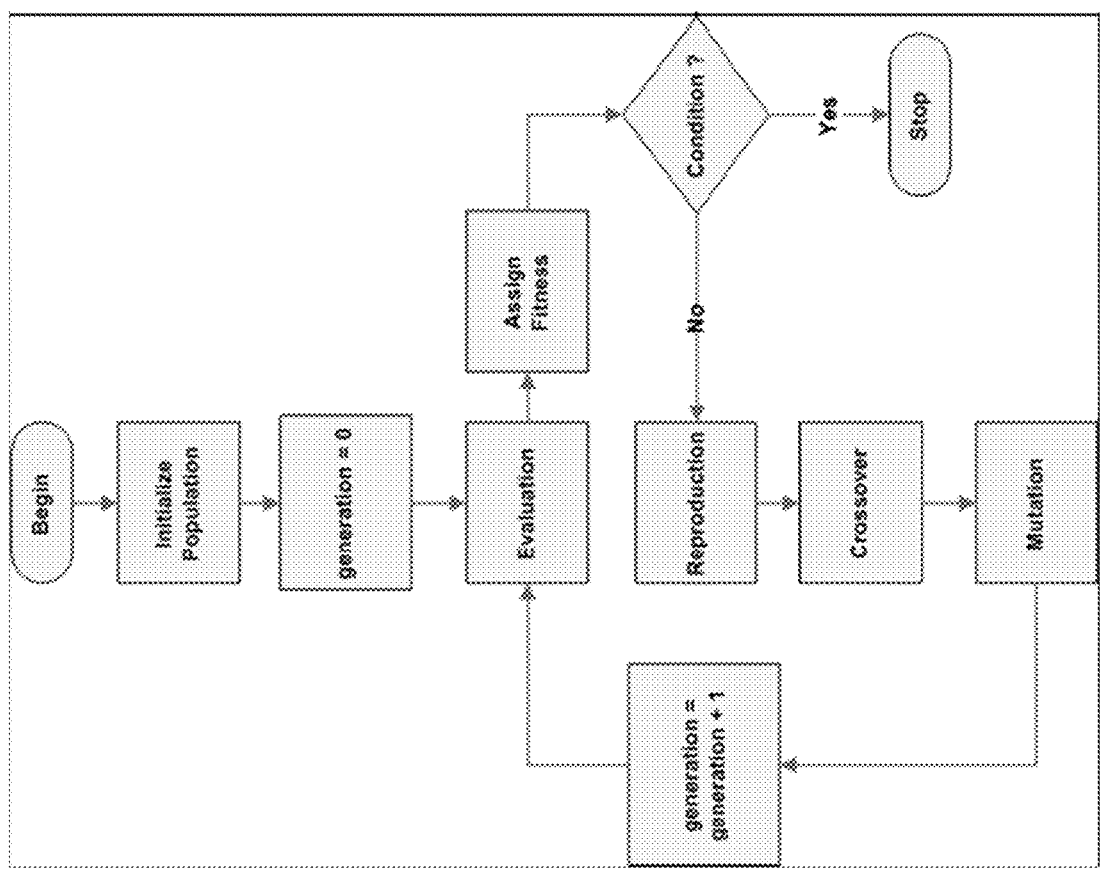
FIG. 48 is a flowchart showing an exemplary working principle of the GA.

The genetic algorithm (GA) in MATLAB was used to optimize the system. The algorithm was provided with the bounds between which the solution was predicted to lie. The GA was useful in finding a global optimum solution. Based on the population specified initially, it was configured to select a pool of random input variables (1$^{st}$ generation) within the bounds specified and solve the LATSC-LDR system to evaluate the objective function. Based on the values of the objective function, the algorithm throwed away trial points from the first generation which resulted in large values of the objective function and produced another generation of variables to test as input variables. The process was repeated so that successive generations converged towards a minimization of the objective function and thus an optimal solution. The flowchart for the working method of the GA is shown in FIG. 48.

Results

The optimized air thermal capacitance, water thermal capacitance and desiccant flow rate per unit width of regenerator for a typical Abu Dhabi day was as outlined in Table 5.2:

TABLE 5.2

Optimized Inlet Conditions per unit collector area

| Inlet Condition | Value |
| --- | --- |
| Thermal capacitance of water | 38.655 W/m²-K |
| Thermal capacitance of air | 10.979 W/m²-K |
| Desiccant mass flow rate per unit regenerator area | 0.0003329 kg/s-m |
| Desiccant mass flow rate per unit collector area | 0.00016645 kg/s-m² |

SUMMARY

A numerical model of a novel hybrid liquid-air collector was developed and the outlet water and air temperatures were evaluated by solving a system of ODEs. Two versions of the model were run: one with fully coupled heat transfer to the air behind the collector plate and the other with no heat transfer to the air behind the collector plate. Although the heat transfer situation behind the plate depends on plate perforation details, collector performance was higher in the fully-coupled case compared with the uncoupled. The latter is shown to reduce to the Hottel-Whillier equation.

Parameters of the model were varied to assess the impact on the performance of the collector. In this example, it was observed that increasing the $(\dot{m}c_p)_{total}$ increased the efficiency of the collector for all values of $R_{\dot{m}cp}$. Moreover, an increase of the $R_{\dot{m}cp}$ from 0.1 to about 0.5 at a constant $(\dot{m}c_p)_{total}$ resulted in an increase in efficiency of the collector. A further increase in $R_{\dot{m}cp}$ led to a decrease in the efficiency, at least in part, because of higher plate temperatures near the outlet ends of the tubes. Furthermore, although, in this example, an increase of $(T_i-T_{amb})/G$ decreased the efficiency of the collector, the rate of decrease of the efficiency decreased with an increase in $R_{\dot{m}cp}$.

For a low $R_{\dot{m}cp}$ of 0.1, the efficiency of the collector exhibited sensitivity to wind speed, showing that the convective losses were relatively marginally suppressed at low air flow rates. To heat the cooling water preferentially while still providing enough airflow to suppress convective front losses, it may be advantageous in some configurations to conduct the air through the plate and into the airstream behind the plate in such a way that convective coupling is minimized.

Standard performance curves were generated for ASHRAE 93 standard water flow rate through the collector at the optimum air suction rate. The performance of the LATSC under light wind was observed to be better than a single glazed flat plate collector for water heating. The slope of the performance curves tended to get steeper as wind speed is increased.

A numerical model of a liquid desiccant regenerator (LDR) was developed to test the LATSC in one of its useful applications. Sensitivity analysis was performed on the combined LDR and LATSC model by varying the total thermal capacitance of air and water and the air thermal capacitance ratio. As the $\dot{m}_{tot}$ is increased, the $R_{\dot{m}cp}$ for the optimum performance of the system decreased. The performance of the system increased as $\dot{m}_{tot}$ was increased. Moreover, in this configuration, the regenerator performed effectively with relatively high flow rates of water when the convection suppression was achieved by the air suction.

A prototype of the LATSC was built and experimentally tested at a total thermal capacitance rate of 50 w/m²K with $R_{\dot{m}cp}$ ratios from 0.1-0.5. The numerical model results provided a promising outlook for the LATSC for liquid desiccant regeneration, domestic water and ventilation heating and low temperature desalination applications. A larger collector size of at least 5 m² may be used.

Lastly the combined model of the LATSC and a falling film, parallel plate type liquid desiccant regenerator was optimized for a typical Abu Dhabi day. The results show that the optimized inlet air thermal capacitance rate, water thermal capacitance rate and desiccant mass flow rate per unit collector area are 25.89275 W/m²-K, 61.5425 W/m²-K and 0.00013771 kg/s-m respectively, in the specific configuration evaluated.

Example 7: Linearized Hottel-Whillier Model for LATSC

A LATSC model based on the Hottel-Whillier (H-W) equation was evaluated in which heating of the water was given by:

$$Q_u = A(F_R G - U_l(T_{fi} - T_{amb})) \qquad (79)$$

where:

$$F_R = \frac{\dot{m}_w c_{pw}}{A_c U_l F'}\left(1 - \exp\left(-\frac{A_c U_l F'}{\dot{m}_w c_{pw}}\right)\right) \qquad (80)$$

$F_R$ is the heat removal factor defined as the ratio of the rate of water heating to the heat rate that would occur if the plate temperature was equal to the fluid inlet temperature.

The H-W formulation involved a constant radiation heat transfer coefficient ($h_r$) with the sky temperature, $T_{sky}$, assumed to be equal to ambient temperature $T_{amb}$. Therefore:

$$q_{rad,loss} = \epsilon \sigma 4 T_m^3 (T_{pl} - T_{amb}) \qquad (81)$$

Where $$T_m = (T_{pl} + T_{amb})/2 \qquad (82)$$

The radiation heat transfer coefficient of the plate was expressed as:

$$h_r = \epsilon \sigma 4 T_m^3 \qquad (83)$$

While the convective heat transfer coefficients due to wind and suction through the plate was expressed as:

$$h_{wind} = 0.82 \frac{V_w v_a \rho_a c_{pa}}{V_s L} \qquad (84)$$

$$h_{c,air} = \dot{m}_a c_{pa} e_{hx} \qquad (85)$$

The total heat loss coefficient from the plate is the sum of the three transfer coefficients for top loss and the back and edge loss coefficients:

$$U_l = h_r + h_{wind} + h_{c,air} + U_{b,tot} + U_e \quad (86)$$

where $$U_{b,tot} = \frac{q_{back,loss}}{T_{pl} - T_{amb}} \quad (87)$$

the air heating, which is not part of $Q_u$, is given by:

$$Q_{c,air} = \dot{m}_a c_{pa} \varepsilon_{hx}(T_{pm} - T_{amb}) \quad (88)$$

where $$T_{pm} = T_{fi} + \frac{Q_u}{A_c F_R U_l}(1 - F_R) \quad (89)$$

The H-W model and the uncoupled form of the numerical model were simulated using identical inlet and ambient conditions and the linearized loss coefficients based on mean plate temperature. The results showed that both the air and water outlet temperatures match within the precision of MATLAB's numerical integrator ODE45. With reasonable initial estimates of $h_r$, $h_{wind}$ and $h_{suction}$, accurate estimate of $T_{pl}$ and overall collector performance may be obtained two iterations.

Example 8: LATSC Shell Leak Test

Figure 49:
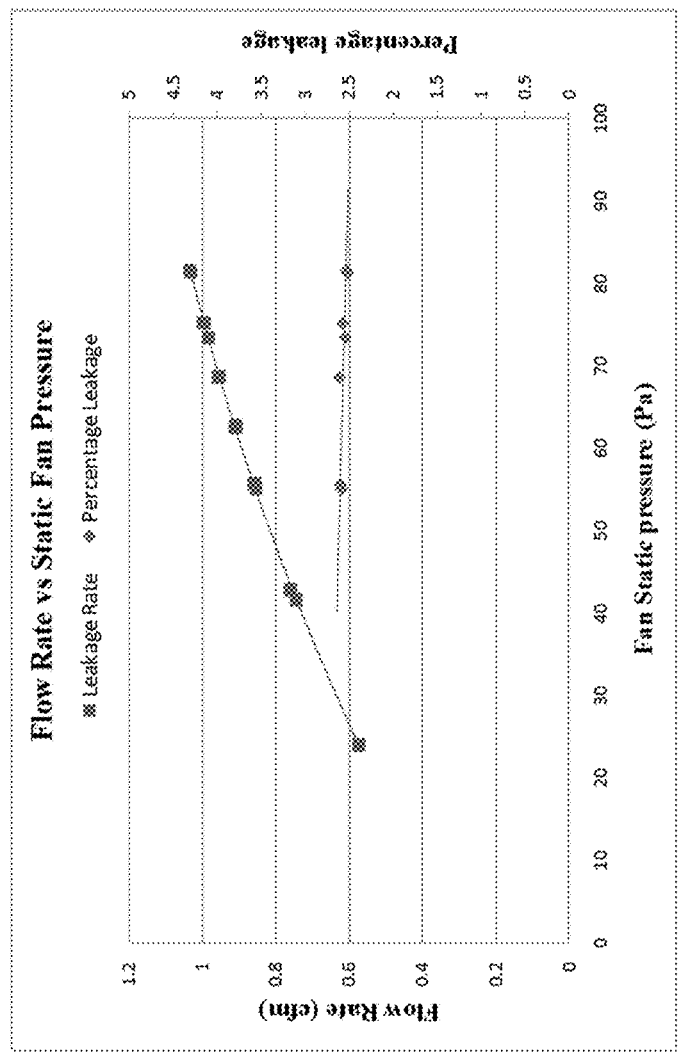
FIG. 49 is a graph providing a comparison of leakage flow rate and leakage percentage vs. fan static pressure.

The shell of the LATSC from Example 3 was examined for leaks by first covering the absorber plate with a polythene sheet and then using the blower door component testing method to check for leaks in the collector. The collector was pressurized and a smoke stick was used to find leaks in the collector shell and the leaks were patched using silicone caulk. A leak test was then performed by pressurizing the collector and measuring the pressure drop across a small orifice as well as the collector static pressure. The collector static pressure was measured up to 80 Pa. The air flow rate through the collector was also measured with the polythene sheet removed at static pressures from 50-80 Pa. The leakage rate and leakage percentage was then plotted against the static pressure. The leakage percentage was the percentage ratio of the leakage rate (at a particular fan static pressure) and the flow rate through the collector with the polythene sheet removed (at the same static pressure). FIG. 49 below shows the variation of the leakage rate and leakage percentage with static pressure.

The leakage rate at 50 Pa static pressure was 0.85 cfm while the percentage leakage varied from 2.5-2.62%. The percentage leak rate variation is not statistically significant and can be taken as a constant 2.5%.

Abbreviations and Nomenclature $A_c$ Collector area (m$^2$)
$C_a$ Concentration of water in air (kg$_w$/kg$_a$)
$C_b$ Bond conductance (W/m-K)
$C_d$ Concentration of water in desiccant (kg$_w$/kg$_d$)
$C_{int}$ Equilibrium concentration of water at air-desiccant interface (kg$_w$/kg$_d$)
$c_{pa}$ Specific heat of air (kJ/kgK)
$c_{pw}$ Specific heat of water (kJ/kgK)
$D_a$ Mass diffusivity (m$^2$/s)
$D_h$ Hole diameter (m)
$D_p$ Hydraulic diameter of plenum (m)
$D_t$ Tube outer diameter (m)
F Fin efficiency
F' Collector efficiency factor
$F_R$ Collector heat removal factor for water
G Absorbed solar radiation (W/m$^2$)
h Hours from midnight (hours)
$h_a$ Air heat transfer coefficient (W/m$^2$K)
$h_{fi}$ Heat transfer coefficient inside tubes (W/m$^2$K)
$h_{fg}$ Latent heat of vaporization of water (kJ/kg)
$h_m$ Mass transfer coefficient of water vapor (kg/m$^2$s)
$h_w$ Water heat transfer coefficient (W/m$^2$K)
k Thermal conductivity (W/mK)
L Length of collector (m)
$L_c$ Characteristic length of collector (m)
$L_s$ Starting length of boundary layer from leading edge (m)
$(\dot{m}c_p)_{total}$ Total thermal capacitance rate of air and water
$\dot{m}$ Mass flow rate (kg/s)
$R_{\dot{m}cp}$ Ratio of $\dot{m}c_{p_{air}}$ to $\dot{m}c_{p_{total}}$
N Number of tubes
Nu Nusselt number
NTU Number of transfer units
P Perimeter of plenum cross section (m)
Pitch Spacing of holes on absorber plate (m)
por Plate porosity
Pr Prandtl Number
$q_{back}$ Convection to air at back wall of plenum per unit area (W/m$^2$)
$q_{back,loss}$ Back convection loss per unit area (W/m$^2$)
$q_{conv,loss}$ Front convection loss per unit area (W/m$^2$)
$q_{edge}$ Edge Loss per unit area of the collector (W/m$^2$)
$q_{rad,loss}$ Front radiation loss per unit area (W/m$^2$)
$q_{c,air}$ Heat transferred to suction air per unit area (W/m$^2$)
$Q_u$ Useful energy transferred to water (W)
Re Reynolds Number
s Distance between tubes in absorber
t Thickness (m)
$T_a(y)$ Air temperature at distance y from inlet (° C.)
$T_{amb}$ Ambient temperature (° C.)
$T_{fi}$ Water inlet temperature (° C.)
$T_m(y)$ Mean of plate and sky temperature (° C.)
$T_{pl}(y)$ Plate temperature (° C.)
$T_{sky}$ Sky Temperature (° C.)
$T_w(y)$ Water Temperature (° C.)
U Heat transfer coefficient (W/m$^2$K)
$V_s$ Suction face velocity (m/s)
$V_w$ Wind Speed (m/s)
$V_{wa}$ Water velocity in tubes (m/s)
W Width of collector (m)
x lateral distance from tube (m)
y distance from inlet end of collector (m)
Greek Letters:
$\varepsilon\_hx$ Heat exchange effectiveness of perforated plate
$\delta$ Plate thickness (m)
$\epsilon$ Emissivity of collector plate
$\rho$ Density (kg/m$^3$)
$\nu$ Kinematic viscosity (m$^2$/s)
$\sigma$ Stephan-Boltzmann constant (W/m$^2$-K$^4$)
$\omega$ Humidity ratio of air (kg$_w$/kg$_{da}$)
Subscripts:
a air
ab back of absorber plate
bi back insulation
bp back plate
br back of absorber plate radiation
c collector
d desiccant
da dry air
ds desiccant salt
e edge of plate exp experimental
exit exit from the perforations
h pertaining to air flowing through perforations
i inlet
o outlet
p plate
reg regenerator
t tubes
th,n theoretical, with incident radiation normal to absorber plate
tot air+water combined mass or heat rat
w water
wb pertaining to wind at back of collector
wd water in desiccant
wf pertaining to wind at front of collector
wv water vapor While several embodiments of the invention have been described and illustrated herein, those of ordinary skill in the art will readily envision a variety of other means and structures for performing the functions and/or obtaining the results or advantages described herein, and each of such variations, modifications and improvements is deemed to be within the scope of the present invention. More generally, those skilled in the art would readily appreciate that all parameters, dimensions, materials, and configurations described herein are meant to be exemplary and that actual parameters, dimensions, materials, and configurations will depend upon specific applications for which the teachings of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, system, material and/or method described herein. In addition, any combination of two or more such features, systems, materials and/or methods, provided that such features, systems, materials and/or methods are not mutually inconsistent, is included within the scope of the present invention.

In the claims (as well as in the specification), all transitional phrases or phrases of inclusion, such as "comprising," "including," "carrying," "having," "containing," "composed of," "made of," "formed of," "involving" and the like shall be interpreted to be open-ended, i.e. to mean "including but not limited to" and, therefore, encompassing the items listed thereafter and equivalents thereof as well as additional items. Only the transitional phrases or phrases of inclusion "consisting of" and "consisting essentially of" are to be interpreted as closed or semi-closed phrases, respectively. The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified. Thus, as a non-limiting example, a reference to "A and/or B" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood, unless otherwise indicated, to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements that the phrase "at least one" refers to, whether related or unrelated to those elements specifically identified. Thus, as a non-limiting example, "at least one of A and B" (or, equivalently, "at least one of A or B," or, equivalently ""at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Any terms as used herein related to shape, orientation, and/or geometric relationship of or between, for example, one or more articles, structures, forces, fields, flows, directions/trajectories, and/or subcomponents thereof and/or combinations thereof and/or any other tangible or intangible elements not listed above amenable to characterization by such terms, unless otherwise defined or indicated, shall be understood to not require absolute conformance to a mathematical definition of such term, but, rather, shall be understood to indicate conformance to the mathematical definition of such term to the extent possible for the subject matter so characterized as would be understood by one skilled in the art most closely related to such subject matter. Examples of such terms related to shape, orientation, and/or geometric relationship include, but are not limited to terms descriptive of: shape—such as, round, square, circular/circle, rectangular/rectangle, triangular/triangle, cylindrical/cylinder, elipitical/elipse, (n)polygonal/(n)polygon, etc.; angular orientation—such as perpendicular, orthogonal, parallel, vertical, horizontal, collinear, etc.; contour and/or trajectory—such as, plane/planar, coplanar, hemispherical, semi-hemispherical, line/linear, hyperbolic, parabolic, flat, curved, straight, arcuate, sinusoidal, tangent/tangential, etc.; direction—such as, north, south, east, west, etc.; surface and/or bulk material properties and/or spatial/temporal resolution and/or distribution—such as, smooth, reflective, transparent, clear, opaque, rigid, impermeable, uniform(ly), inert, non-wettable, insoluble, steady, invariant, constant, homogeneous, etc.; as well as many others that would be apparent to those skilled in the relevant arts. As one example, a fabricated article that would described herein as being "square" would not require such article to have faces or sides that are perfectly planar or linear and that intersect at angles of exactly 90 degrees (indeed, such an article can only exist as a mathematical abstraction), but rather, the shape of such article should be interpreted as approximating a "square," as defined mathematically, to an extent typically achievable and achieved for the recited fabrication technique as would be understood by those skilled in the art or as specifically described.

In cases where the present specification and a document incorporated by reference and/or referred to herein include conflicting disclosure, and/or inconsistent use of terminology, and/or the incorporated/referenced documents use or define terms differently than they are used or defined in the present specification, the present specification shall control. Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A solar energy collector comprising:
   a housing forming a cavity for containing a first fluid, the cavity having at least one outlet configured and arranged for allowing the first fluid to exit from the cavity, wherein said first fluid comprises ambient air;
   a solar absorber comprising a plate having a plurality of openings, the solar absorber being configured and arranged for directly absorbing incident solar radiation, thereby acquiring thermal energy, and for allowing passage of the first fluid through each of the plurality of openings into the cavity such that thermal energy is transferred to the first fluid; and
   at least one conduit attached to an interior surface of the solar absorber such that at least a portion of the at least one conduit is exposed to the cavity, the at least one conduit configured and arranged for allowing passage of a second fluid through the cavity such that the second fluid is fluidically isolated from the first fluid and such that thermal energy is transferred from said solar absorber to the second fluid.

2. The solar energy collector of claim 1, wherein the openings are circular holes.

3. The solar energy collector of claim 2, wherein the circular holes have a diameter in a range of 1 mm to 10 mm.

4. The solar energy collector of claim 1 wherein the openings comprise louvers.

5. The solar energy collector of claim 1, wherein the openings are arranged in a triangular or hexagonal pattern or square pattern.

6. The solar energy collector of claim 1, wherein the pitch of the openings is in a range of 5 mm to 50 mm.

7. The solar energy collector of claim 1, wherein the areal density of openings in the solar absorber is in a range of 400 to 40,000 openings/$m^2$.

8. The solar energy collector of claim 1 further comprising a first fluid flow device configured and arranged for moving the first fluid out of the cavity through the at least one outlet, wherein the first fluid flow device comprises at least one of a fan or pump.

9. The solar energy collector of claim 8, wherein the first fluid flow device is further configured and arranged for moving the first fluid through the plurality of openings into the cavity, and toward the at least one outlet.

10. The solar energy collector of claim 8, wherein the first fluid flow device is configured and arranged for moving the first fluid through the at least one outlet at a thermal capacitance rate per unit area of the solar absorber surface that is exposed to solar radiation in a range of 1 $W/m^2$-K to 100 $W/m^2$-K.

11. The solar energy collector of claim 1, wherein the cavity comprises at least one inlet, separate from the plurality of openings in the solar absorber, configured and arranged for allowing the first fluid to enter into cavity such that it combines with the first fluid entering into the cavity through the plurality of openings.

12. The solar energy collector of claim 11, further comprising a first fluid flow device configured and arranged for moving the first fluid through the plurality of openings, and moving the first fluid toward the at least one outlet, wherein the first fluid flow device comprises at least one of a fan or pump.

13. The solar energy collector of claim 1 further comprising a second fluid flow device configured and arranged for moving the second fluid through the at least one conduit.

14. The solar energy collector of claim 13, wherein the second fluid flow device is a pump.

15. The solar energy collector of claim 13, wherein the second fluid flow device is configured and arranged for moving the second fluid through the at least one conduit at a mass flow rate per cross-sectional area of the conduit of less than 0.02 kg/s-$m^2$.

16. The solar energy collector of claim 13, wherein the second fluid flow device is configured and arranged for moving the second fluid through the at least one conduit at a thermal capacitance rate per unit area of the solar absorber surface that is exposed to solar radiation in a range of 4 $W/m^2$-K to 200 $W/m^2$-K.

17. The solar energy collector of claim 1, wherein the second fluid is a liquid.

18. The solar energy collector of claim 17, wherein the second fluid is water or an aqueous solution.

19. The solar energy collector of claim 1, wherein the solar absorber has a length in a range of 1 m to 5 m and a width in a range of 1 m to 5 m.

20. The solar energy collector of claim 19, wherein the substantially rectangular cross-section has a depth in a range of 0.025 m to 0.5 m.

21. The solar energy collector of claim 19, wherein the substantially rectangular cross-section has a perimeter in a range of 1 m to 4 m.

22. The solar energy collector of claim 1, wherein the absorber has a solar absorptivity of at least 0.8.

23. The solar energy collector of claim 1, wherein the cavity has a substantially rectangular cross-section.

24. The solar energy collector of claim 1 further comprising a support structure configured and arranged to position the absorber at desired tilt and azimuth angles.

25. A solar energy collector comprising:
    a housing forming an enclosed cavity;
    a solar absorber defining a surface of the enclosed cavity and comprising a plate having a plurality of openings configured to permit passage of a first fluid into the enclosed cavity, wherein the solar absorber is arranged for directly absorbing incident solar radiation to acquire thermal energy and for transferring the thermal energy to the first fluid as it passes through the plurality of openings into the enclosed cavity, wherein said first fluid comprises ambient air;

at least one outlet in the enclosed cavity to allow the first fluid to exit from the cavity; and a plurality of conduits attached to an interior surface of the solar absorber such that at least a portion of the at least one conduit is exposed to the cavity, the plurality of conduits arranged for allowing passage of a second fluid through the cavity such that thermal energy is transferred from the solar absorber to the second fluid.

\* \* \* \* \*